(12) United States Patent
Zhu et al.

(10) Patent No.: US 12,316,550 B2
(45) Date of Patent: May 27, 2025

(54) MULTI-ACCESS MANAGEMENT SERVICE QUEUEING AND REORDERING TECHNIQUES

(71) Applicant: Intel Corporation, Santa Clara, CA (US)

(72) Inventors: Jing Zhu, Portland, OR (US); Menglei Zhang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 611 days.

(21) Appl. No.: 17/560,181

(22) Filed: Dec. 22, 2021

(65) Prior Publication Data

US 2022/0116334 A1 Apr. 14, 2022

(51) Int. Cl.
*H04L 47/62* (2022.01)
*H04L 47/34* (2022.01)
*H04L 49/901* (2022.01)
*H04W 28/06* (2009.01)
*H04W 76/15* (2018.01)

(52) U.S. Cl.
CPC ........... *H04L 47/622* (2013.01); *H04L 47/34* (2013.01); *H04L 49/901* (2013.01); *H04W 28/065* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 6,957,212 B2 | 10/2005 | Peng | |
| 7,243,354 B1* | 7/2007 | Chhabra | G06F 9/546 718/100 |
| 8,949,501 B1 | 2/2015 | Akhter et al. | |
| 9,398,121 B1 | 7/2016 | Brandwine | |
| 2003/0091054 A1 | 5/2003 | Futenma | |
| 2006/0168336 A1 | 7/2006 | Koyanagi | |
| 2010/0202323 A1 | 8/2010 | Nishida | |

(Continued)

FOREIGN PATENT DOCUMENTS

| | | |
|---|---|---|
| EP | 3414932 A1 | 12/2018 |
| WO | WO 2015-152787 A1 | 10/2015 |

(Continued)

OTHER PUBLICATIONS

Nikc McKeown et al., "Tiny Tera: A Packet Switch Core", IEEE Micro, IEEE Service Center, Los Alamitos, CA, US deel 17, nr.1, (Jan. 1, 1997), 8 pages.

(Continued)

*Primary Examiner* — Kouroush Mohebbi
(74) *Attorney, Agent, or Firm* — Schwabe, Williamson & Wyatt, P.C.

(57) ABSTRACT

The present disclosure is related to multi-queue management techniques and packet reordering techniques for inter-radio access technology (RAT) and intra-RAT traffic steering. The multi-queue management and packet reordering techniques may be used in Multi-Access Management Services (MAMS) framework, which is a programmable framework that provides mechanisms for the flexible selection of network paths in a multi-access (MX) communication environment, based on an application's needs. Other embodiments may be described and/or claimed.

30 Claims, 21 Drawing Sheets

(56) References Cited

U.S. PATENT DOCUMENTS

| | | |
|---|---|---|
| 2013/0246672 A1 | 9/2013 | Saputra |
| 2014/0307593 A1 | 10/2014 | Zhao et al. |
| 2015/0029879 A1 | 1/2015 | Chou et al. |
| 2015/0078359 A1 | 3/2015 | Scahill et al. |
| 2015/0215835 A1 | 7/2015 | Sirotkin |
| 2016/0112896 A1 | 4/2016 | Karampatsis |
| 2016/0270145 A1 | 9/2016 | Srinivasa Gopalan et al. |
| 2016/0381491 A1 | 12/2016 | Watfa et al. |
| 2017/0019830 A1 | 1/2017 | Lindoff et al. |
| 2017/0093541 A1 | 3/2017 | Pan et al. |
| 2018/0027508 A1 | 1/2018 | Tanaka |
| 2018/0077022 A1 | 3/2018 | Van Oost et al. |
| 2018/0092085 A1 | 3/2018 | Shaheen et al. |
| 2018/0018385 A1 | 6/2018 | Sabella et al. |
| 2018/0270742 A1 | 9/2018 | Bergstrom et al. |
| 2019/0036841 A1 | 1/2019 | Nolan |
| 2019/0306749 A1 | 10/2019 | Bergstrom et al. |
| 2019/0306752 A1 | 10/2019 | Lai |
| 2019/0394833 A1 | 12/2019 | Talebi Fard et al. |
| 2020/0045612 A1 | 2/2020 | Stauffer et al. |
| 2020/0053018 A1 | 2/2020 | White et al. |
| 2020/0178196 A1 | 6/2020 | Wang et al. |
| 2021/0051104 A1 | 2/2021 | He |
| 2021/0058936 A1 | 2/2021 | Gordaychik |
| 2021/0100047 A1 | 4/2021 | Chiba et al. |
| 2021/0144590 A1 | 5/2021 | Li |
| 2021/0211914 A1 | 7/2021 | De La Oliva et al. |
| 2021/0306900 A1 | 9/2021 | Mehta |
| 2021/0385865 A1 | 12/2021 | Mueck |
| 2021/0400537 A1 | 12/2021 | Zhang et al. |
| 2021/0409335 A1 | 12/2021 | Zhu et al. |
| 2022/0155975 A1* | 5/2022 | Nortman ............... G06F 3/0679 |
| 2022/0191733 A1 | 6/2022 | Ali et al. |
| 2023/0056442 A1 | 2/2023 | Ly et al. |
| 2023/0189368 A1 | 6/2023 | Zhou |
| 2023/0276483 A1 | 8/2023 | Xu et al. |

FOREIGN PATENT DOCUMENTS

| | | |
|---|---|---|
| WO | WO2017/139699 A1 | 8/2017 |
| WO | WO 2017-189176 A2 | 11/2017 |
| WO | WO 2019-076440 A1 | 4/2019 |
| WO | WO 2019-192528 A1 | 10/2019 |
| WO | WO 2020/232404 A1 | 11/2020 |
| WO | WO2021/257974 A1 | 12/2021 |
| WO | WO2022005917 A1 | 1/2022 |
| WO | WO2022005918 A1 | 1/2022 |

OTHER PUBLICATIONS

S. Kanugovi et al., "Multi-Access Management Services (MAMS)", rtc8743.txt, Multi-Access Management Services (MAMS); RFC8743. TXT, Internet Engineering Task Force, IETF; Standard, Internei Society (ISOC) 4, Rue Des Falaises CH-1205 Geneva, Switzerland, (Mar. 25, 2020), 73 pages.

International Search Report and Written Opinion mailed Oct. 8, 2021 for International Patent Application No. PCT/US2021/039253, 12 pages.

"3rd Generation Partnership Project; Technical Specification Group Services and System Aspects; Study on access traffic steering, switch and splitting support in the 5G system architecture (Release 16)", 3GPP TR 23.793 V16.0.0 (Dec. 19, 2018), 114 pages.

"3rd Generation Partnership Project; Technical Specification Group Services and System Aspects; Study on Access Traffic Steering, Switch and Splitting support in the 5G system architecture Phase 2 (Release 17)", 3GPP TR 23.700-93 V0.1.1 (Jun. 23, 2020), 43 pages.

International Preliminary Report on Patentability mailed Jan. 12, 2023 for International Patent Application No. PCT/ JS2021/039253, 7 pages.

International Search Report and Written Opinion mailed Nov. 19, 2021 for International Patent Application No. PCT/US2021/039252, 13 pages.

International Preliminary Report on Patentability mailed Jan. 12, 2023 for International Patent Application No. PCT/ US2021/039252, 8 pages.

U.S. Appl. No. 63/025,086 "Dynamic Traffic Management in Next Generation Multi-Access Management Service Frameworks", filed May 14, 2020, 78 pages.

U.S. Appl. No. 17/922,947 "RAN-Aware Traffic Distribution Rules and RAN Measurements for Enhanced Access Traffic Steering Switching and Splitting", filed Nov. 2, 2022, 92 pages.

U.S. Appl. No. 17/925,430 "Wireless Local Area Network Enhancements for Access Traffic Steering Switching Splitting", filed Nov. 15, 2022, 64 pages.

"3rd Generation Partnership Project; Technical Specification Group Services and System Aspects; System architecture for the 5G System (5GS); Stage 2 (Release 15)", 3GPP TS 23.501 V15.9.0 (Mar. 27, 2020), 248 pages.

A. Ford et al., "RFC 8684 TCP Extensions for Multipath Operation with Multiple Addresses": http://tools.ietf.org/html/draft-ietf-mptcp-multiaddressed-09, 6 pages (Mar. 2020).

"3rd Generation Partnership Project; Technical Specification Group Services and System Aspects; Management and orchestration; 5G performance measurements (Release 16)", 3GPP TS 28.552 V16.5.0 (Mar. 27, 2020), 173 pages.

"3rd Generation Partnership Project; Technical Specification Group Radio Access Network; Evolved Universal Terrestrial Radio Access (E-UTRA); Layer 2—Measurements (Release 15)", 3GPP TS 36.314 V15.2.0 (Jan. 11, 2019), 28 pages.

"IEEE Standard for Information technology—Telecommunications and information exchange between systems Local and metropolitan area networks—Specific requirements—Part 11: Wireless LAN Medium Access Control (MAC) and Physical Layer (PHY) Specifications," IEEE Std 802.11-2016, 3534 pages (Dec. 14, 2016).

Wi-Fi Alliance, "Wi-Fi Agile Multiband Technical Specification", Version 1.5, 32 pages (2020).

Wi-Fi Alliance, "Optimized Connectivity Specification", Version 1.1.6, 26 pages (2020).

Sangeetha Bangolae et al., "Performance Study of Fast BSS Transition using IEEE 802.11r", Proceedings of the 2006 Int'l Conference on Wireless Comm. and Mobile Computing (IWCMC '06), pp. 737-742 (Jul. 3, 2006), https://dl.acm.org/doi/pdf/10.1145/1143549.1143696.

"Wi-Fi Roaming Aggressiveness Setting", Intel Corporation, Article ID 000005546, 2 pages (Oct. 28, 2021).

Yordan, "Oppo and vivo announce Dual Wi-Fi for their flagships", GSMArena.com, 3 pages (Jul. 18, 2019), https://www.gsmarena.com/oppo_vivo_dual_wifi-news-38203.php.

Q. De Coninck et al., "Multipath Extensions for QUIC (MP-QUIC)", IETF, draft-deconinck-quic-multipath-07, 36 pages (May 3, 2021), https://datatracker.ietf.org/doc/html/draft-deconinck-quic-multipath-07.

J. Zhu et al., "Generic Multi-Access (GMA) Encapsulation Protocol", IETF, draft-zhu-intarea-gma-14, 17 pages (Nov. 24, 2021), https://datatracker.ietf.org/doc/html/draft-zhu-intarea-gma-14.

J. Zhu et al., "User-Plane Protocols for Multiple Access Management Service", IETF, draft-zhu-intarea-mams-user-protocol-09, 8 pages (Mar. 4, 2020).

"3rd Generation Partnership Project; Technical Specification Group Core Network and Terminals; 5G System; Access Traffic Steering, Switching and Splitting (ATSSS); Stage 3 (Release 17)", 3GPP TS 24.193 v17.2.0 (Sep. 24, 2021), 71 pages.

"3rd Generation Partnership Project; Technical Specification Group Core Network and Terminals; Access Network Discovery and Selection Function (ANDSF) Management Object (MO) (Release 16)", 3GPP TS 24.312 v16.0.0 (Jul. 9, 2020), 394 pages.

"3rd Generation Partnership Project; Technical Specification Group Radio Access Network; Evolved Universal Terrestrial Radio Access (E-UTRA); LTE/WLAN Radio Level Integration Using IPsec Tunnel (LWIP) encapsulation; Protocol specification (Release 16)", 3GPP TS 36.361 v16.0.0 (Jul. 24, 2020), 10 pages.

International Search Report and Written Opinion mailed Aug. 31, 2020 for International Patent Application No. PCT/US2020/033261, 14 pages.

(56) References Cited

OTHER PUBLICATIONS

International Preliminary Report on Patentability mailed Nov. 25, 2021 for International Patent Application No. PCT/US2020/033261, 10 pages.
"3rd Generation Partnership Project; Technical Specification Group Services and System Aspects; Study on access traffic steering, switch and splitting support in the 5G system architecture (Release 16)", 3GPP TR 23.793 v16.0.0, 115 pages (Dec. 19, 2018).
S. Kanugovi et al., "Multiple Access Management Services", draft-kanugovi-intarea-mams-framework-03, Internet Engineering Task Force (IETF), 156 pages (Feb. 28, 2019), https://tools.ietf.org/search/draft-kanugovi-intarea-mams-framework-03.
S. Kanugovi et al., Multiple Access Management Services, draft-kanugovi-intarea-mams-framework-04, Internet Engineering Task Force (IETF), 122 pages (May 31, 2019), https://datatracker.ietf.org/doc/html/draft-kanugovi-intarea-mams-framework-04.
J. Zhu et al., "User-Plane Protocols for Multiple Access Management Service", draft-zhu-intarea-mams-user-protocol-07, Internet Engineering Task Force (IETF), 14 pages (Apr. 3, 2019), https://datatracker.ietf.org/doc/html/draft-zhu-intarea-mams-user-protocol-07.
"3rd Generation Partnership Project; Technical Specification Group Services and System Aspects; System Architecture for the 5G System; Stage 2 (Release 16)", 3GPP TS 23.501 v16.1.0, 368 pages (Jun. 11, 2019).
"3rd Generation Partnership Project; Technical Specification Group Core Network and Terminals; 5G System; Access and Mobility Management Services; Stage 3 (Release 16)", 3GPP TS 29.518 V16.0.0, 199 pages (Jun. 13, 2019).
"Multi-access Edge Computing (MEC); Framework and Reference Architecture", ETSI GS MEC 003 V2.1.1, 21 pages (Jan. 2019).
"Multi-access Edge Computing (MEC); Phase 2: Use Cases and Requirements", ETSI GS MEC 002 V2.1.1, 66 pages (Oct. 2018).
"Mobile Edge Computing(MEC); Bandwidth Management API", ETSI GS MEC 015 V1.1.1, 20 pages (Oct. 2017).
"3rd Generation Partnership Project; Technical Specification Group Core Network and Terminals; 5G System; Network Exposure Function Northbound APIs; Stage 3 (Release 16)", 3GPP TS 29.522 V16.0.0, 43 pages (Jun. 18, 2019).
"Multi-access Edge Computing (MEC); General principles for MEC Service APIs Disclaimer", ETSI GS MEC 009 V2.1.1, 64 pages (Jan. 2019).
"3rd Generation Partnership Project; Technical Specification Group Services and System Aspects; System Architecture for the 5G System; Stage 2 (Release 16)" 3GPP TS 23.501 v16.0.2, 317 pages (Apr. 1, 2019).
"3rd Generation Partnership Project; Technical Specification Group Core Network and Terminals; 5G System; Access and Mobility Management Services; Stage 3 (Release 15)", 3GPP TS 29.518 V15.3.0, 195 pages (Mar. 24, 2019).
"Mobile Edge Computing (MEC); Radio Network Information API", ETSI GS MEC 012 V1.1.1, 57 pages (Jul. 2017).
International Preliminary Report on Patentability mailed Oct. 13, 2022 for International Patent Application PCT/US2020/066969, 8 pages.
Extended European Search Report issued Jun. 14, 2024 for EP Application No. 21825017.3, 4 pages.
Deutsche Bahn AG, "Exemplary Mapping of 3GPP Building Blocks to FRMCS Logical Architecture Draft," ETSI Draft RT(19)075028r3, ETSI, Dec. 12, 2019, 13 pages.
Office Action mailed Jun. 21, 2024 for U.S. Appl. No. 17/437,711, 96 pages.
Notice of Allowance mailed Aug. 20, 2024 for U.S. Appl. No. 17/469,331, 21 pages.
Notice of Allowance mailed Aug. 2, 2024 for U.S. Appl. No. 17/923,170, 71 pages.
Office Action mailed Sep. 18, 2024 for U.S. Appl. No. 17/797,661, 72 pages.
Extended European Search Report mailed May 10, 2023 for European Patent Application No. 20806061.6, 11 pages.
S. Kanugovi Nokia e al., "Multiple Access Management Services; Draft-Kanugovi-intarea-mams-fraaework-03", (Feb. 28, 2019), 141 pages.
3GPP, "3rd Generation Partnership Project; Technical Specification Group Services and System Aspects; Study on access traffic steering, switch and splitting support in the 5G system architecture (Release 16)", 3GPP TR 23.793 V16.0.0 (Dec. 2018), 114 pages.
International Preliminary Report on Patentability mailed Dec. 29, 2022 for International Patent Application PCT/US2021/038063, 10 pages.
Extended European Search Report mailed Apr. 14, 2023 for European Patent Application No. 22203400.1, 13 pages.
Nádas et al., "Per Packet Value: A Practical Concept for Network Resource Sharing", 2016 IEEE Global Communications Conference (GLOBECOM), pp. 1-7 (Dec. 4, 2016).
Laki et al., "Take your own share of the PIE", Proceedings of the Applied Networking Research Workshop, pp. 27-32 (Jul. 15, 2017).
Nádas et al., "Towards a congestion control-independent core-stateless AQM", Proceedings of the Applied Networking Research Workshop, pp. 84-90 (Jul. 16, 2018).
Laki et al., "Scalable Per Subscriber QoS with Core-Stateless Scheduling", ACM SIGCOMM Industrial Demos, 2 pages (2018).
Nádas et al., "Stateless resource sharing in networks with multi-layer virtualization", 2019 IEEE International Conference on Communications (ICC), pp. 1-7 (May 20, 2019).
Nádas et al., "Towards core-stateless fairness on multiple timescales", Proceedings of the Applied Networking Research Workshop, pp. 30-36 (Jul. 22, 2019).
Fejes et al., "Decoupling delay and resource sharing targets with efficient core-stateless AQM", Proceedings of the ACM SIGCOMM 2019 Conference Posters and Demos, pp. 128-130 (Aug. 19, 2019).
Fejes et al., "Who will Save the Internet from the Congestion Control Revolution?", Proceedings of the 2019 Workshop on Buffer Sizing, Stanford University, 6 pages (2019), http://ppv.elte.hu/buffer-sizing/.
Fejes et al., "On the Incompatibility of Scalable Congestion Controls over the Internet", 2020 IFIP Networking Conference (Networking), IEEE, pp. 749-754 (Jun. 22, 2020), http://ppv.elte.hu/scalable-cc-comp/.
Nádas et al., A congestion control independent L4S scheduler. InProceedings of the Applied Networking Research Workshop, pp. 45-51 (Jul. 27, 2020).
Laki et al., "Core-Stateless Forwarding With QoS Revisited: Decoupling Delay and Bandwidth Requirements", IEEE/ACM Transactions on Networking 29, No. 2, pp. 503-516 (Dec. 9, 2020).
Fejes et al., "A Core-Stateless L4S Scheduler for P4-enabled hardware switches with emulated HQoS", IEEE INFOCOM 2021 Demo (Virtual), 2 p. (2021), http://ppv.elte.hu/ic21/.
Bemten et al., "Network Calculus: A Comprehensive Guide", Technical Report No. 201603, 57 pages (Oct. 8, 2016).
Charny et al., "Delay Bounds in a Network with Aggregate Scheduling", International Workshop on Quality of Future Internet Services 2000 (QoFIS'2000), Springer Berlin, Heidelberg, pp. 1-13 (Sep. 25, 2000).
Zhu et al., "Generic Multi-Access (GMA) Encapsulation Protocol", draft-zhu-intarea-gma-07, 13 pages (May 14, 2020).
Feng et al., "The BLUE active queue management algorithms", 19 pages, (Sep. 2002), http://www.researchgate.net/publication/3334841.
Mustafa Maad Hamdi et al., "A review on Queue Management Algorithms in Large Networks", IOP Conference Series: Materials Science and Engineering, vol. 1076, No. 1, p. 012034, 13 pages (Feb. 1, 2021), https://iopscience.iop.org/article/10.1088/1757-899X/1076/1/012034/pdf.
Nichols et al., "Definition of the Differentiated Services Field (DS Field) in the IPV4 and IPV6 Headers", IETF RFC 2474, 20 pages (Dec. 1998).
Ramakrishnan et al., "The Addition of Explicit Congestion Notification (ECN) to IP", IETF RFC 3168, 63 pages (Sep. 2001).
Amante et al., "IPv6 Flow Label Specification", IETF RFC 6437, 15 pages (Nov. 2011).

(56) References Cited

OTHER PUBLICATIONS

D. Black, "Relaxing Restrictions on Explicit Congestion Notification (ECN) Experimentation", IETF RFC 8311, 20 pages (Jan. 2018).
G. Fairhurst, "Update to IANA Registration Procedures for Pool 3 Values in the Differentiated Services Field Codepoints (DSCP) Registry", IETF RFC 8436, 7 pages (Aug. 2018).
Zhu et al., "Improving QoE for Skype Video Call in Mobile Broadband Network", 2012 IEEE Global Communications Conference (GLOBECOM), pp. 1938-1943 (Dec. 3, 2012).
Kanugovi et al., "Control Plane Protocols and Procedures for Multiple Access Management Services", IETF, draft-zhu-intarea-mams-control-protocol-02 (Jul. 3, 2017), 31 pages.
Li et al., "Multipath Transmission for Internet: A Survey", 39 p. IEEE Communications Surveys & Tutorials, vol. 18, No. 4, Fourth Quarter 2016, pp. 2887-2925 (Jun. 29, 2016).
"TCP Keep-Alives" in Braden, "Requirements for Internet Hosts—Communication Layers", IETF RFC 1122, section 4.2.3.6, pp. 101-102 (Oct. 1, 1989), 2 pages.
J. Zhu et al., "Generic Multi-Access (GMA) Encapsulation Protocol draft-zhu-intarea-gma-07", INTAREA/Network Working Group Draft, 13 pages (May 14, 2020), https://datatracker.ietf.org/doc/html/draft-zhu-intarea-gma-07.
S. Kanugovi et al., "Multi-Access Management Services (Mams)", IETF RFC 8743, 143 pages (Mar. 2020), https://www.rfc-editor.org/rfc/rfc8743.html.
International Search Report and Written Opinion mailed Oct. 6, 2021 for Int'l App. No. PCT/US2021/038063, 14 pages.
"3GPP; TSG SA; Study on enhanced support of Industrial Internet of Things (IIoT) in 5G System (Release 17)", 3GPP TR 23.700-20 V0.3.0 (Jan. 28, 2020).
Han-Chuan Hsieh et al., "5G Virtualized Multi-access Edge Computing Platform for IoT Applications", Journal of Network and Computer Applications, vol. 115, pp. 94-102 (May 10, 2018).
Boyd et al., "Convex Optimization", Cambridge University Press, Cambridge, UK, ISBN: 978-0-521-83378-3, 730 pages (Mar. 2004).
"Multi-access Edge Computing (MEC); Radio Network Information API", ETSI GS MEC 012 V2.1.1, 66 pages (Dec. 2019).
Ford et al., "TCP Extensions for Multipath Operation with Multiple Addresses", Internet Engineering Task Force (IETF), Internet Draft, draft-ietf-mptcp-multiaddressed-09, 62 pages (Jun. 6, 2012), https://datatracker.ietf.org/doc/html/draft-etf-mptcp-multiaddressed-09.
"Intel® Network Edge Virtualization (NEV) Software Development Kit", Intel Corp., Intel® Network Edge Virtualization Product Brief, 3 pages (Aug. 16, 2015), https://networkbuilders.intel.com/docs/Intel_Wireless_Product_Brief_for_IDF_v8.pdf.
"Simplify Application Development for the Network Edge", Intel Corp., Service Provider NFV, White Paper, 5 pages (Sep. 26, 2018), https://www.intel.com/content/dam/www/public/us/en/documents/white-papers/nev-sdk-white-paper.pdf.
"O-RAN Architecture Description", O-RAN Alliance, O-RAN-WG1-O-RAN Architecture Description, v01.00.00, 24 pages (Feb. 2020).
"O-RAN Working Group 2, AI/ML workflow description and requirements", O-RAN Alliance, ORAN-WG2.AIML, v01.00, 34 pages (Dec. 2019).
Singh et al., "Optimal Traffic Aggregation in Multi-RAT Heterogeneous Wireless Networks", IEEE ICC2016—Workshops: W09—Workshop on 5G RAN Design, 6 pages (Mar. 7, 2016).
Zhu et al., "Generic Multi-Access (GMA) Convergence Encapsulation Protocols", INTAREA/Network Working Group, Internet Draft, draft-zhu-intarea-gma-04, 10 pages (Sep. 30, 2019), https://datatracker.ietf.org/doc/pdf/draft-zhu-intarea-gma-04.
Zhu et al., "Generic Multi-Access (GMA) Convergence Encapsulation Protocols", INTAREA/Network Working Group, Internet Draft, draft-zhu-intarea-gma-05, 12 pages (Dec. 16, 2019), https://datatracker.ietf.org/doc/pdf/draft-zhu-intarea-gma-05.
International Search Report and Written Opinion mailed Apr. 15, 2021 for International Patent Application PCT/US2020/066969, 13 pages.
Office Action mailed Mar. 6, 2024 for U.S. Appl. No. 17/469,331, 96 pages.
G. Dommety, "Key and Sequence No. Extensions to GRE", Internet Engineering Task Force (IETF) RFC 2890, 7 pages (Sep. 2000).
A. Huttunen et al., "UDP Encapsulation of IPsec ESP Packets", Internet Engineering Task Force (IETF) RFC 3984, 15 pages (Jan. 2005).
A. Ford et al., "TCP Extensions for Multipath Operation with Multiple Addresses", Internet Engineering Task Force (IETF) RFC 6824, 64 pages (Jan. 2013).
N. Leymann et al., "Huawei's GRE Tunnel Bonding Protocol", Internet Engineering Task Force (IETF) RFC 81557, 44 pages (May 2017).
S. Kanugovi et al., "Multi-Access Management Services (MAMS)", Internet Engineering Task Force (IETF) RFC 8743, 143 pages (Mar. 2020).
J. Zhu et al., "Generic Multi-Access (GMA) Encapsulation Protocol", Internet Engineering Task Force (IETF) RFC 9188, 15 pages (Feb. 2022).

\* cited by examiner

MULTI-ACCESS MANAGEMENT SERVICE QUEUEING AND REORDERING TECHNIQUES

TECHNICAL FIELD

The present application is generally related to Edge computing, network communication, and communication system implementations, and in particular, to Multiple Access Management Services (MAMS) systems/networks and Generic Multi-Access (GMA) frameworks.

BACKGROUND

Multiple Access Management Services (MAMS) is a programmable framework that provides mechanisms for flexible selection of network paths in a multi-connection (access) communication environment based on application needs and/or requirements. The MAMS framework can be supported by an Edge computing system/network, such as ETSI MEC or the like. Additionally, the Third Generation Partnership Project (3GPP) Fifth Generation (5G) system architecture has been extended to support functionality similar to MAMS, which is referred to as Access Traffic Switching, Steering, and Splitting (ATSSS).

BRIEF DESCRIPTION OF THE DRAWINGS

In the drawings, which are not necessarily drawn to scale, like numerals may describe similar components in different views. Like numerals having different letter suffixes may represent different instances of similar components. Some implementations are illustrated by way of example, and not limitation, in the figures of the accompanying drawings in which.

DETAILED DESCRIPTION

Figure 1:
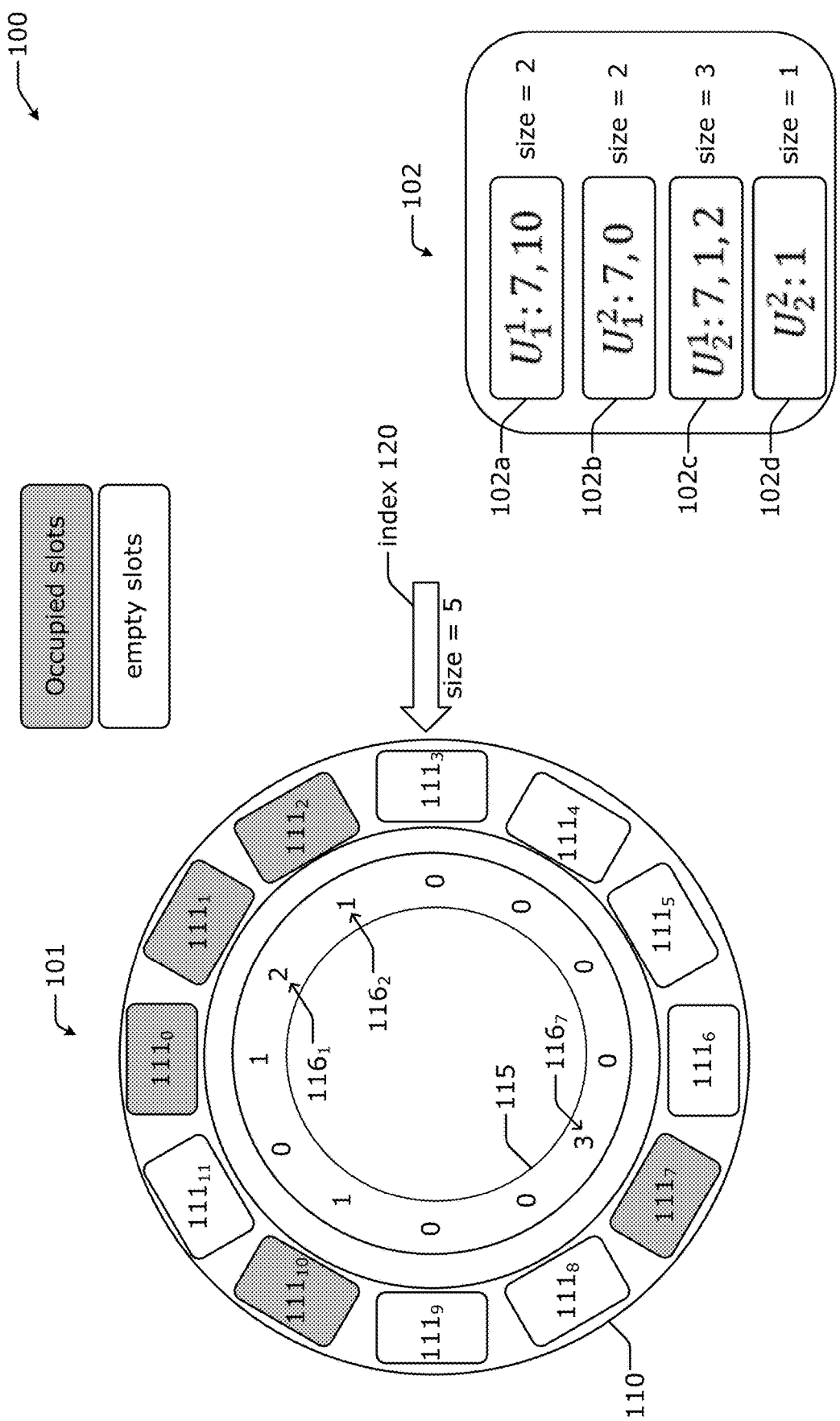
FIG. 1 depicts an example of the packet processing for the virtual queues.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the present disclosure. However, it will be apparent to those skilled in the art having the benefit of the present disclosure that the various aspects of the present disclosure may be practiced in other ways that depart from the specific details discussed herein. In certain instances, descriptions of well-known devices, circuits, and methods are omitted so as not to obscure the description with unnecessary detail.

1. Buffer, Queue, and Packet Reordering Management Techniques

1.1. Dynamic Multi-Queue Management

Network devices store packets in transmit (Tx) and receive (Rx) queues to store packets for various traffic/network-related operations such as for traffic scheduling and reordering. For example, packets scheduled for transmission are buffered in a Tx queue until a transmission opportunity is available, and received packets can be stored in an Rx queue for reasons such as reordering. Usually, a Tx or Rx queue can be referenced by an associated port number. In multi-access (MA) communication networks, network devices capable of utilizing multiple access networks and/or multiple links (referred to as "MA nodes" or "MA devices") may have a Tx queue and an Rx queue for each link or connection (e.g., e.g., links 905 and 906 in FIG. 9). MA devices may deploy K number of queues, where K is the number of links and/or users. In order to manage Quality of Service (QoS) of individual instances (e.g., users, etc.) and/or individual links, the number of queues extends to K×N, where N is the number of instances (e.g., users, etc.), assuming that all instances (e.g., users, etc.) also connect to all of the links. Consequently, the MA device ends up allocating more memory/storage resources for the K×N queues.

One existing/conventional queue management technique involves using a single shared queue where a network device implements one Tx queue for transmit operations and one Rx queue for receive operations despite packets belonging to different users or links. One downside of the shared queue technique is that this technique cannot guarantee the QoS of each user or link. In this case, a single shared queue only requires L×B memory space, where L is the maximum number of queue items per queue, and B is the number of bytes allocated to each queue item.

Another existing/conventional queue management technique involves using separate queues for individual users, where each queue has a static size. For example, some network access nodes (NANs) (e.g., NANs 910 discussed infra) may deploy a separate queue per user for QoS reasons. Consequently, the memory consumption for all the per-user queues combined is N×L×B, where N is the number of users. Additionally, MA devices may also deploy separated queues for each radio link that they currently use or may potentially use, which extends the memory requirement to K×N×L×B, where K is the number of radio links. One challenge of using separated queues in MA devices is the high memory demand at least in comparison to the single shared queue management technique. One solution to this issue is to reduce the size of L. However, the consequence of reducing L is that the separate queues may overflow frequently and dramatically reduce the throughput of the system.

Another conventional queueing technique involves using multiple queues where each of these queues have a dynamic size (sometimes referred to as "variable length buffers" or "elastic buffers"). This technique involves using dynamic memory allocation for different queue sizes. That is, whenever a packet is pushed/popped from a queue, the memory to store that packet is allocated/freed from the queue. Although this method requires no memory for empty queues, the frequent operations for allocating and freeing up of memory spaces are computationally heavy and/or complex tasks, which may deteriorate system performance especially for devices with relatively small computing power (e.g., mobile devices, IoT devices, wearables, and the like).

In addition to the drawbacks of the static and dynamic size queueing techniques, multi-queue techniques require duplicating broadcast messages for storage in each queue (e.g., duplicating the same packet K×N times), which is not computationally or memory resource efficient.

The present disclosure provides multi-queue management techniques and technologies that use/consume fewer resources (e.g., memory/storage resources) than existing queue management techniques. In particular, the multi-queue management techniques discussed herein provides K×N virtual queues that share a physical buffer. In embodiments, the physical buffer is allocated a fixed or static size, or has a fixed memory space, and is used to manage the multiple virtual queues. In various implementations, the physical buffer is implemented as a circular or ring buffer. In these ways, the multi-queue management techniques discussed herein can realize the benefits of both the single shared queue and dynamic sized multi-queue systems, which improves memory utilization efficiency in comparison to existing queue management systems and techniques. Additionally, the embodiments discussed herein allow QoS and/or reliability to be provided for individual instances with a similar memory requirement(s) in comparison to a single shared queue.

The queuing techniques discussed herein (see e.g., discussion of ring buffer 101 and virtual queues 102 infra) may be implemented using or in conjunction with any suitable buffer and/or queue technology such as, for example, message-oriented middleware (MOM) or a message queuing services (e.g., Advanced Message Queuing Protocol (AMQP), Simple (or Streaming) Text Oriented Message Protocol (STOMP), MQTT (formerly MQ Telemetry Transport), Extensible Messaging and Presence Protocol (XMPP), Apache® Kafka, and/or the like), network scheduling and/or congestion control services, flow control services, and/or the like. Additionally or alternatively, any suitable data storage techniques or technologies may be used to implement the queuing technologies discussed herein such as, for example, relational, non-relational systems (e.g., key-value stores, attribute-value stores, schema-less, NoSQL etc.), graph, columnar (also known as extensible record (e.g., HBase)), object, tabular, tuple store, hash table, and/or multi-model data storage technologies.

For purposes of the following discussion, an "instance" may refer to a process, a thread, an object, a database entity/element, a user, an application (app) instance, a session, a service (or set of services), a connection or link (e.g., links 905, 906, 907, 1011, 1021, 1023, interconnect (IX) 2156, etc.), a system or device (e.g., a network device, MX node, and/or any other device such as those discussed infra with respect to FIGS. 9-22), and/or any other like entity. Furthermore, a "multi-queue manager" or "MQM" in the following discussion may refer to any network device or MA node such as, for example, any one of clients 901, 1001, 2011, 2021; access network(s)/NAN(s) 910A-B, 1031, 2031-2033; server(s) 940; GMA Tx entity 1310, GMA Rx entity 1311; network functions (NFs) in CN 950A, 1041, CN 2042; GWs 950B, 1420A, 1420B, 1450, MAMS system 1035, network elements and/or devices in DN 970 and/or DN 975; edge compute node(s) 2036; cloud 2044, compute node 2150; software distribution platform 2205; processor platform(s) 2200; and/or any other software (SW) element/ entity and/or a hardware element/entity device as any of those discussed herein. Moreover, a "link" in the following discussion may refer to a radio access technology (RAT) used to convey information (e.g., WiFi, 3GPP LTE, 3GPP 5G/NR, Bluetooth®, and/or the like), a wired or wireless communication link, connection, or channel (e.g., links 905, 906, 907, 1011, 1021, 1023, and/or the like); a communication path including multiple links, connections, or channels between a source and destination; an interconnect (e.g., IX 2156) between two or more components; an application or network session; and/or a particular service used to convey information (e.g., a type of communication service such as email, instant messaging, short message service (SMS), social media network, etc., or a specific service or application such as Skype® provided by Microsoft®, Gmail® provided by Google®, and so forth).

FIG. 1 depicts an example multi-link queue 100 including a ring buffer 101 and virtual queues 102 according to various embodiments. In this example, a multi-queue manager (MQM) stores packets in a ring buffer data structure 101 to support multiple threads and/or instances. In embodiments, the ring buffer 101 is allocated a fixed amount memory and/or a static memory location to store data (e.g., data packets). In some implementations, the fixed memory area/ region for the ring buffer 101 may be defined in terms of a buffer start location/address and a buffer capacity or length. In some implementations, the MQM may implement individual ring buffers 101 for transmission data streams and reception data streams (e.g., a Tx ring buffer 101 separate from an Rx ring buffer 101).

The ring buffer 101 includes an outer ring 110 and an inner ring 115. The outer ring 110 includes a set of slots 111 (or "queue items 110") logically arranged in a circle or ring shape. The outer ring 110 includes L number of queue items (slots) 111. In the example of FIG. 1, there are twelve slots 110 (e.g., L=12) labeled 0 to 11 (e.g., slots $111_0$ to $111_{11}$).

where the shaded slots 110 store data (or are "occupied") and unshaded slots 110 do not currently store data (or are "unoccupied"). Each slot 111 stores a predefined or configurable amount of data (or packets). In some implementations, each queue item 111 is allocated B bytes of memory. The inner ring 115 contains item counts 116, each of which corresponds to a slot 111 (note that not all item counts 116 are labeled in FIG. 1 for the sake of clarity). In FIG. 1, item count $116_1$ corresponds to slot $111_1$, item count $116_2$ corresponds to slot $111_2$, and item count $116_7$ corresponds to slot $111_7$. The item counts 116 include or indicate the number of virtual queues 102 that hold the packet stored in the corresponding slot 111. For example, item count $116_7$ has a value of "3" because three virtual queues 102 store a virtual index to slot $111_7$ (e.g., virtual queues 102a, 102b, and 102c include a slot index 7). The parameter item_count[i] returns a number of copies of a packet that are stored in the i-th slot 111 (e.g., slot $111_i$), or returns the number of virtual queues 102 that store a virtual (queue) index to the i-th slot 111 (e.g., slot $111_i$). Additionally, the parameter queue[i] returns the packet stored in the i-th slot 111 (e.g., slot $111_i$). Furthermore, a write index 120 is used to indicate an available (or unoccupied) slot 111 in which an incoming packet may be stored.

In contrast to the conventional shared queue technique, the memory addresses for packets belonging to the same instance to be communicated (e.g., sent or received) over the same link are stored in a corresponding virtual queue 102 (e.g., one of virtual queues 102a, 102b, 102c, or 102d). Here, each virtual queue 102 is allocated to an individual instance (e.g., a thread, process, object, database entity, user, session, app instance, device, etc.) and an individual link. Each virtual queue 102 may be labeled "$U_A^B$", where "A" is the instance allocated to the virtual queue 102 and "B" is the link allocated to the virtual queue 102. For example, virtual queue 102a is labeled "$U_1^1$" which is allocated to instance 1 and stores data to be conveyed over link 1, and virtual queue 102b is labeled "$U_1^2$" which is allocated to instance 1 and stores data to be conveyed over link 2.

Each virtual queue 102 stores a slot index that references a slot 111 that stores a packet to be conveyed over a specific connection. The slot index may also be referred to as a "queue index", a "virtual packet", a "ring buffer index", and/or the like. The slot index is used to reference or otherwise indicate a slot 111 (or a memory address corresponding to a particular slot 111) for a packet belonging to the same instance to be communicated over an individual link. The slot index may be any suitable data value including text, numerals, and/or the like. In some implementations, the slot index may be or include a reference to the memory location storing the data packets associated with a corresponding instance and/or connection/link. Additionally or alternatively, the queue index may be an identifier (ID) associated with the instance (e.g., instance ID), a hash of the instance ID, or calculated/computed using any suitable mechanism. Whenever data (or a data packet) is to be copied or moved from one queue (e.g., a first virtual queue 102) to another queue (e.g., a second virtual queue 102), the MQM copies or moves the slot index instead of the packet itself. This reduces the amount of memory space needed to implement multiple queues for individual instances and links, which is the case for MX nodes in MX communication environments such as those discussed infra with respect to FIGS. 9-20.

Conventional ring buffers are usually implemented using a pointer, a read (start) index, and a write (end) index. Here, a write operation writes an element to the write (end) index position and increments the write (end) index to the next buffer position. Additionally, a read operation reads an element from the read (start) index position, and increments the read (start) index to the next buffer position. By contrast, the ring buffer 101 of multi-link queue 100 utilizes push and pop function calls (e.g., push function call 200 and push function call 300 of FIGS. 2 and 3, respectively) to allow different instances and/or links to access the data (packets) in their virtual queues 102 independent of accesses of other virtual queues 102 by other instances. Moreover, the ring buffer 101 supports multi-instance operation, where different instances (e.g., threads, processes, etc.) can access the ring buffer 101 simultaneously. For example, the push and pop function calls can be called at the same time in (or by) different instances (e.g., threads).

In various embodiments, the MQM maintains the following parameters: K is the number of links connected to the subject device (e.g., K=2 in the example of FIG. 1); N is the number of instances (e.g., objects, processes, threads, users, sessions, app instances, device, etc.) that communicates with the subject instance (e.g. 1000, or N=2 in the example of FIG. 1); L is the maximum number of queue items (slots) 111 per queue (e.g. 1000, or L=12 in the example of FIG. 1); B is the memory allocated to each queue item (slots) 111 in bytes or some other unit (e.g., 2000 bytes); queue[i] returns the i-th packet(s) stored in the ring buffer 101; item_count[i] returns the number of virtual queues 102 that store the packet in the i-th slot $111_i$ (or store a slot index referencing the i-th slot $111_i$); $U_A^B$ is a virtual queue 102 that stores the slot index for an instance A to be conveyed over a link B; queue_size is the number of occupied slots 111 in queue[i]; and index is an index 120 (or other pointer) pointing to the next available slot 111 in the ring buffer 101 for storing data or a packet. In some implementations, the parameter item_count[i] may be equal to 0 or 1 for Rx queue(s) 100. Additionally or alternatively, the parameter item_count[i] may be in a range of [0, K×N] for Tx queue(s) 100. Additionally or alternatively, the parameter item_count[i] equals 1 if a packet is scheduled for one instance over a single link. Additionally or alternatively, the parameter item_count[i] equals K×N if a packet is scheduled for broadcast to all instances across all links.

In some implementations, when all of the slots 111 are occupied (e.g., queue_size=L), the MQM can drop one or more virtual indexes from one or more virtual queues 102 based on a queue management drop policy and/or active queue management (AQM) technique. Examples of such drop policies and/or AQM techniques include drop front (or tail drop), drop front (or front drop), random early detection (RED), adaptive RED (ARED), robust RED (RRED), stabilized RED (SRED), explicit congestion notification (ECN), controlled delay (CoDel), Packet First in First Out (PFIFO), Blue, Stochastic Fair Blue (SFB), Resilient SFB (RSFB), Random Exponential Marking (REM), modified REM (M-REM), RED with Preferential Dropping (RED-PD), Common Applications Kept Enhanced (CAKE), smart queue management (SQM), Proportional Rate-based Control (PRC), proportional integral (PI) controller, and/or some other queue management/AQM technique (e.g., including those discussed in [AC7128-US]) or combinations thereof. The virtual queues 102 may also release some or all of the packets and forward them to higher layers if the MQM performs a reordering procedure or the like such as the hierarchical reordering techniques discussed herein. Moreover, the total number of packets (including the copied and/or duplicate packets) in all of the virtual queues 102 can be computed according to equation (1).

$$\sum_{i=0}^{L-1} \text{item\_count}[i] \qquad (1)$$

Figure 2:
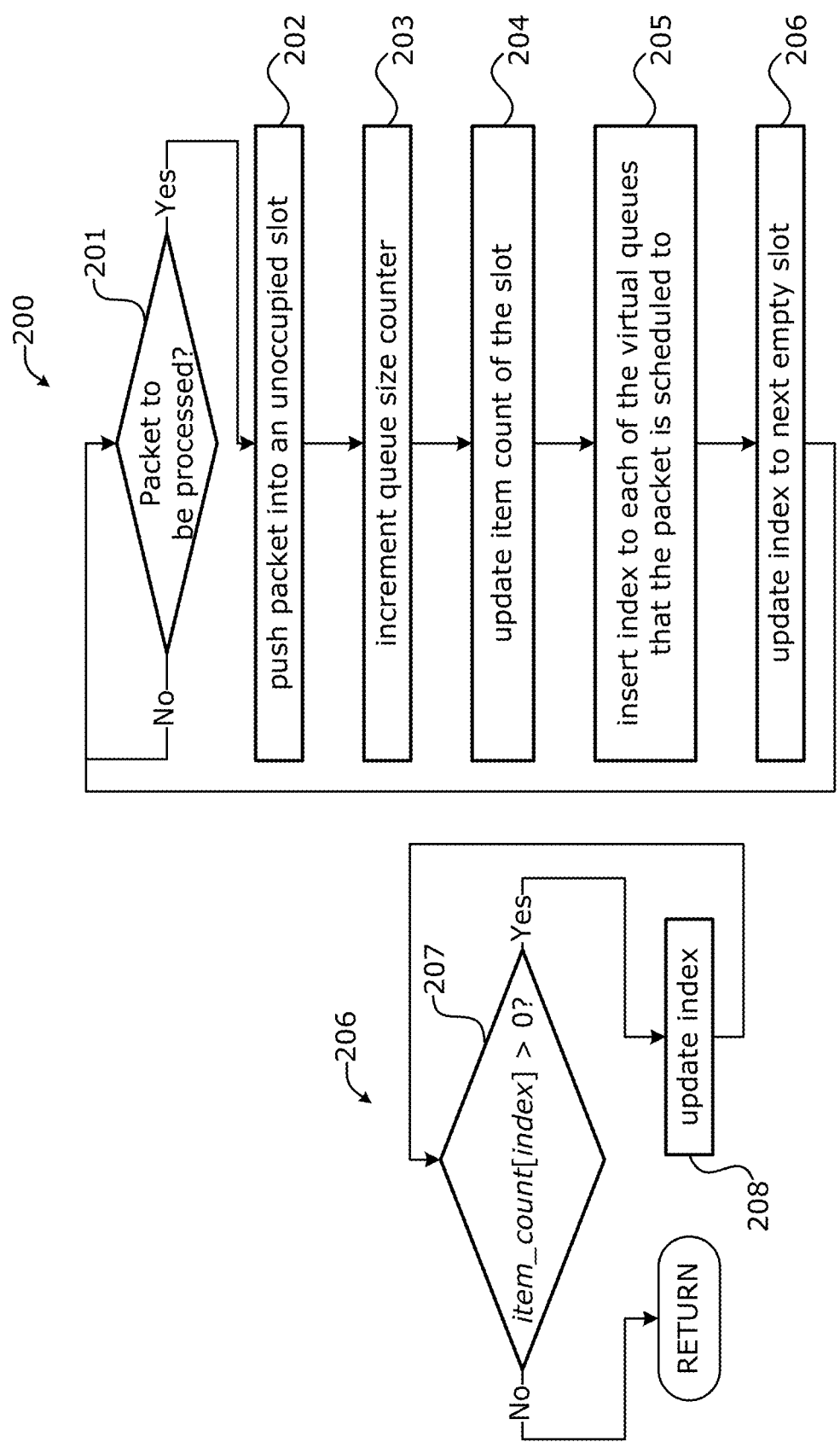
FIG. 2 depicts an example push process for managing virtual queues.

FIG. 2 shows an example push function call process 200 according to various embodiments. Process 200 (push function call) may be performed when a packet is to be pushed into one or more virtual queues 102. Process 200 begins at operation 201 where an MQM determines whether there is a packet to be processed (e.g., for transmission over a subject link or the like). If there are no packets to be processed, the MQM loops back to perform operation 201 to continue to monitor for packets to process. If there is a packet to process, the MQM proceeds to operation 202 to push the packet into an empty or unoccupied slot 111 in which the packet can be stored (e.g., queue[index], where index is the write index 120 that points to or otherwise indicates an empty or unoccupied slot 111). At operation 203, the MQM increments the queue size counter (e.g., queue_size=queue_size+1). At operation 204, the MQM updates the item count 116 by the number of the slot 111 to which the packet is sent or otherwise stored in. In some implementations, the item count 116 is updated based on the number of virtual queues 102 that the packet is to be "stored in" or otherwise assigned to (e.g., item_count[index]=item_count[index]+T, where T is the number of virtual queues 102 that the packet (or slot index for the packet) is sent to/stored in (e.g., T=1 for Rx virtual queues 102)).

At operation 205, the MQM inserts the slot index of the slot 111 storing the packet to each of the virtual queues 102 to which the packet is scheduled/stored in. Here, the slot index may be the same as the write index 120. At operation 206, the MQM updates the write index 120 to the next queue slot 111 that can store data or packets (e.g., an empty or unoccupied slot 111). In some implementations, the next queue slot 111 may be a completely empty or unoccupied slot 111, or may be partially empty/unoccupied (e.g., a slot 111 having enough space to store an additional packet or fragment of a packet). In some implementations, operation 206 includes operation 207 where the MQM determines whether the item count 116 of the next empty slot 111 is greater than zero, and if so, updates the write index 120 at operation 208. If the item count 116 is not greater than zero, the MQM returns to process 200 (or ends process 200). Additionally or alternatively, operation 206 can include calculating a modulus of the increment of the write index 120 and the maximum number of slots 111 L (e.g., while (item_count[index])>0) {index=(index+1) % L} where "%" is the modulo operation). After operation 206, the MQM proceeds back to detect a next packet to process at operation 201. In some implementations, a specific condition or criteria, if met, may cause may cause process 200 to end or terminate.

Figure 3:
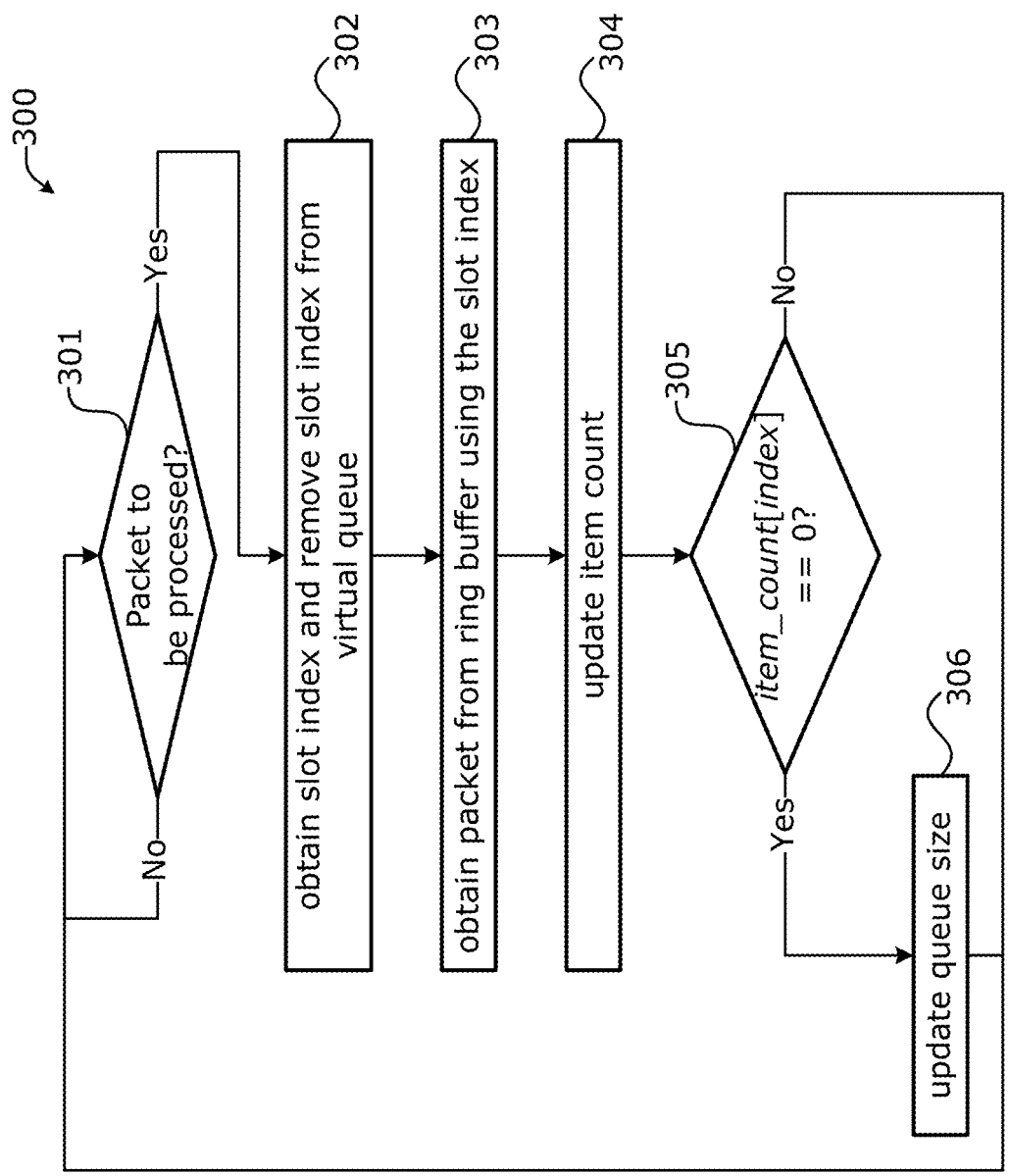
FIG. 3 depicts an example pop process for managing virtual queues.

FIG. 3 shows an example push function call process 300 according to various embodiments. Process 300 (pop function call) may be performed when a packet is to be released from a virtual queue. Process 300 begins at operation 301 where an MQM determines whether there is a packet to be processed (e.g., for reordering and/or to be provided to an application, service, or higher layers in a protocol stack, etc.). If there are no packets to be processed, the MQM loops back to perform operation 301 to continue to monitor for packets. If there is a packet to process, the MQM proceeds to operation 302 to identify or obtain a slot index from a virtual queue 102, and removes the slot index from the virtual queue 102. At operation 303, the MQM obtains the packet from the ring buffer 101 using the obtained slot index (e.g., queue[index], where index is the obtained slot index). At operation 304, the MQM updates the item count parameter 116 of the slot 111 from which the packet is obtained (e.g., item_count[index]=item_count[index]-1). At operation 305, the MQM determines whether the item count 116 for the slot 111 is zero (e.g., item_count[index]==0), and if so, the MQM updates the queue size parameter (e.g., if (item_count[index]==0) {queue_size=queue_size-1}), and then proceeds back to operation 301 to process a next packet, if any. If at operation 305 the item count 116 for the slot 111 is not zero, then the MQM proceeds back to operation 301 to process a next packet, if any. In this way, when the item count 116 for the slot 111 reduces to 0, the slot 111 becomes available for storing a new packet. When the item count 116 for a slot 111 is zero, the packet is no longer needed for any of the links of any virtual queues 102, and therefore, the corresponding memory (slot 111) and reused for storing/buffering other packets. In some implementations, a specific condition or criteria, if met, may cause may cause process 300 to end or terminate.

1.1.1. Virtual Transmit Queue Processing

Figure 4:
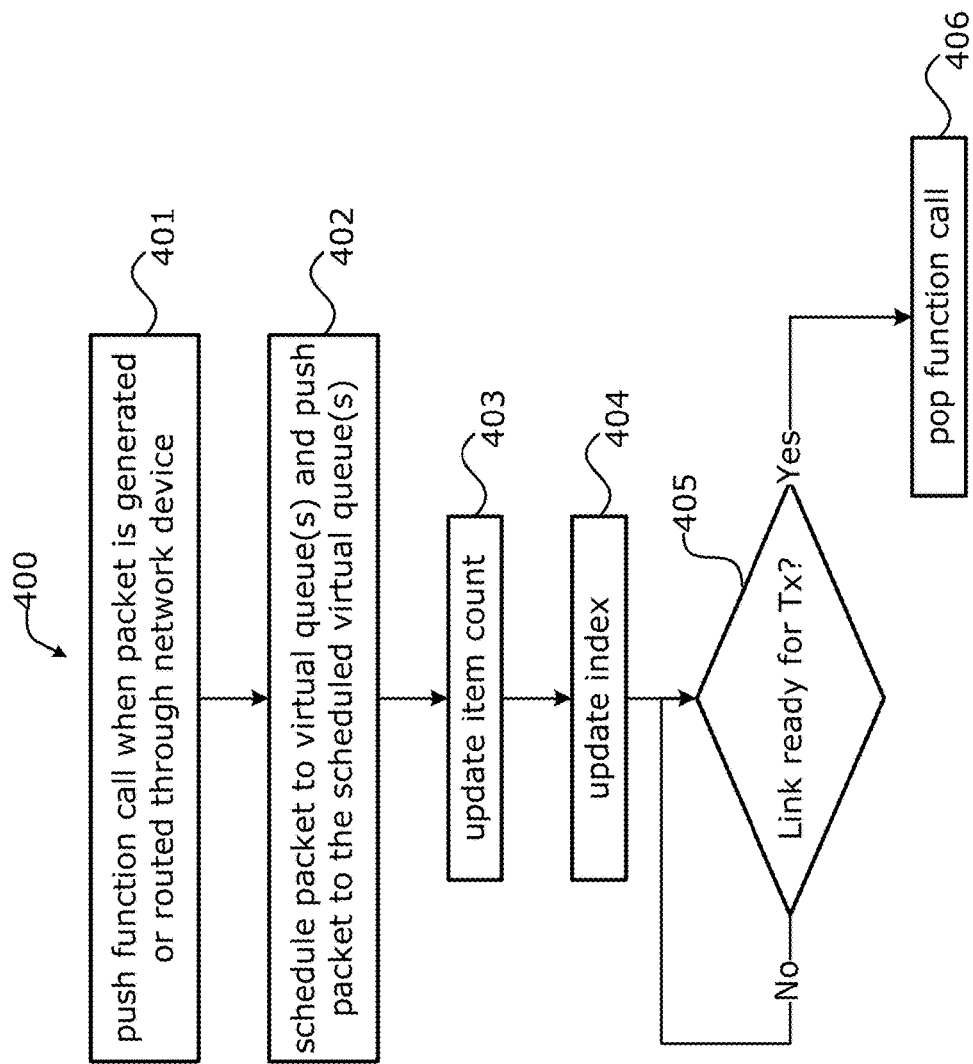
FIG. 4 depicts an example process for processing Tx virtual queues.

FIG. 4 shows an example packet processing process 400 for Tx virtual queue(s) 102 according to various embodiments. Process 400 is described with reference to the example of FIG. 1. Process 400 begins at operation 401, when a packet is generated or scheduled to be routed over (or through) a network device, the MQM stores the packet in a scheduled or designated virtual queue 102 using the push function call (e.g., process 200 of FIG. 2). The example of FIG. 1 includes two instances (e.g., N=2), two links (e.g., K=2), a maximum number of queue items 110 per queue is 12 (e.g., L=12), and the slot index is 7 when a packet arrives for storage in the buffer 101. At operation 401, the MQM stores the packet in the ring buffer 101 at the 7th slot $111_7$ (e.g., queue[7]).

At operation 402, the MQM schedules the packet to one or more virtual queues 102 and pushes the packet into the scheduled one or more virtual queues 102. In the example of FIG. 1, the MQM schedules the packet to three virtual queues including $U_1^1$, $U_1^2$, and $U_2^1$, and pushes slot index 7 into these three virtual queues (e.g., $U_1^1$:7, $U_1^2$:7, and $U_2^1$:7 as shown by the virtual queues 102a, 102b, and 102c). At operation 403, the MQM updates the item count parameter. In the example of FIG. 1, the MQM sets the item_count [7] to 3. At operation 404, the MQM updates the write index 120. In the example of FIG. 1, the MQM updates the write index 120 to 8 to point to slot $111_8$. After operation 404, the push operation ends or repeats as necessary.

At operation 405, the MQM determines whether a link is ready for transmission (e.g., using a configured resource allocation or Tx schedule for cellular RATs, performing energy detection and/or clear channel assessment for WLAN (e.g., WiFi) RATs, pinging a server or the like when the link is part of a service, etc.). If the link is not ready for transmission (e.g., the channel is occupied), at the MQM loops back to perform operation 405 to continue to monitor or detect when the packet can be transmitted over the link. When a link (e.g., link 1) is ready for transmission of a packet for a user (e.g., user 1), at operation 406 the MQM calls the pop function call (e.g., process 300 of FIG. 3). Here, the MQM obtains or identifies the first element in the virtual queue 102a (e.g., slot index 7), removes it from the virtual queue 102a ($U_1^1$), and the packet stored in slot $111_7$ (e.g., queue[7]) is returned for transmission over link 1 (e.g., operations 301 and 302 of FIG. 3). Then, the MQM updates the item count 116 (e.g., operation 303 of FIG. 3). In this example, the item_count[7] (item count $116_7$ in FIG. 1) is reduced to 2, indicating there are still two copies of the packet in two other virtual queues 102 (e.g., virtual queues 102b and 102c). After all other virtual queues 102 release index 7, item_count[7] becomes 0 (e.g., operations 304 and 305 of FIG. 3). This indicates the seventh slot $111_7$ in the ring buffer 101 is available for storing a new packet.

1.1.2. Virtual Receive Queue Processing

The operations for processing packets for Rx virtual queues 102 are almost the same as the operations used for Tx virtual queues 102 as discussed previously with respect to FIG. 4. One difference is that in some implementations, the item count parameter 116 (e.g., item_count[i]) of Rx virtual queues 102 is 0 or 1. In these implementations, when a packet is released from a virtual queue 102, the occupied slot 111 can be used again immediately. Moreover, for the reordering algorithm described in [AD7258-US], the MQM reduces the memories to O(L×B)+O((K−1)×N×L×b). In other words, the Rx virtual queues 102 only require K−1 queues to reorder packets received over K individual links. Here, b is the size of index i in bytes (or some other suitable unit). Table 1.1.2-1 shows a comparison of the queue management techniques discussed herein versus conventional queue management techniques.

TABLE 1.1.2-1

Comparison of different methods for queue management

| Queue Technique | Memory size/ allocation in big O notation | Queue operations (push/pop) |
|---|---|---|
| single physical queue (no control of traffic at per user at link level) | O(L × B) | light computation |
| multiple physical queues with static size | O(K × N × L × B) | light computation |
| multiple physical queues with dynamic size | O(L × B) | perform allocate/free memory operations, which are computation heavy |
| multiple virtual queues 102 | O(L × B) + O(K × N × L × b) | light computation |

In one example implementation where the number of links is 2 (K=2), the number of users is 1000 (N=1000), the number of packets per queue is 1000 (L=1000), and the size of each packet (bytes per packet) is 2000 bytes (B=2000), then 4 gigabytes (GB) of memory is needed (e.g., K×N×L× B) if using per-UE/per-link physical queues. By contrast, the amount of memory needed when using the virtual queue techniques discussed herein is reduced to 6 megabytes (MB) for implementations using the same K, N, L, and B parameters and the size of index i is 2 bytes (b=2).

1.1.3. Index Management for Virtual Queues

Figure 5:
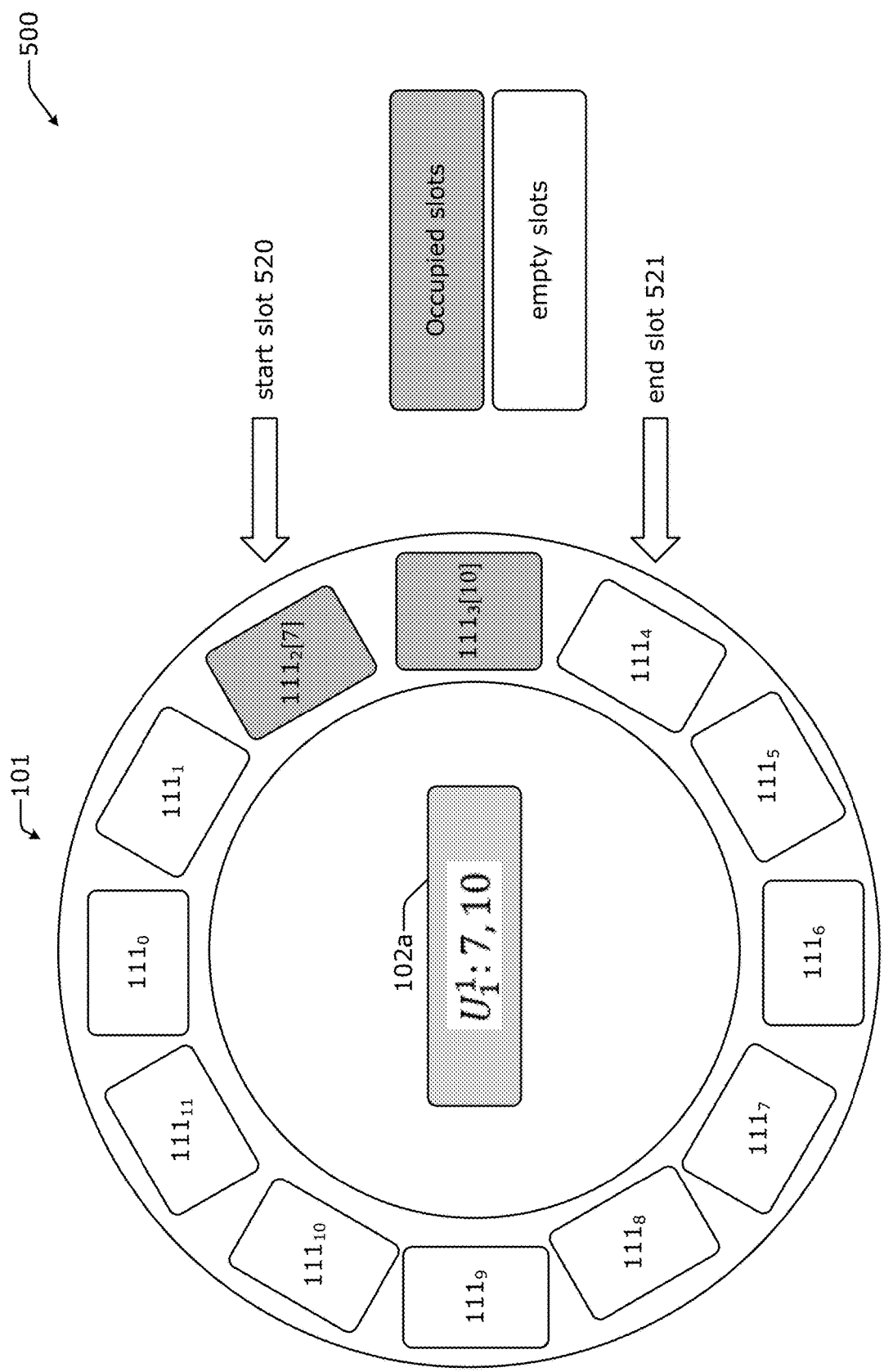
FIG. 5 depicts an example of the index operations for managing virtual queues.

FIG. 5 shows example of index operations 500 for managing virtual queues 102 according to various embodiments. The example of FIG. 5 demonstrates the management of a subject virtual queue 102 in the ring buffer 101, where the subject virtual queue 102 is virtual queue 102a discussed previously with respect to FIG. 1. In the example of FIG. 5, the number of packets per queue is 12 (L=12), and for each virtual queue $U_A^B$, a static memory of size b×L is used to store the (ring buffer) "index", where b is the byte size of "index" (e.g., an individual slot index). As alluded to previously, the ring buffer 101 allows the pop and push functions (see e.g., FIGS. 2 and 3) to be called in different instances (e.g., threads) at the same time. The start slot 520 (start_slot) is the location (slot 111) of a first stored slot index of the subject virtual queue 102, and the end slot 521 (end_slot) is the location (slot 111) of the next available (unoccupied) slot 111 in which to store a new slot index. The virtual queue is empty when a value of the start slot 520 parameter is the same as the value of the end slot 521 parameter (e.g., start_slot=end_slot).

In embodiments, an instance or thread using the push call function (see e.g., FIG. 2) updates the end slot 521 (end_slot) as follows: (1) push the slot index into the end slot 521 of the subject virtual queue 102 (e.g., virtual_queue [end_slot]), and (2) update the parameter end_slot (e.g., end_slot=(end_slot+1) % L). The instance or thread using the push call function may be referred to as a "writing instance" or "writing thread".

As an example, in FIG. 5 when the buffer 101 is empty, the parameter start_slot and the parameter end_slot may hold a value of 2 to point to slot $111_2$. The MQM starts by adding a first packet to the subject virtual queue 102a ($U_1^1$) by pushing slot index 7 to a slot 111 referenced by the parameter end_slot (e.g., slot $111_2$, virtual_queue[2]). Then, the MQM updates the parameter end_slot to hold a value of 3 to point to slot $111_3$, which becomes a next slot 111 of the subject virtual queue 102a. Here, the parameter start_slot stays unchanged (e.g., start_slot=2), which is now the start slot 520 for the subject virtual queue 102a. The MQM then adds a next packet to the subject virtual queue 102a ($U_1^1$) by pushing slot index 10 to a slot 111 referenced by the parameter end_slot (e.g., slot $111_3$, virtual_queue [3]), and then updates the parameter end_slot to hold a value of 4 to point to slot $111_4$. This process may continue until there are no other packets to add to the subject virtual queue 102a.

In embodiments, an instance or thread using the pop call function (see e.g., FIG. 3) updates the start slot 520 (start_slot) as follows: (1) return, identify, or otherwise obtain the slot index stored in the start slot 520 (e.g., virtual_queue[start_slot]), and (2) update the parameter start_slot (e.g., start_slot=(start_slot+1) % L). The instance or thread using the pop call function may be referred to as the "reading instance" or the "reading thread".

Continuing with the previous example where the subject virtual queue 102a ($U_1^1$) stores slot index 7 and slot index 10 (e.g., represented as "$U_1^1$: 7, 10" in FIG. 5), the parameter start slot (start slot 520) points to slot $111_2$, and the parameter end slot (end slot 521) points to slot $111_4$. When processing the packets "stored" in the subject virtual queue 102a, the MQM retrieves the first slot index from the subject virtual queue 102a (e.g., slot index 7, or virtual_queue[2]). Then, the MQM updates the parameter start_slot to hold a value of 3 to point to slot $111_3$, which is the next slot 111 of the subject virtual queue 102a. When the next pop action is called (see e.g., FIG. 3), slot index 10 stored in slot $111_3$ (e.g., virtual_queue[3]) is returned. Then, the MQM updates the parameter start slot to hold a value of 4 to point to slot $111_4$, which in this example is the end slot 521 (e.g., start_slot=end_slot=4). Since the parameter start slot has a same value as parameter end slot, the subject virtual queue 102a is empty.

1.2. Hierarchical Multi-Link Reordering Techniques

Figure 12:
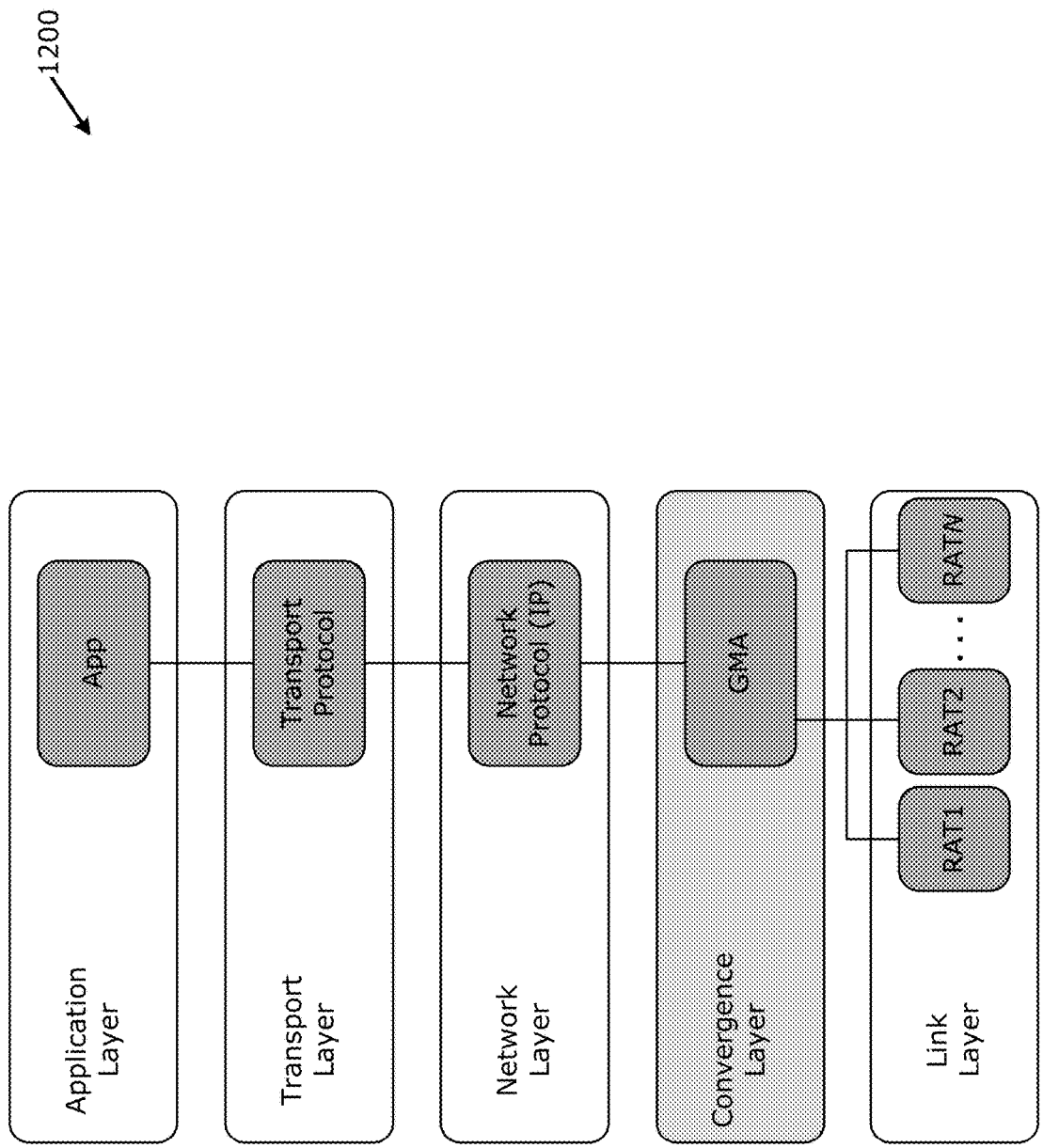
FIG. 12 depicts a Network model with convergence layer.

As mentioned previously, a network device (or MA node) may simultaneously connect to multiple networks using individual links of the same or different RATs (e.g., LTE, WiFi, 5G, etc.), but only one of the multiple links is active for data transmission. According to various embodiments, a convergence layer protocol (e.g., [GMA14]) is used to address this issue. As shown by FIG. 12, a GMA entity operates within the convergence layer between the network layer and link layer. The GMA entity improves Quality of user Experience (QoE) by dynamically allocating data over multiple networks. There are two key entities at the convergence layer including a transmitter (Tx) entity and receiver (Rx) entity. The Gc and/or Gs entities (discussed infra) can be either a GMA Tx entity and/or a GMA Rx entity.

The GMA Tx entity can perform one or more of the following operations: steering (e.g., moving data traffic from one connection to another), splitting (e.g., splitting data traffic and send them over multiple connections), and duplication (e.g., sending duplicated copies of user data traffic over multiple connections). The GMA Rx entity performs end-to-end (e2e) QoS measurements (e.g., loss, delay, throughput, etc.) based on received data and/or control packets. The GMA Rx entity also reorders out-of-order packets arriving from (over) different connections/links, and eliminates redundant packets.

The present disclosure provides techniques for reordering out-of-order packets during inter-RAT and intra-RAT traffic steering. Inter-RAT traffic steering involves traffic steering between two connections having different RATs (e.g. LTE RAT and WiFi RAT), and Intra-RAT traffic steering involves traffic steering between two connections of the same RAT (e.g., two WiFi RATs, two 5G/NR RATs, etc.). In embodiments, the reordering process starts when traffic is steered from one connection to another, and ends when all packets sent over the previous connection are delivered.

1.2.1. Reordering Techniques for Traffic Steering

A generic reordering technique for all types of inter-RAT and/or intra-RAT traffic steering are defined in U.S. application Ser. No. 17/561,897 ("[AE0292-US]"), the contents of which are hereby incorporated by reference in its entirety. In embodiments, the hierarchical multi-link reordering procedure discussed herein does not depend on control messages because a GMA Tx may not transmit any control messages prior to traffic steering, or the control message may be lost. For example, if a client (e.g., MX client 901) detects the first RAT (e.g., WiFi) link is lost, the client may immediately change its uplink data connection to a second RAT (e.g., LTE) link.

In embodiments, an Rx (e.g., GMA Rx) entity will start the reordering process whenever a data packet is received over a connection different from a connection used to receive previous data packet. The delivery connection of a data packet may be obtained from the information in a GMA header (see e.g., [GMA14] and FIGS. 18 and 19 discussed infra). The information in the GMA header may include, for example, a connection identifier (ID) (e.g., for inter-RAT scenarios), and/or source IP and port number of the delivery tunnel packet header (e.g., for intra-RAT scenarios). Additionally or alternatively, a new one-bit intra-RAT steering flag can be added to the GMA header to explicitly trigger the Rx entity to start intra-RAT reordering. In these implementations, the Tx entity flips the bit of the intra-RAT steering flag (e.g., from 1 to 0, or from 0 to 1) when sending packets over a new (e.g., intra-RAT) connection. In response, the Rx entity triggers intra-RAT reordering, accordingly.

In embodiments, the Rx entity stops the reordering process if any of the following conditions are met: (1) the end marker from the old (previous) connection is received; (2) the first packet from the new connection is in order; and/or (3) the first packet from the new connection has waited in the reordering buffer for reordering timeout (RTO).

In some implementations, an RTO timer may be set to a predefined or configured value (e.g., 100 milliseconds (ms) or the like). Additionally or alternatively, the RTO timer value may be based on one-way delay (OWD) measurements of the old connection ($T_{old}$) and OWD measurements of the new connection ($T_{new}$). $T_{new}$ can be measured by the Rx entity as the difference between receipt time and transmission time, which can be obtained from the timestamp field in the GMA header (see e.g., [GMA14] and FIGS. 18 and 19 discussed infra). Additionally or alternatively, the $T_{old}$ can be approximated using the maximum or average OWD of all packets delivered over the old connection in a previous amount of time (e.g., 2 seconds or the like). Additionally or alternatively, the $T_{old}$ can be approximated using the OWD measurement of the last packet delivered over the old connection. Other methods for measuring or inferring the OWD can be used. If the OWD measurements ($T_{old}$, $T_{new}$) are available, the Rx entity can set or update the RTO timer according to equation (2).

$$c \times (T_{old} - T_{new}) \qquad (2)$$

In equation (2), $T_{new}$ is the OWD of a first packet received via a new or different connection, $T_{old}$ is the estimated OWD of the old (previously used) connection, and c is a configurable RTO factor or parameter (e.g., 1.5 or the like). In some implementations, the Rx truncates the updated RTO timer value in the range of [0, $RTO_{max}$], where $RTO_{max}$ is a predefined or configured maximum RTO value. In some implementations, since only the one-way-delay difference is of interest, the Tx and Rx entities are not required to be synchronized in time. It should be noted that the terms "old" and "new" with respect to the different connections do not denote a time of establishment or age of the technology used. Instead, the terms "old" and "new" in the context of different connections is meant to distinguish connection from one another based on a relative time during which packets over those connections.

Figure 6:
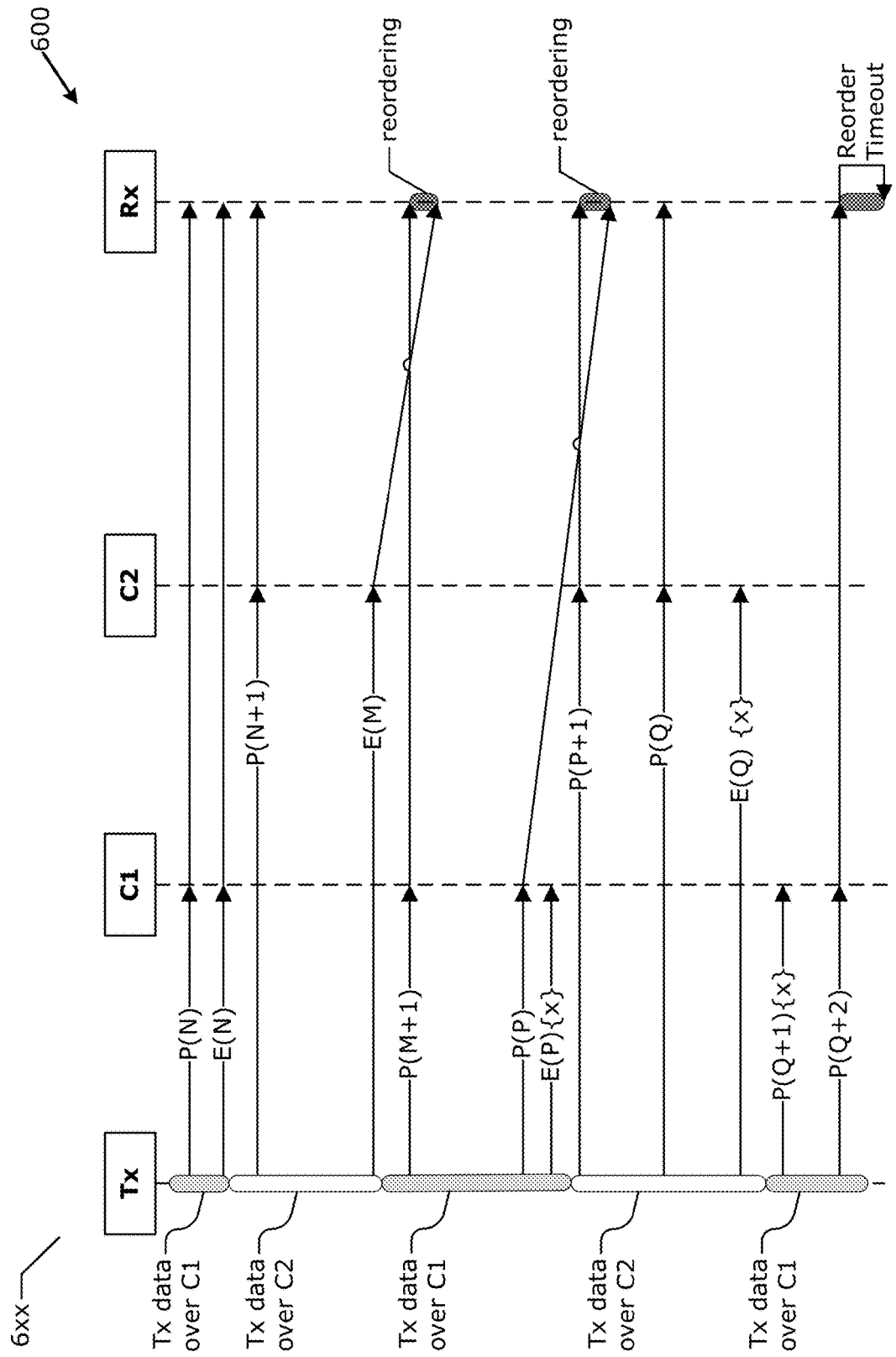
FIG. 6 depicts an example reordering procedure for traffic steering.

FIG. 6 depicts an example reordering procedure 600 for traffic steering according to various embodiments. The procedure 600 is performed among a transmitter (Tx) (e.g., a GMA Tx) and receiver (Rx) (e.g., a GMA Rx) over two connections including a first connection (C1) and a second connection (C2). The connections C1 and C2 may be links of the same RAT or links of different RATs.

Procedure 600 begins with the Tx sending a packet with a SN of N (where N is a number) over C1 (labeled "P(N)" in FIG. 6, where "P" refers to "packet" or "PDU", and "N" refers to a value of the SN), and eventually sends an end maker (EM) with a sequence number (SN) of N over C1 (labeled "E(N)" in FIG. 6, where "E" refers to "end marker" or "EM", and "N" refers to a value of the SN). The EM is a packet indicating the end of data delivery over a connection (e.g., the connection used to convey the EM packet). The EM indicates that data is (or will be) steered away from the connection after transmitting one or more EM packets. In some implementations, the EM is a packet with an empty payload section, but keeps GMA header fields such as the SN field. The EM packet may be a data (user plane) packet or a control packet. In this example, the EM includes the same SN as the previously sent data packet (e.g., the value of "N"). In other implementations, the EM SN is always set to the SN of the previously sent packet (e.g., the last/previous SN over the old (previous) connection).

In this case, when the Tx steers traffic from C1 to C2, reordering is not started because the Rx receives the EM (e.g., "E(N)") over C1 prior to the first data packet being received over C2 (e.g., "P(N+1)"). From the Rx's perspective, C1 is terminated before C2 is activated, and therefore, there is no need for packet reordering.

Next, the Tx sends a packet with an SN of N+1 over C2 (e.g., "P(N+1)"), eventually sends an EM with an SN of M (where M is a number) over C2 (e.g., "E(M)"), and then sends a packet with an SN of M+1 over C1 (e.g., "P(M+1)"). Here, reordering is started at the Rx when P(M+1) arrives via the new connection (e.g., C1) and ends when the E(M)

arrives via the old connection (e.g., C2 in this example). In this example, the EM is delayed due to longer one-way delay via C2.

The Tx then sends data with an SN of P (where P is a number) over C1 ("P(P)"), and then sends an EM with an SN of P over C1 ("E(P)"), which goes missing or is otherwise not received by the Rx (as indicated by "{x}" in FIG. 6). Then, the Tx sends a packet with an SN of P+1 over C2 ("P(P+1)"). Here, reordering is started when P(P+1) arrives via the new connection (e.g., C2 in this example) and ends when the P(P) arrives at the Rx via the old connection (e.g., C1 in this example). Although the E(P) is lost, reordering will still take place because all packets before P(P+1) (e.g., packets having an SN smaller or less than P+1) have been received at the Rx. In other words, P(P+1) becomes in-order.

At some point later, the Tx sends a packet with an SN of Q (where Q is a number) over C2 ("P(Q)"), and then sends an EM with an SN of Q over C2 ("E(Q)"), which goes missing or is otherwise not received by the Rx. Next, the Tx sends a packet with an SN of Q+1 over C1 ("P(Q+1)"), which goes missing or is otherwise not received by the Rx. Then, the Tx sends another packet with an SN of Q+2 over C1 ("P(Q+2)"), which is eventually delivered to the Rx. Here, reordering is triggered when P(Q+2) arrives via the new connection (e.g., C1 in this example), and ends after an RTO is declared or otherwise takes place (e.g., at the expiration of an RTO timer). This is because both P(Q+1) and the E(Q) are lost.

1.2.2. Receiver Initiated Traffic Steering Enhancements

Figure 7:
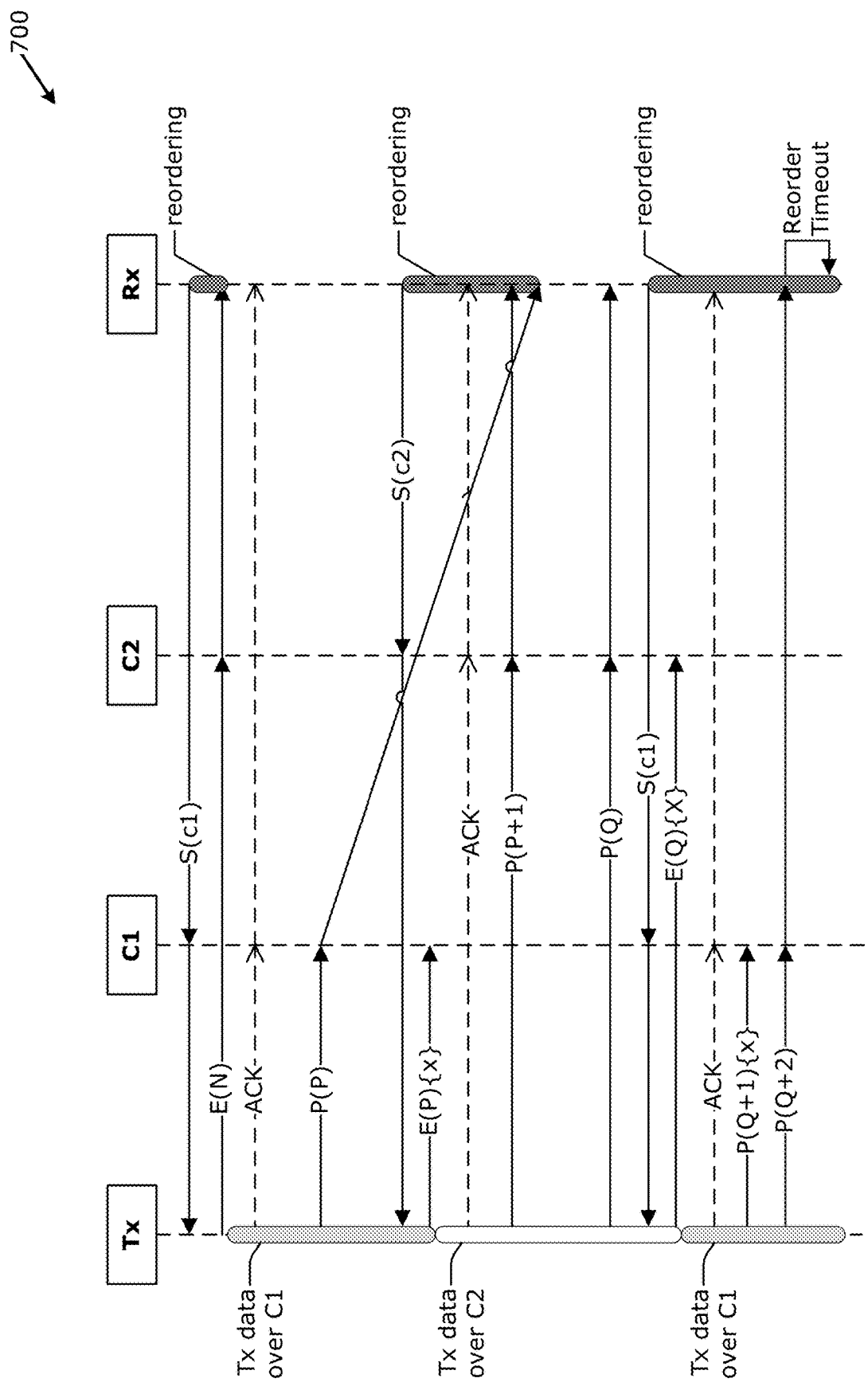
FIG. 7 depicts an example enhanced reordering procedure for receiver-initiated traffic steering.

In some cases, the Rx selects a connection for data transmission based on the qualities of available connections, an example of which is shown by FIG. 7. FIG. 7 depicts an example enhanced reordering procedure 700 for Rx-initiated traffic steering according to various embodiments. Procedure 700 begins by the Rx sending a traffic steering request message to the Tx over C1 ("S(c1)" in FIG. 7, where "S" represents a steering request message and "c1" represents the requested connection C1). Additionally or alternatively, the traffic steering request is sent over the connection that is being requested (e.g., C1 in this example). After receiving the traffic steering request, the Tx sends an EM with an SN of N (where N is a number) ("E(N)") over the old connection (e.g., C2 in this example), and eventually begins transmission over the requested connection (e.g., C1 in this example). This may include sending an acknowledgement message (ACK) over the requested connection (e.g., C1 in this example), and then sending a packet with an SN of P ("P(P)") over the requested connection (e.g., C1 in this example).

For such Rx initiated traffic steering, the generic reordering process can be enhanced by having the Rx start the packet reordering process when the traffic steering control message is sent. With this enhancement, RX does not inspect the connection. For example, in FIG. 7 the Rx begins the reordering process when sending S(c1).

Additionally, the Rx sends another traffic steering request message to the Tx over C2 ("S(c2)" in FIG. 7) because, for example, a OWD of C1 as measured by the Rx. In response, the Tx sends an EM with an SN of P (where P is a number) over C1 ("E(P)"), which is not received by the Rx, and then the Tx sends an ACK over C1. Next, the Tx sends a packet with an SN of P+1 over C2 ("P(P+1)"), which is received at the Rx before P(P). The delay in processing these packets is reduced since the reordering process was initiated when the Rx sent S(c2).

In another example, after the Tx sends a packet with SN of Q (where Q is a number) over C2 ("P(Q)"), the Rx sends another traffic steering request message to the Tx over C2 ("S(c1)"). Subsequently, the Tx sends an EM with an SN of Q ("E(Q)") over the old connection (e.g., C2 in this example), which is not received by the Rx, and then the Tx sends an ACK over the requested connection (e.g., C1 in this example). Next, the Tx sends a packet with an SN of Q+1 over C1 ("P(Q+1)"), which goes missing or is otherwise not received by the Rx. Then, the Tx sends another packet with an SN of Q+2 over C1 ("P(Q+2)"), which is eventually delivered to the Rx. Here, reordering has been ongoing since the transmission of S(c1) and ends after an RTO is declared or otherwise takes place (e.g., at the expiration of an RTO timer).

In some implementations, the steering request message is an MX Traffic Steering Request or an MX Traffic Steering Response as discussed in [RFC8743] and [AE0292-US]. Additionally or alternatively, the steering request message is a probe message (e.g., an MX probe request or MX probe ACK message) as discussed in [RFC8743], [UPMAMS], and [AE0292-US]. The probe message is mainly used for path quality measurements (e.g. round trip time (RTT) and the like). Additionally or alternatively, the steering request message is a Traffic Splitting Update message (TSU) as discussed in [RFC8743], [UPMAMS], and [AE0292-US]. The TSU carries traffic splitting/steering configuration parameters (e.g., split ratio, and the like) and is used to configure traffic splitting/steering for one or multiple flows. In an example, a GMA entity (e.g., the Rx entity in FIG. 7) may steer traffic to link x by setting the split ratio of link x to be 1 and the split ratio of other links to be 0.

A TSU may include the following parameters: a flow ID to identify the flow; K[i] (where i=1, . . . , N) is the number of packets sent over the i-th link per traffic splitting cycle, where N is the number of delivery connections; and L is the total number of packets per traffic splitting cycle. The TSU may include an individual field for each link (e.g., K[1] for a first link, K[2] for a second link, and so forth). In an example, if K[1]=K[2]=5 and L=10, for every 10 packets, 5 packets will be sent over a first delivery connection (RAT1) and the remaining 5 packets will be sent over a second delivery connection (RAT2). In another example, if K[1]=K[2]=L=1, every packet will be sent over both connections (e.g., duplication). In another example, setting K[1]=L=1 and K[2]=0 will send all packets over the first connection (RAT1) only, and setting K[2]=L=1 and K[1]=0 will send all packets over the second connection (RAT2) only.

In some implementations, the ACKs mentioned previously may be Traffic Splitting ACKs (TSAs), which are acknowledgement messages used to confirm the successful reception of TSUs. A TSA carries a timestamp for OWD measurement, and also carries a "StartSN" parameter per-flow. The StartSN is a sequence number of the first packet using the traffic splitting configuration provided by a corresponding TSU. Additionally or alternatively, the aforementioned ACKs may be MX traffic steering responses messages, MX probe ACK messages, and/or the like.

1.2.3. Enhancement for Hierarchical (Inter-RAT and Intra-RAT) Reordering

The reordering mechanisms also account for inter-RAT and intra-RAT traffic steering being performed at the same time. For example, this may occur when a GMA entity performs inter-RAT traffic steering traffic (e.g., from WiFi to LTE, or vice versa), and also decides to steer from intra-RAT traffic steering (e.g., from a first WiFi connection to a second WiFi connection). One issue that can arise is that the Rx entity cannot determine whether a received EM is for inter-RAT traffic steering or intra-RAT traffic steering.

To address such issue, a new one-bit flag can be added to any of the packet formats discussed herein (e.g., including those used for EM packets), where a first value (e.g., a value of "0") indicates that the packet (e.g., EM packet) is used for intra-RAT traffic steering and a second value (e.g., a value of "1") indicates that the packet (e.g., EM packet) is used for inter-RAT traffic steering. Moreover, reordering can be performed in a multi-level hierarchical manner. As a result, the Rx entity may have up to one inter-RAT reordering and N intra-RAT reordering processes running simultaneously, where N is the number of RATs that supports intra-RAT traffic steering.

Figure 8:
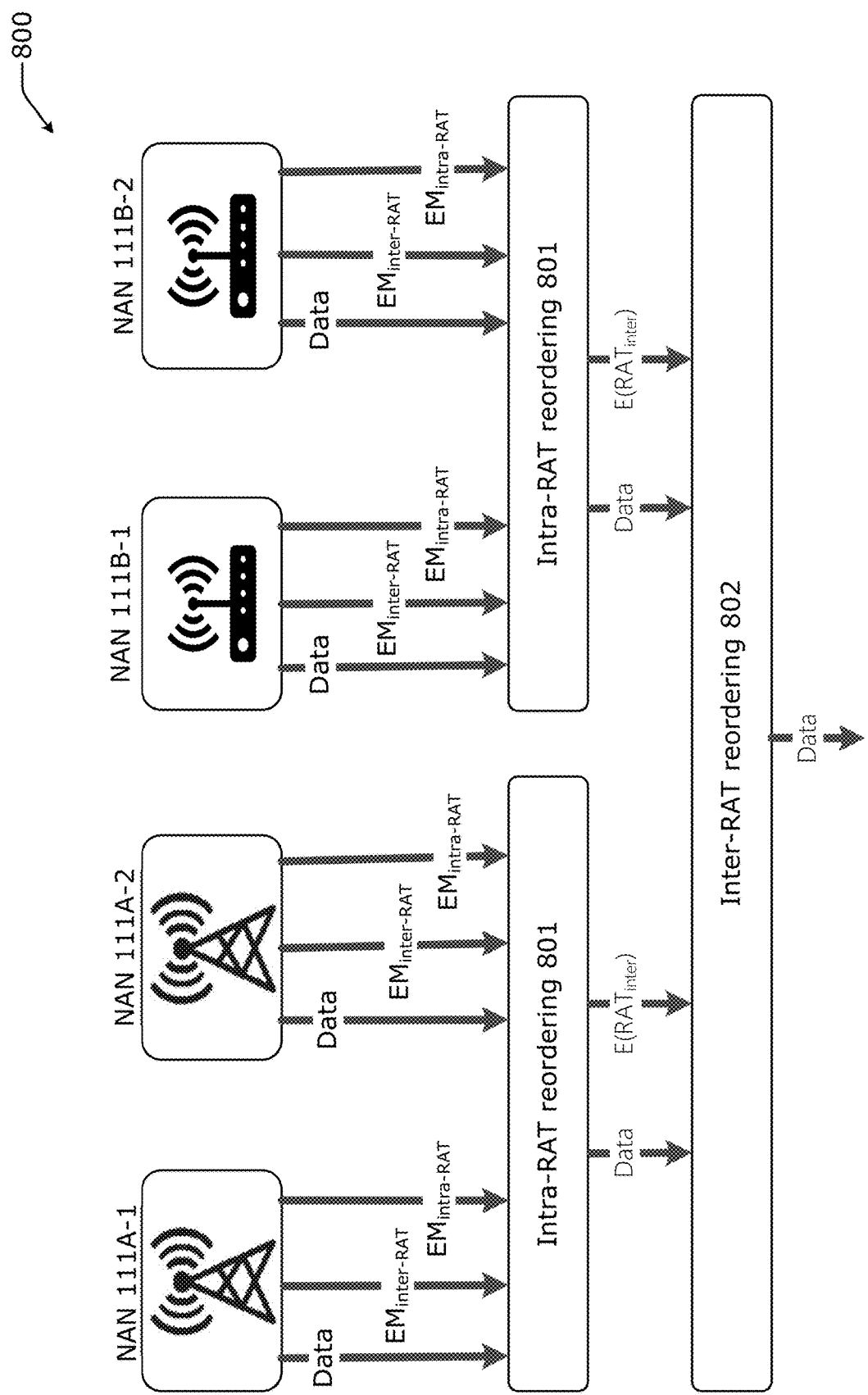
FIG. 8 depicts an example of simultaneous inter-RAT and intra-RAT reordering.

FIG. 8 shows an example hierarchical reordering pipeline 800 for simultaneous inter-RAT and intra-RAT reordering, according to various embodiments. At an inter-RAT reordering stage 801, packets are received over different connections (links) of the same RAT, and intra-RAT reordering is performed first. An intra-RAT EM ($EM_{intra-RAT}$) is used to terminate the intra-RAT reordering, and will not be delivered to the next stage. Additionally, inter-RAT EMs ($EM_{inter-RAT}$) are treated as a normal packets, and are delivered in order. Since inter-RAT EMs ($EM_{inter-RAT}$) carry the same SN of last data packet and transmitted as a last packet over an old connection, the inter-RAT EM will always be placed at the end of the other packets after reordering. At the inter-RAT reordering stage 802, inter-RAT EMs ($EM_{inter-RAT}$) are used to terminate inter-RAT reordering. Stages 801 and 802 can use reordering procedure 600 or procedure 700.

2. Multi-Access Management Services (MAMS) and Generic Multi-Access (GMA)

Today, a device (e.g., mobile stations, user equipment (UEs), etc.) can be simultaneously connected to multiple communication networks based on different technology implementations (including different Radio Access Technologies (RATs)) and network architectures. In such multi-connectivity scenarios, it may be desirable to combine multiple access networks or select the best one to improve quality of experience (QoE) for a user and improve overall network utilization and efficiency. An access network is the segment in a network that delivers user data packets to a client via an access link such as a WiFi airlink, an cellular airlink, or DSL. The overall QoE perceived by the end users as well as utilization of the resources can be optimized with smart selection and combination of the paths used for the user plane (UP). In an advanced solution, the network paths can be dynamically selected based on knowledge of current conditions in the relevant access networks. The Multiple Access Management Services (MAMS) framework enables the smart selection and flexible combination of access and core network paths based on defined policies. By use of up-to-date information from available access networks, the best possible network efficiency and end user QoE perception based on application needs can be guaranteed. The MAMS framework can be used to flexibly select the combination of uplink (UL) and downlink (DL) access and core network paths having an optimal performance, and UP treatment for improving network utilization and efficiency and enhanced QoE for user applications (apps). With the MAMS framework, the optimal network paths can selected on UP level without any impact on the control plane signaling of the underlying access networks. Additional aspects of the MAMS framework are discussed in Kanugovi et al., "Multi-Access Management Services (MAMS)", Internet Engineering Task Force (IETF), Request for Comments (RFC) 8743 (March 2020) ("[RFC8743]"), the contents of which are hereby incorporated by reference in its entirety.

Figure 9:
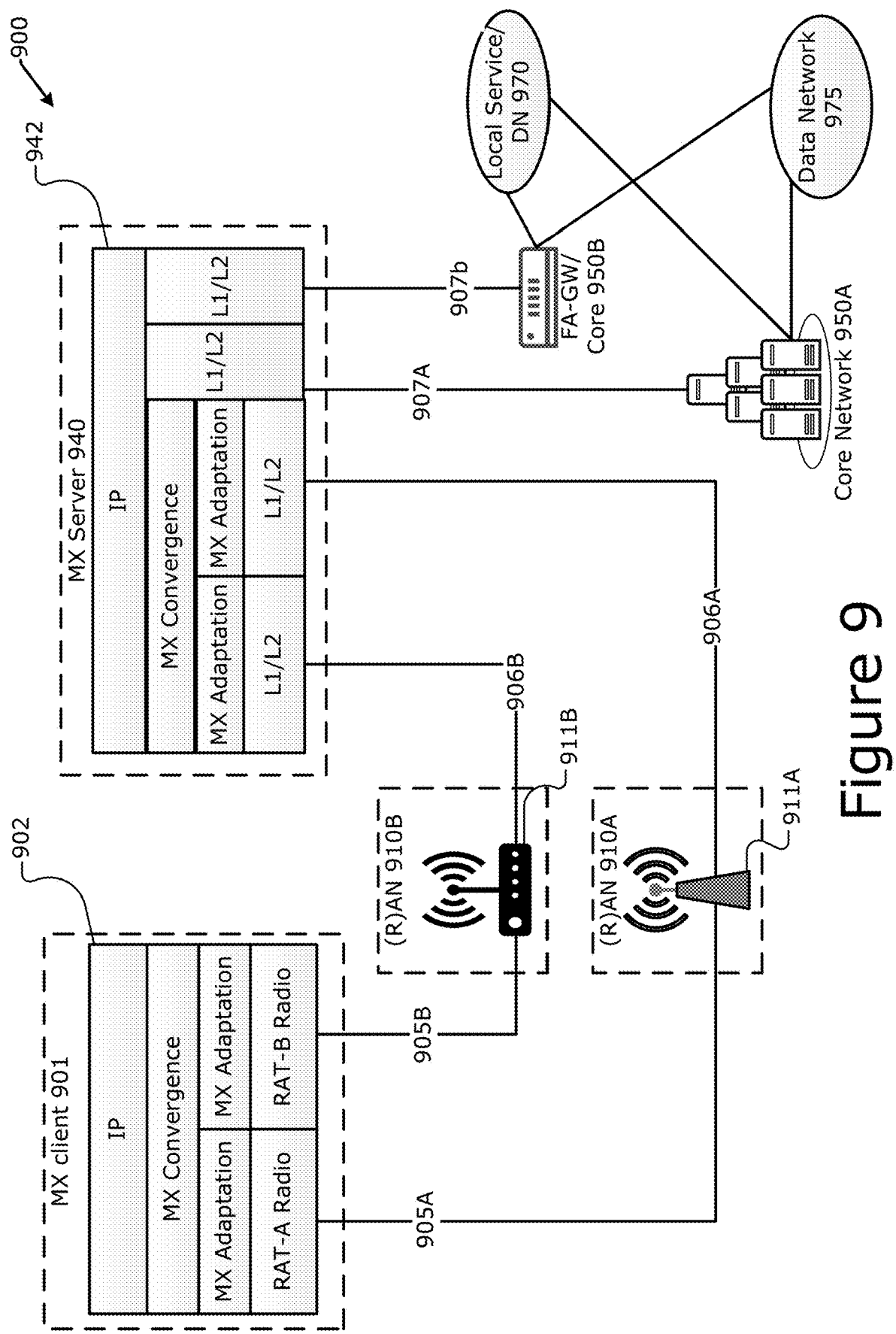
FIG. 9 depicts an example multi-access network utilizing Multiple Access Management Services (MAMS).

FIG. 9 depicts an example multi-access ("MX" or "MA") network 900 utilizing MAMS technology. In particular, FIG. 9B shows a MAMS e2e UP protocol stack in the MX network 900, which includes both WiFi and 3GPP-based access. In this example, an MX client 901 includes a UP protocol stack 902 and a server 940 includes a UP protocol stack 942.

The MX client 901 is an end-user device that supports connections with one or more access nodes, possibly over different access technologies (or RATs), and is also referred to as a user station, user device, user equipment (UE), or multi-radio UE 901. The client 901 may be a multiconnectivity client 901 that has, or supports, multiple network connections.

The MX server 940 (or "MAMS server 940") provides MAMS-related user-plane (UP) functionalities and/or optimizations in the network 900. The MX server 940 handles aggregation of multiple network paths 905, 906, 907, and/or the forwarding of user data traffic across multiple network paths 905, 906, 907. The MX server 940 may also be referred to as an MX gateway and/or a Network Multi Access Data Proxy (N-MADP) (see e.g., N-MADP 1037 in FIG. 10). Throughout the present disclosure, the MX server 940 may be referred to as server 940, a MAMS server 940, MA server 940, edge node 940, MEC host 940, MAMS-MEC system 940, or similar. When the client 901 transmits packets to the server 940, the client 901 may be referred to as a "MAMS transmitter," "MX transmitter," or the like, and the server 940 may be referred to as a "MAMS receiver," "MX receiver," or the like. When the client 901 receives packets from the server 940, the client 901 may be referred to as a "MAMS receiver," "MX receiver," or the like, and the server 940 may be referred to as a "MAMS transmitter," "MX transmitter," or the like.

In some implementations, the MAMS server 940 runs in an edge compute node of a suitable edge computing framework. For example, the edge compute node may be one or more edge servers, edge platforms, edge hosts, etc. Additionally or alternatively, the MX server 940 may be one or more edge applications (apps) operated by one or more edge compute nodes. Examples of suitable edge computing frameworks include [MEC], [SA6Edge], [O-RAN], [ISEO], and the like. Additionally or alternatively, the MX server 940 can be operated by a cloud computing system, service, or platform, and/or as a distributed app operated by a cloud service.

The MX UE 901 (or "multi-radio UE 901") accesses or otherwise communicates with a data network (DN) 975 or local service 970 (also referred to as a local DN 970) via one or more (radio) access networks ("(R)ANs") 910 and the server 940. Each (R)AN 910 is a segment in a network that delivers user data packets to the client 901 and/or server 940 via access link(s) 905, which may be a wired connection (e.g., Ethernet, DSL, Coax, USB, and/or the like) or a wireless (radio) connection (e.g., WiFi airlink, 5G/NR airlink, LTE airlink, and/or the like). Each of the (R)ANs 910 implement an access technology ("AT"), which is the underlying mechanism(s) used to access a corresponding network.

In some implementations, the AT is a fixed access (wired) technology such as Ethernet, digital subscriber line technologies (DSL or xDSL); G.hn; coaxial cable access ("coax") such as Multimedia over Coax Alliance (MoCA), Data Over Cable Service Interface Specification (DOCSIS), and/or the like; powerline communication ("PLC" or "powerline") such as high definition (HD)-PLC and/or the like; Fiber to the x (FTTX; also referred to as "fiber in the loop"); Passive Optical Network (PON); and/or the like. Here, (R)AN node 911 may be a broadband modem (e.g., cable modem, DSL modem, an Optical Network Terminal (ONT) or an Optical Network Unit (ONU), G.hn semiconductor device, etc.), which may be used in combination with customer premises equipment (e.g., home/enterprise router(s), residential/enterprise gateway(s), mesh network device(s), WiFi access point(s), etc.). The fixed AN node 911 connects the client 901 to the access network 910 via an access connection 905 that operates according to an access protocol (e.g., Ethernet, V.35, Universal Serial Bus (USB) and/or Ethernet over USB, Point-to-Point Protocol over Ethernet (PPPoE), Internet Protocol over Ethernet (IPoE), G.hn, DOCSIS, and/or the like). Here, the access connection 905 may include one or more wires (e.g., telephone wiring, coax, power lines, plastic and/or glass optical fibers, and/or the like), and the particular wires used may depend on the underlying AT and/or infrastructure.

In other implementations, the AT may be a radio access technology (RAT) such as 3GPP Long Term Evolution (LTE), 3GPP Fifth Generation (5G)/New Radio (NR), MulteFire, ETSI Global System for Mobile Communications (GSM), WiFi®, Worldwide Interoperability for Microwave Access (WiMAX) (sometimes referred to as "wireless broadband" or "WiBro"), and/or the like. (R)ANs 910 could also encompass personal area network technologies such as Bluetooth® or Bluetooth Low Energy (BLE), IEEE 802.15.4 based protocols (e.g., 6LoWPAN, WirelessHART, MiWi, Thread, etc.), WiFi-direct, and/or the like. Each (R)AN 910 includes one or more (R)AN nodes 911, which may be macro cell base stations, remote radio heads (RRHs), small and/or micro cell base stations, access points (APs), home gateways (HGs), and/or other like network elements. A collection of (R)AN nodes 911 may also be referred to as an "access level edge network" or "access level edge." The (R)AN nodes 911 are configurable or operable to perform setup of transport resources, (e.g., for CDN services and/or other application level services) as well as scheduling signaling resources for providing network service of the underlying access network/RAT. Here, the access connection 905 may include wireless or air interfaces based on the underlying RAT (e.g., Uu-interface for LTE or 5G/NR RATs, PC5 interface for LTE or 5G/NR RATs, WiFi air interface for WLAN RATs, millimeter wave (mmWave) interface, Visible Light Communication (VLC) interface, and/or the like).

Each (R)AN 910a, 910b includes one or more respective network access nodes (NANs) 911a, 911b, which is/are communicatively coupled with/to a respective back-end network. One way to implement this service model is to use a multi-path Layer-4 (transport) solution such as Multi-Path TCP (see e.g., IETF RFC 6824 (January 2013) ("[RFC6824]")) or MultiPath QUIC (MPQUIC) (see e.g., De Coninck et al., "Multipath Extensions for QUIC (MP-QUIC)," draft-deconinck-quic-multipath-07, IETA, QUIC Working Group (3 May 2021) ("[MPQUIC]")). Such solution is usually OS dependent and only applicable to specific application/traffic. Moreover, it operates at the individual flow level and offer suffers from high complexity & low efficiency. In some implementations, the Layer-3 multi-path management mechanisms discussed in Zhu et al., "User-Plane Protocols for Multiple Access Management Service," draft-zhu-intarea-mams-user-protocol-09, IETA, INTAREA (4 Mar. 2020) ("[UPMAMS]")) can be used to avoid such limitations and drawbacks. In these implementations, the control information for multi-path management (e.g., sequence number, etc.) is appended as a trailer at the end of a suitable network packet (e.g., IP packet).

In the example of FIG. 9, the (R)AN 910A is a 3GPP-based access network such as an LTE E-UTRAN where the one or more (R)AN nodes 911A are evolved NodeBs (eNBs) or a next generation RAN (NG-RAN) where the one or more (R)AN nodes 911 are Next Generation NodeBs (gNBs) and/or NG Evolved Node-Bs (NG-eNBs). Additionally, in the example of FIG. 9, the (R)AN 910A is a WiFi-based access network where the (R)AN nodes 911B are WiFi Access Points (APs). The APs may be, for example, wireless routers, roadside ITS stations or roadside units, gateway appliances, central hubs, or the like. The multi-radio UE 901 is capable of establishing a 3GPP access link 905A with the eNB/gNB 911A (e.g., Uu interface or the like), and capable of establishing a WiFi access link 905B with the AP 911B. The eNB/gNB 911A communicates with the server 940 via a 3GPP backhaul link 906A and the AP 911B communicates with the server 940 via a WiFi backhaul link 906B. The 3GPP backhaul link 906A and the WiFi backhaul link 906B may be a suitable wired connection such as Ethernet, USB, Data Highway Plus (DH+), PROFINET, or the like. Furthermore, the MX server 940 is also communicatively coupled with a core network 950A via backhaul interface 907A and communicatively coupled with a Fixed Access (FA) gateway (GW) and/or FA-Core network 950B via the backhaul link 907B. In this example, the core network 950A may be a 3GPP core network such as a 5G core network (5GC) or an LTE Evolved Packet Core (EPC). Additionally or alternatively, the FA-GW may be a broadband network gateway (BNG) and/or the FA-Core may be broadband core that provides transport, and various resources provide content (provider data center, video head end, and so on). Additionally or alternatively, the FA-GW/Core may be a residential gateway (RG), a 5G-RG, a Fixed Network (FN) RG (FN-RG), an FN Broadband RG (FN-BRG), an FN Cable RG (FN-CRG), a Wireline 5G Access Network (W-SGAN), a Wireline 5G Cable Access Network (W-SGCAN), a Wireline Access Gateway Function (W-AGF), and/or some other suitable element/entity.

For purposes of the present disclosure, individual links 905, 906, or 907 may be referred to as access network connections (ANCs) or access network paths (ANPs). For example, an ANC or ANP may comprise a radio link 905 between client 901 and (R)AN node 911 in one or both directions. Additionally or alternatively, an ANC or ANP may refer to a combination of a link 905 and link 906 between client 901 and MX server 940 in one or both directions. Additionally or alternatively, an ANC or ANP may refer to a combination of a of links/paths 905, 906 and 907 between client 901 and local service 970 or data network 975 in one or both directions. Unless stated otherwise, the terms ANC, ANP, "link," "channel," "path," "connection," and the like may be used interchangeably throughout the present disclosure.

Additionally, the client 901 is configured provide radio information to one or more NANs 911 and/or one or more other entities/elements (e.g., edge server(s), (R)AN(s) 910, core network function(s) (NF(s)), application function(s) (AF(s)), app server(s), cloud service(s), and/or the like). The radio information may be in the form of one or more measurement reports, and/or may include, for example, signal strength measurements, signal quality measurements, and/or the like. Each measurement report is tagged with a timestamp and the location of the measurement (e.g., the current location of the client 901). As examples, the measurements collected by the client 901 and/or included in the measurement reports may include any of those discussed herein (see e.g., discussion of FIG. 20 infra). Additionally or alternatively, any of the aforementioned measurements (or combination of measurements) may be collected by one or more NANs 911 and provided to a suitable entity/element (e.g., Edge server(s), (R)AN(s) 910, NF(s), AF(s), app server(s), cloud service(s), and/or the like). The radio information may be reported either at a low periodicity or a high periodicity depending on a data transfer that is to take place, and/or other information about the data transfer. Additionally or alternatively, the element/entity may request the measurements from the NANs 911 at low or high periodicity, or the NANs 911 may provide the measurements to the element/entity at low or high periodicity. Additionally or alternatively, the element/entity may obtain other relevant data (e.g., Key Performance Indicators (KPIs), Key Quality Indicators, (KQIs), and/or the like) from other same or similar elements/entities with the measurement reports or separately from the measurement reports.

MAMS is a programmable framework that provides mechanisms for the flexible selection of network paths in an MX communication environment 900, based on the application needs and/or requirements, as well as adapt to dynamic network conditions when multiple network connections serve a client device 901. The MAMS framework leverages network intelligence and policies to dynamically adapt traffic distribution across selected paths and UP treatments (e.g., encryption needed for transport over WiFi, or tunneling needed to overcome a network address translation (NAT) between client 901 and a multi-path proxy) to changing network/link conditions. Network path selection and configuration messages are carried as UP data between the functional elements in the MX network 900B and the client 901, and thus, with little or no impact on the control plane (CP) signaling schemes of the underlying access networks (e.g., WiFi and 3GPP access networks in FIGS. 9A-9B). For example, in MX network 900B with 3GPP and WiFi technologies existing LTE and WiFi signaling procedures will be used to set up the LTE and WiFi connections, respectively, and MAMS-specific CP messages are carried as LTE or WiFi UP data. The MAMS framework defined in this document provides the capability to make a smart selection of a flexible combination of access paths and core network paths, as well as to choose the UP treatment when the traffic is distributed across the selected paths. Thus, it is a broad programmable framework that provides functions beyond the simple sharing of network policies such as those provided by the Access Network Discovery and Selection Function (ANDSF) discussed in 3GPP TS 24.312 v15.0.0 (2018 Jun. 21) ("[TS24312]"), which offers policies and rules for assisting 3GPP clients to discover and select available access networks. Further, it allows the choice and configuration of UP treatment for the traffic over the paths, depending on the application's needs The MAMS framework mechanisms are not dependent on any specific access network types or UP protocols (e.g., TCP, UDP, Generic Routing Encapsulation (GRE), QUIC, Multipath TCP (MPTCP), SCTP, MultiPath QUIC (MPQUIC), etc.). The MAMS framework coexists and complements the existing protocols by providing a way to negotiate and configure those protocols to match their use to a given MA scenario based on client and network capabilities, and the specific needs of each access network path. Further, the MAMS framework allows load balancing of the traffic flows across the selected access network paths, and the exchange of network state information to be used for network intelligence to optimize the performance of such protocols.

The MAMS framework is based on principles of UP interworking, which can be deployed as an overlay without impacting the underlying networks. MAMS co-exists and complements existing communication protocols by providing a way to negotiate and configure the protocols based on client and network capabilities. Further it allows exchange of network state information and leveraging network intelligence to optimize the performance of such communication protocols. MAMS has minimal or no dependency on the actual access technology of the participating links, which allows MAMS to be scalable for addition of newer access technologies and for independent evolution of the existing access technologies.

FIG. 9 also depicts a MAMS Data Plane Protocol Stack (DPPS) for transporting user payloads, for example, an IP Protocol Data Unit (PDU) carried via the IP layer and/or the like. The DPPS 902 and 942 includes the client-side MAMS DPPS 902 implemented by the client 901 and the server-side MAMS DPPS 942 implemented by the server 940. For devices equipped with multiple radio link technologies (or multiple RAT circuitries), such as 5G/NR, LTE, WiFi, etc., MAMS [RFC8743] provides a programmable framework to dynamically select and transmit data simultaneously over multiple radio links for high throughput, low latency, and improved reliability. The MAMS DPPS 902, 942 includes the following two (sub)layers: the convergence (sub)layer and the adaptation (sub)layer. The MX adaptation (sub)layer is added to (or on top of) each RAT circuitry, and the MX convergence (sub)layer connects the IP and MX adaptation (sub)layers.

Figure 14:
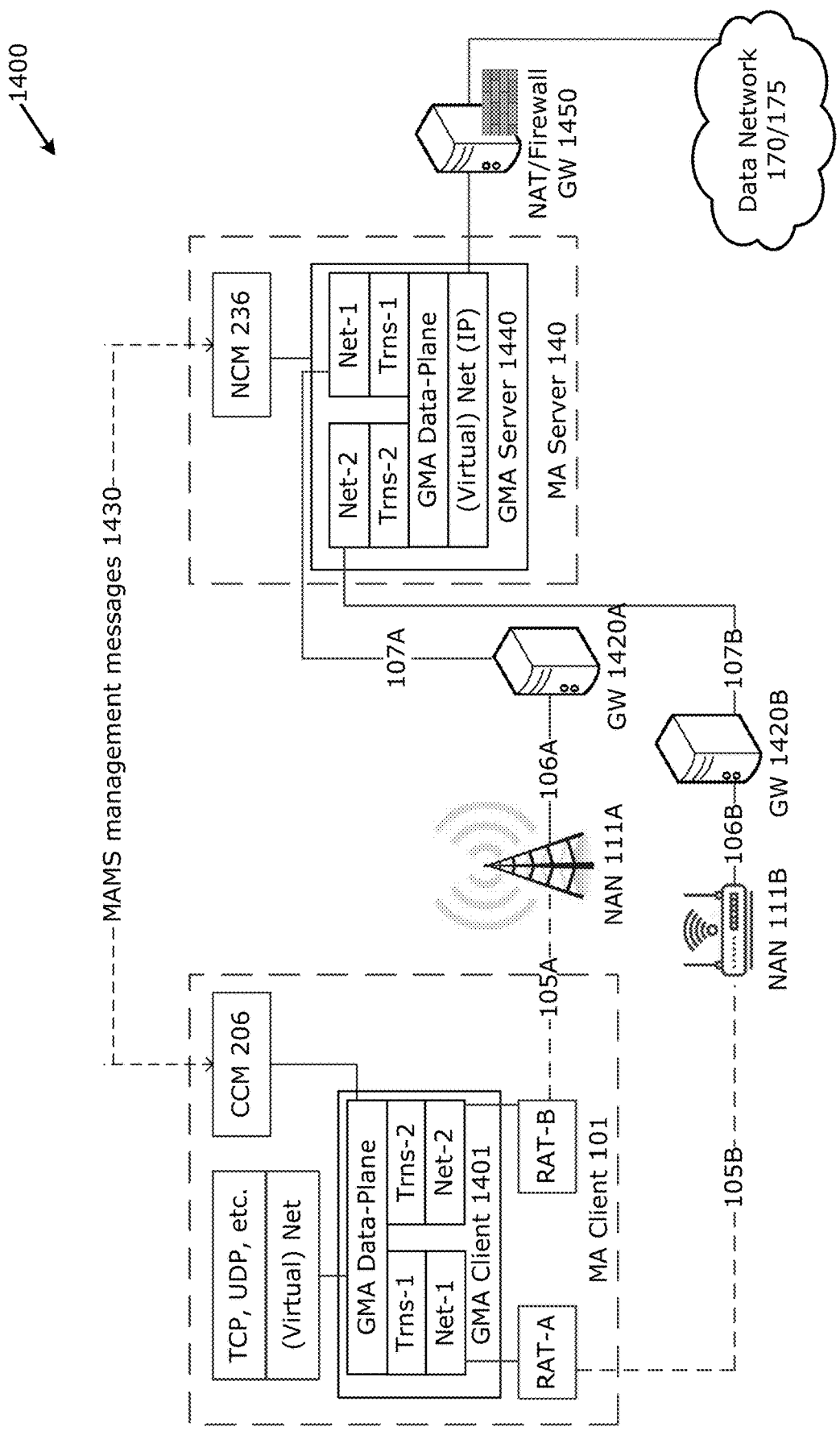
FIG. 14 depicts an OTT Generic Multi-Access (GMA) end-to-end (e2e) Network Reference Architecture.

The MX convergence (sub)layer operates on top of the MX adaptation (sub)layer in the protocol stacks 902 and 942. From the Transmitter (Tx) perspective, a User Payload (e.g. IP PDU) is processed by the convergence sublayer first, and then by the adaptation sublayer before being transported over a delivery access connection (e.g., connection 905A or connection 905B). From the Receiver (Rx) perspective, a packet (e.g., IP packet) received over a delivery connection is processed by the MX adaptation sublayer first, and then by the MX convergence sublayer (this is also shown by FIG. 14, which is discussed in more detail infra).

The MX convergence layer is configurable or operable to perform MX-specific tasks in the UP. The MX convergence layer performs multi-access specific tasks/functions such as, for example, access (path) selection, multi-link (path) aggregation, splitting/reordering, lossless switching, keep-alive, probing, fragmentation, and/or concatenation. The MX convergence layer can be implemented by using existing UP protocols such MPTCP, Multipath QUIC (MPQUIC), or by adapting encapsulating header/trailer schemes such as GRE or Generic Multi-Access (GMA). In some implementations, the MX convergence supports GMA, MPTCP Proxy, GRE Aggregation Proxy, and MPQUIC. As discussed in more detail infra, the GMA protocol may be used to encode additional control information (e.g., Key, Sequence Number, Timestamp, etc.) at this (sub)layer.

The MX adaptation layer is configurable or operable to address and/or handle transport-network-related aspects such as, for example, tunneling, network-layer reachability and/or security, and NAT. The MX Adaptation Layer can be implemented using existing protocols (e.g. TCP, UDP, IPSec, QUIC, etc.). Additionally or alternatively, the MX Adaptation Layer can be implemented using UDP tunneling, IPsec, DTLS (see e.g., Rescorla et al., "Datagram Transport Layer Security Version 1.2", IETF, RFC 6347 (January 2012) and/or Moriarty et al., "Deprecating TLS 1.0 and TLS 1.1", IETF, RFC 8996 (March 2021) (collectively "[DTLS] "), or a Client NAT (e.g., a source NAT at the client with inverse mapping at the server 940 and/or Network Multi Access Data Proxy (N-MADP) 1037 of FIG. 10). Additionally or alternatively, the adaptation method of the MX Adaptation Layer is UDP without DTLS, UDP with DTLS, IPsec (see e.g., Huttunen et al., "UDP Encapsulation of IPsec ESP Packets", IETF, Network Working Group, RFC 3948 (January 2005) ("[RFC3948]")), or Client NAT.

The MX Adaptation Layer can be independently configured for each of the access links 905A and 905B. In particular, UP packets of the anchor connection can be encapsulated in a UDP tunnel of a delivery connection between the N-MADP and C-MADP (see e.g., N-MADP 1037 and C-MADP 1007 in FIG. 10), an IPsec tunnel can be established between the N-MADP and C-MADP (see e.g., N-MADP 1037 and C-MADP 1007 in FIG. 10) on the network path that is considered untrusted, and/or DTLS can be used if UDP tunneling is used on the network path that is considered "untrusted". For example, in FIG. 9 including 3GPP (R)AN 910A (assumed secure) and WiFi (R)AN 910B (assumed to not be secure), the MX adaptation layer can be omitted for the 3GPP link 905A, but is configured with IPsec to secure the WiFi link 905B.

The MX convergence layer operates on top of the MX adaptation sublayer in the protocol stack. From the transmitter (Tx) perspective, a user payload (e.g., IP PDU) is processed by the MX convergence layer first, and then by the MX adaptation layer before being transported over a delivery access connection, From the receiver (Rx) perspective, an IP packet received over a delivery connection is processed by the MX adaptation sublayer first, and then by the MX convergence sublayer.

Where GMA is used, the MX convergence layer may be replaced with a "GMA convergence layer" or "GMA convergence sublayer." Here, multiple access networks 910 are combined into a single IP connection. If the NCM (see e.g., NCM 1036 of FIG. 10) determines that N-MADP (see e.g., N-MADP 1037 of FIG. 10) is to be instantiated with GMA as the MX Convergence Protocol, it exchanges the support of GMA convergence capability in the discovery and capability exchange procedures.

Where MPTCP is used, the MX convergence layer may be replaced with an MPTCP layer on top of individual TCP layers, where each TCP layer is onto of a respective MX adaption layer. Here, MPTCP is reused as the "MX Convergence Sublayer" protocol, and multiple access networks are combined into a single MPTCP connection. Hence, no new UP protocol or PDU format is needed in this case. If the NCM 1036 determines that the N-MADP is to be instantiated with MPTCP as the MX Convergence Protocol, it exchanges the support of MPTCP capability during discovery and capability exchange procedures. MPTCP proxy protocols may be used to manage traffic steering and aggregation over multiple delivery connection.

Where GRE is used, the MX convergence layer may be replaced with a GRE layer on top of a GRE Delivery Protocol (e.g., IP) layer. Here, GRE is reused as the "MX Convergence sub-layer" protocol, and multiple access networks are combined into a single GRE connection. Hence, no new UP protocol or PDU format is needed in this case. If the NCM 1036 determines that N-MADP is to be instantiated with GRE as the MX Convergence Protocol, it exchanges the support of GRE capability in the discovery and capability exchange procedures.

Figure 10:
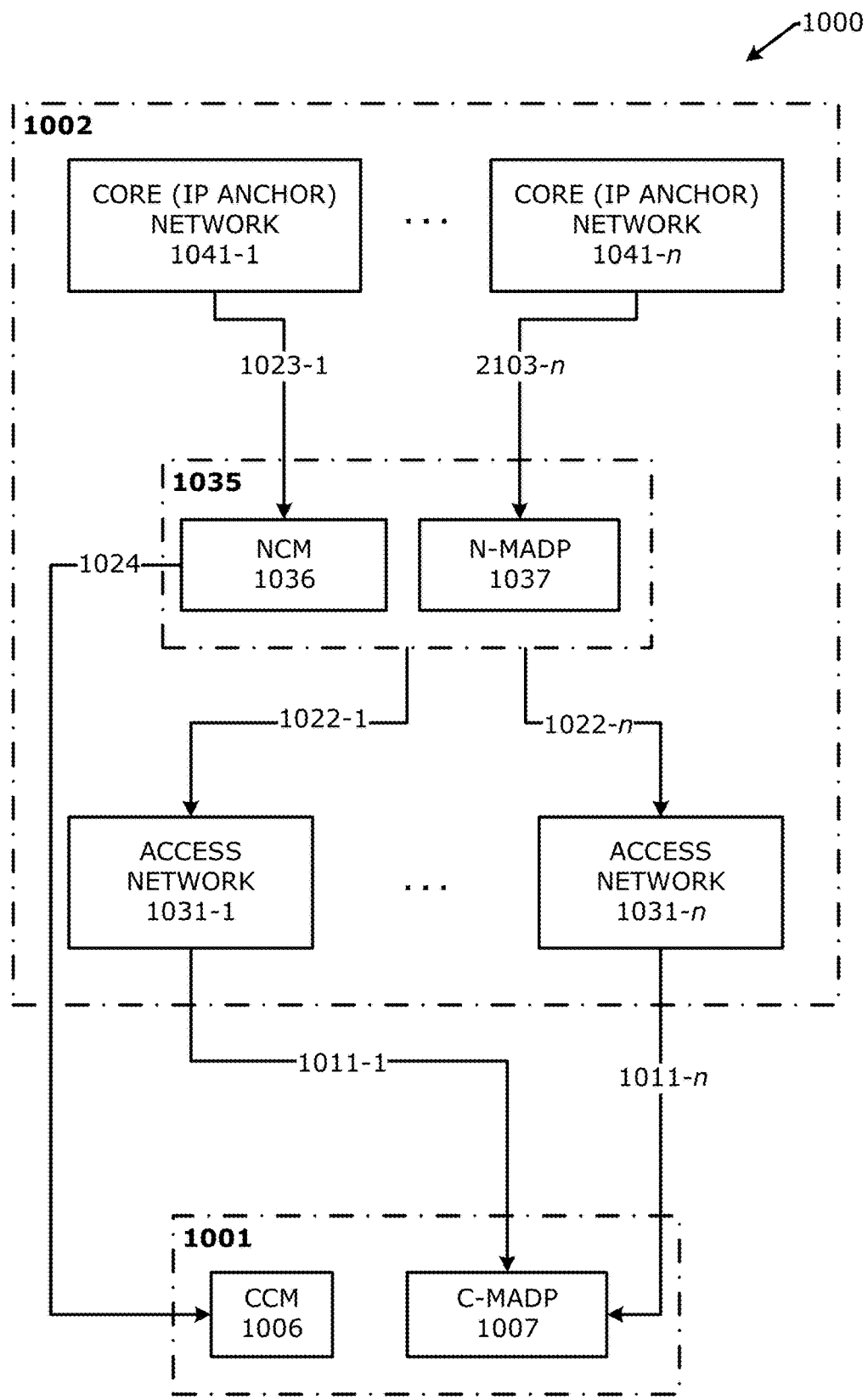
FIG. 10 illustrates a MAMS reference architecture.

FIG. 10 illustrates an example MAMS reference architecture 1000 for a scenario of a client served by n networks (where n is a number). The MAMS framework allows for dynamic selection and flexible combination of access and core network paths as UL and DL for a device connected to multiple communication networks. The multiple communication networks interwork at the UP. The architecture is extendable to combine any number of networks, as well as any choice of participating network/access types (e.g., LTE, WLAN, MuLTEfire, DSL, 5G/NR, etc.) and deployment architectures (e.g., with UP gateway function at the access Edge, and/or the like).

FIG. 10 illustrates a scenario of a client 1001 served by multiple (1 to n) core networks 1041-1 to 1041-$n$ (where n is a number). The MAMS architecture 1000 includes the following functional elements: a client 1001 including a Client Connection Manager (CCM) 1006 and a Client Multi Access Data Proxy (C-MADP) 1007; multiple (1 to n) access networks (ANs) 1031 (including AN 1031-1 to AN 1031-$n$); a MAMS system 1035 including a Network Connection Manager (NCM) 1036 and a Network Multi Access Data Proxy (N-MADP) 1037; and the multiple (1 to n) core networks 1041-1 to 1041-$n$. The CCM 1006 and NCM 1036 handle CP aspects, and the C-MADP 1007 and N-MADP 1037 handle UP aspects. The core networks (or simply "cores") 1041-1 to 1041-$n$ are elements that anchor the client's 1001 network address (e.g., IP address or the like) used for communication with applications via the network. One or more of the cores 1041-1 to 1041-$n$ may correspond to cloud computing service(s), 5G core network(s) (5GCs), LTE core network(s) (e.g., evolved packet core (EPC)), a DSL/FIXED core, WLAN core, data center(s), and/or other like back-end system.

The client 1001 is an end-user device supporting connections with multiple access networks 1031-1 to 1031-$n$ (which may be the same or similar to (R)ANs 910 and/or (R)AN nodes 911 in FIG. 9), possibly over different access technologies. When the client 1001 is capable of handling multiple network connections, the client 1001 may be referred to as a "multiconnectivity client" or the like. The client 1001 may be the same or similar as client 901 depicted by FIG. 9.

The ANs 1031 are network elements in the network that deliver user data packets to the client 1001 via respective point-to-point access links 1011-1 to 1011-$n$, which may include, for example, WiFi links, LTE cellular links, 5G/NR cellular links, DSL (fixed access) connections, and/or the like. In some implementations, the point-to-point access links 1011-1 to 1011-$n$ may additionally or alternatively include short-range radio links such as, for example, Bluetooth® or BLE, IEEE 802.15.4 based protocols (e.g., 6LoWPAN, WirelessHART, MiWi, Thread, etc.), WiFi-direct, and/or the like. The ANs 1031 may correspond to (R)ANs 910 and/or (R)AN nodes 911 of FIG. 9.

A server manager (e.g., NCM 1036) is a functional entity in a network 1002 (e.g., network element, network appliance, gateway, Edge node(s), cloud node(s), etc.) that handles control messages from a client manager (e.g., CCM 1006) and configures multi-access operations on the server side 1002. Additionally or alternatively, the NCM 1036 is a functional element in the network that handles MAMS control messages from the client 1001 and configures the distribution of data packets over the available access and core network paths, and manages the UP treatment (e.g., tunneling, encryption, etc.) of the traffic flows. Additionally or alternatively, the NCM 1036 provides the intelligence in the network to configure network paths and UP protocols based on client negotiation. The NCM 1036 also acts as a common MA gateway for network policy input and interface to application platforms. One or more NCM 1036 instances can be hosted at the access Edge (e.g., in one or more access networks 910, at individual access network nodes 911, and/or in one or more Edge compute nodes) and/or core network gateways.

The NCM 1036 configures the network (N-MADP 1037) and client (C-MADP 1007) UP functions, such as negotiating with the client 1001 for the use of available AN paths 1021-1 to 1021-n, protocols, and rules for processing the UP traffic, as well as link-monitoring procedures. The CP messages between the NCM 1036 and the CCM 1006 are transported as an overlay on the UP, without any impact on the underlying access networks. The NCM 1036 handles MAMS CP messages from the client 1001 and configures distribution of data packets over the multiple available access paths 1021-1 to 1021-n, delivery paths 1022-1 to 1022-n, and/or core network paths 1023-1 to 1023-n, as well as UP treatment of traffic flows. The CP messages exchanged between the NCM 1036 and CCM 1006 are transported as an overlay on the UP, without any impact to the underlying ANs 1031.

The CP path 1024 may be overlaid over any access UP path. A "path" may be a flow (e.g., an IP flow, UDP flow, etc.) between two hosts. An IP flow or UDP flow may be denoted by a 4-tuple (e.g., IP source address, IP destination address, source port, destination port). Additionally or alternatively, WebSocket is used for transporting management and control messages between the NCM 1036 and CCM 1006, wherein MX Control Message are carried over (or encapsulated in) a WebSocket, and the WebSocket is carried over (or encapsulated in) TCP/TLS. Aspects of MX management and control messages are discussed in [RFC8743], Int'l App. No. PCT/US2021/038063 filed Jun. 18, 2021 ("[AD0071-PC1]"), U.S. application Ser. No. 17/358,994 filed on Jun. 25, 2021 ("[AD7258-US]"), and U.S. application Ser. No. 17/469,331 filed Sep. 8, 2021 ("[AC7128-US]"), the contents of each of which are hereby incorporated by reference in their entireties.

A client manager (e.g., CCM 1006) is a functional entity in the client device 1001 (e.g. desktop, workstation, laptop, smartphone, smart appliance, IoT device, etc.) that exchanges control messages with a server manager (e.g., NCM 1036) to configure multi-access operations on the client side 1001. Additionally or alternatively, the CCM 1006 is a functional entity in the client 1001 that exchanges MAMS signaling messages with the NCM 1036, and which configures the network paths at the client 1001 for the transport of user data.

The CCM 1006 is a peer functional element in the client 1001 for handling MAMS CP procedures. The CCM 1006 manages multiple network connections 1021-1 to 1021-n at the client 1001, and configures the multiple network paths 1021-1 to 1021-n at the client 1001 for transport of user data. The CCM 1006 exchanges MAMS signaling with the NCM 1036 to support such functions as the configuration of the UL and DL user network path for transporting user data packets and the adaptive selection of network path by the NCM 1036 by reporting on the results of link probing. Link probing and reporting may be used to support adaptive network path selection by the NCM 1036. In the DL for user data received by the client 1001, the CCM 1006 configures C-MADP 1007 such that application data packet received over any of the accesses to reach the appropriate application on the client 1001. In the UL for the data transmitted by the client 1001, the CCM 1006 configures the C-MADP 1007 to determine the best access links 1021 to be used for UL data based on a combination of local policy and network policy delivered by the NCM 1036 over link 1024.

The C-MADP 1007 is a functional entity in the client 1001 that handles user data traffic forwarding across multiple network paths. The C-MADP 1007 is responsible for MAMS-specific UP functionalities in the client 1001 such as encapsulation, fragmentation, concatenation, reordering, retransmissions, etc. The C-MADP 1007 is configured by the CCM 1006 based on signaling exchange with the NCM 1036 and local policies at the client 1001. The CCM 1006 configures the selection of delivery connections 1022-1 to 1022-n and the UP protocols to be used for UL user data traffic based on the signaling exchanged with the NCM 1036.

The N-MADP 1037 is a functional entity in the network 1002 that handles the forwarding of user data traffic across multiple network paths. The N-MADP 1037 is responsible for MAMS-related UP functionalities in the network 1002. Such as encapsulation, fragmentation, concatenation, reordering, retransmission, etc. The N-MADP 1037 is the distribution node that routes the UL UP traffic to the appropriate anchor connection 1023-1 to 1023-n towards a respective core network 1041-1 to 1041-n, and the DL user traffic to the client 1001 over the appropriate delivery connection(s) 1022-1 to 1022-n. The anchor connections 1023-1 to 1023-n are network paths from the N-MADP 1037 to the UP gateway (IP anchor) that has assigned an network address to the client 1001, and the delivery connections 1022-1 to 1022-n are network paths from the N-MADP 1037 to the client 1001. One or more The N-MADP 1037 instances can be hosted at the Access Edge (e.g., in one or more access networks 910 and/or at individual access network nodes 911) and/or Core Gateways. The N-MADP 1037 instances may be hosted with or separate from the NCM 1036 instances.

In the DL, the NCM 1036 configures the use of delivery connections 1022-1 to 1022-n, and UP protocols at the N-MADP 1037 for transporting user data traffic. The N-MADP 1037 may implement Equal-Cost Multi-Path routing (ECMP) support for the down link traffic. Additionally or alternatively, the N-MADP 1037 may be connected to a router or other like network element (e.g., AP XE136 of Figure XE1) with ECMP functionality. The NCM 1036 configures the N-MADP 1037 with a load balancing algorithm based on static and/or dynamic network policies. These network policies may include assigning access and core paths for specific user data traffic type, data volume based percentage distribution, link availability and feedback information from exchange of MAMS signaling with the CCM 1006 at the client 1001, and/or the like. The N-MADP 1037 can be configured with appropriate UP protocols to support both per-flow and per-packet traffic distribution across the delivery connections.

In the UL, the N-MADP 1037 selects the appropriate anchor connection 1023-1 to 1023-n over which to forward the user data traffic, received from the client 1001 via one or more delivery connections 1022-1 to 1022-n. The forwarding rules in the UL at the N-MADP 1037 are configured by the NCM 1036 based on application requirements (e.g., enterprise hosted application flows via a LAN or WLAN anchor 1041 (e.g., WiFi, cloud, and/or Edge network), Mobile Operator hosted applications via a cellular core network 1041, and/or the like).

The NCM 1036 and the N-MADP 1037 can be either collocated with one another or instantiated on different network nodes. The NCM 1036 can setup multiple N-MADP 1037 instances in the network. The NCM 1036 controls the selection of an individual N-MADP 1037 instance by the client and the rules for distribution of user traffic across the N-MADP 1037 instances. In this way, different N-MADP 1037 instances may be used to handle different sets of clients for load balancing across clients. Additionally, the different N-MADP 1037 instances may be used for different address deployment topologies (e.g., N-MADP 1037 hosted at the UP node at the access Edge or in the core network, while the NCM 1036 hosted at the access edge node), as well as address access network technology architecture. For example, an N-MADP 1037 instance at a CN node 1041 may be used to manage traffic distribution across LTE and DSL networks, and another N-MADP 1037 instance at a (R)AN node 1031-1, 1031-*n* may be used to manage traffic distribution across LTE and WiFi traffic. Furthermore, a single client 1001 can be configured to use multiple N-MADP 1037 instances, which may be used for addressing different application requirements. For example, individual N-MADP 1037 instances may be used to handle TCP and UDP transport based traffic.

The CCM 1006 and NCM 1036 exchange signaling messages to configure the UP functions, C-MADP 1007 and N-MADP 1037, at the client and network respectively. The CCM 1006 may obtain the CCM 1036 credentials (FQDN or network address) for sending the initial discovery messages. As an example, the client 1001 can obtain the NCM 1036 credentials using methods like provisioning, DNS query. Once the discovery process is successful, the (initial) NCM 1036 can update and assign additional NCM 1036 addresses, for example, based on MCC/MNC tuple information received in the MX Discovery Message, for sending subsequent CP messages.

The CCM 1006 discovers and exchanges capabilities with the NCM 1036. The NCM 1036 provides the credentials of the N-MADP 1037 end-point and negotiates the parameters for UP with the CCM 1006. CCM 1006 configures C-MADP 1007 to setup the UP path (e.g., MPTCP/UDP Proxy Connection) with the N-MADP 1037 based on the credentials (e.g., (MPTCP/UDP) Proxy network address (e.g., IP address and port), Associated Core Network Path), and the parameters exchanged with the NCM 1036. Further, NCM 1036 and CCM 1006 exchange link status information to adapt traffic steering and UP treatment with dynamic network conditions. The key procedures are described in details in the following sub-sections.

A UDP (or QUIC) connection may be configured between the C-MADP 1007 and the N-MADP 1037 to exchange control messages. The control messages may be or include, for example, keep-alive, probe request (REQ)/acknowledgement (ACK), Packet Loss Report (PLR), First Sequence Number (FSN), Coded MX SDU (CMS), Traffic Splitting Update (TSU), Traffic Splitting ACK (TSA) messages, and/or path quality estimation information. The N-MADP 1037 end-point network address (e.g., IP address or the like) and port number (e.g., UDP port number of the UDP connection) is used to identify MX control PDUs.

The various elements depicted in the example of FIG. 10 may be implemented using a variety of different physical and/or virtualized components. For example, the elements within MAMS network 1002 may be implemented using one or more components of an Edge node, such as one or more LTE or 5G RANs, an edge computing system/framework such as [MEC], [SA6Edge], [O-RAN], [ISEO], and/or the like. Additionally or alternatively, the MAMS system 1035 may be implemented in or by an individual RAN node, such as one or more of the RAN nodes 911 in FIGS. 9A-9C. In one example, the MAMS system 1035 is implemented as part of the layer 3 (L3) protocol stack (e.g., the RRC layer or the like). In another example, the MAMS system 1035 is implemented as part of a layer above L3 such as the network layer (e.g., IP, UDP, QUIC, GTP-U, etc.) data plane protocol stack of the RAN nodes. In another example, the MAMS system 1035 may be is implemented as a separate layer between the L3 and upper layers. In another example, the MAMS system 1035 may be implemented in or by a gNB-CU of a CU/DU split architecture. In another example, the MAMS system 1035 may be implemented in or by a vBBU pool, or a cloud RAN (C-RAN). Additionally or alternatively, the functional elements within MAMS network 1002 may be implemented by one or more network functions (or as a VNF) of CN 950A in FIG. 9. For example, the N-MADP 1037 may run on an S-GW or P-GW when CN 950A is an EPC, or the N-MADP 1037 may run on a User Plane Function (UPF) when CN 950A is a 5GC.

In edge-based implementations, the MAMS system 1035 may be implemented in or by an edge compute node that is located in, or co-located with, a RAN 910 or RAN node 911. The functions that are located in the network side (e.g., the NCM 1036 and N-MADP 1037) can be hosted either at a centralized location or at the edge cloud (see e.g., Edge cloud 2163 of FIG. 21). They can be deployed either as an edge application (e.g., MEC app(s), O-RAN xApp, etc.) or co-located with other functions (e.g., MEC platform, O-RAN RAN Intelligent Controller (RIC), etc.). Additionally or alternatively, up-to-date information from the access networks may be provided to the NCM 1036 for intelligent network path selection over APIs by the edge platform the same way as it exposes RNI over RNI API, TMS over a TMS API, and/or BWMS over BWM API. Additionally or alternatively, similar levels of information may be defined for 3GPP access networks as well as for WiFi, MulteFire, DSL, etc., either by amending the existing RNI/BWM APIs or by defining new APIs specific for the new access technologies.

In additional or alternative edge-based implementations, the NCM 1036 can be hosted on a edge cloud server that is located in the UP path at the edge of the multi-technology access network. The NCM 1036 and CCM 1006 can negotiate the network path combinations based on an application's needs and the necessary UP protocols to be used across the multiple paths. The network conditions reported by the CCM 1006 to the NCM 1036 can be complemented by a radio analytics application residing at the MEC cloud server to configure the UL and DL access paths according to changing radio and congestion conditions. Additionally or alternatively, the UP functional element (e.g., the N-MADP 1037) can either be collocated with the NCM 1036 at the MEC cloud server (e.g., MEC-hosted applications, etc.) or placed at a separate network element like a common UP gateway across the multiple networks. Also, even in scenarios where an N-MADP 1037 is not deployed, the NCM 1006 can be used to augment the traffic steering decisions at the client 1001. These enhancements is to improve the end user's QoE by leveraging the best network path based on an application's needs and network conditions, and building on the advantages of significantly reduced latency and the dynamic and real-time exposure of radio network information available at the MEC.

As used herein a "GMA receiver" may be an N-MADP 1037 instance or C-MADP 1007 instance (see e.g., FIG. 10) instantiated with GMA as the convergence protocol that receives packets encapsulated or otherwise generated according to GMA procedures, and processes the received packets per the procedures discussed in Zhu et al., "Generic Multi-Access (GMA) Convergence Encapsulation Protocols," draft-zhu-intarea-gma-14, IETA, INTAREA/Network Working Group (24 Nov. 2021) ("[GMA14]"), which is hereby incorporated by reference in its entirety. Additionally, as used herein a "GMA transmitter" may be an N-MADP 1037 instance or C-MADP 1007 instance instantiated with GMA as the convergence protocol that processes and/or encapsulates or otherwise generates packets/PDUs according to GMA procedures discussed in [GMA14].

As mentioned previously, MAMS is a programmable framework that provides mechanisms for flexible selection of network paths in a multi-connection (access) communication environment, based on application needs. It leverages network intelligence and policies to dynamically adapt traffic distribution across selected paths and user plane treatment to changing network/link conditions. The network path selection and configuration messages are carried as user plane data between the functional elements in the network and the end-user device, and thus without any impact to the control plane signaling schemes of the individual access network. Today's MAMS solutions require deploying MAMS control and data plane network functions in the network [RFC8743]. The present disclosure extends the MAMS framework to support OTT MAMS (e.g., lossless switching, aggregation, etc.) without any change or dependency in network. The OTT MAMS can run as part of MAMS hosted on a cloud computing service/platform, an Edge computing platform/service (e.g., ETSI MEC, and/or the like), and/or using suitable Virtual Machines (VMs) and/or containers provided by such a cloud computing service/platform and/or Edge computing platform/service.

Furthermore, as the mobile and/or wireless access technologies and networks continue to evolve, it is becoming clear that no single radio technology will be able to meet the variety of requirements for human and machine communications. On the other hand, driving more data through a scarce and finite radio spectrum becomes a real challenge, and spectrum efficiency is approaching a plateau and will not deliver the needed increase in bandwidth improvement itself. For example, 3GPP 5G cellular technology is likely to utilize frequencies below 6 Gigahertz (GHz) as well as millimeter wave ("mmWave" or "MMW"), in both licensed and unlicensed bands. The present disclosure also provides a Software-Defined, Access-Agnostic, and High-Performance solution to such issues, which is referred to herein as Generic Multi-Access (GMA) to enable integration of multiple (heterogeneous or homogeneous) radio access networks and RATs at the Edge, without impacting existing RAT protocol stacks (e.g. PDCP, RRC, Ethernet, etc.) or existing network protocols (e.g., internet protocol (IP), transmission control protocol (TCP), user datagram protocol (UDP), Quick UDP Internet Connections (QUIC), etc.). GMA may be considered a Layer 2.5 protocol. The present disclosure describes various GMA e2e network architecture, protocols, procedures, algorithms, and system functionalities as well as deployment implementations.

Figure 11:
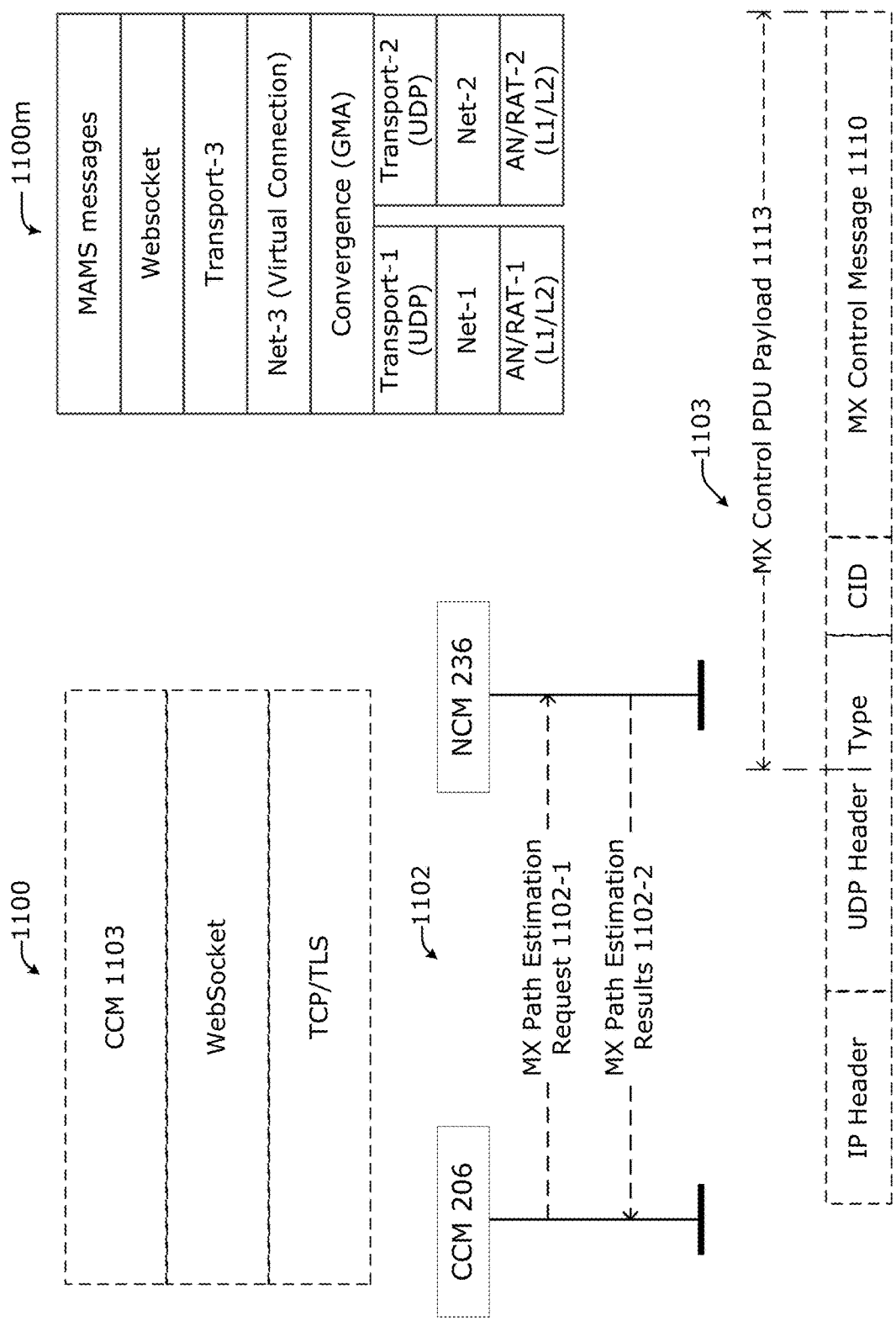
FIG. 11 illustrates an example MX control plane protocol and MX control message.

FIG. 11 depicts an example MAMS Control-Plane Protocol Stack (CPPS) 1100. The CPPS 1100 includes an Multi-Access (MX) Control Message layer 1103, a WebSocket layer, and a Transport Control Protocol (TCP)/Transport Layer Security (TLS) layer. Here, WebSocket (see e.g., IETF RFC 6455 (December 2011) and IETF RFC 8441 (September 2018)) is used for transporting management and control messages (e.g., MX Control Messages 1103) between the NCM 1036 and the CCM 1006. Each MAMS control message 11003 may include one or more of the following fields: Version (indicates the version of the MAMS control protocol); Message Type (indicates the type of the message, e.g., MX Discover, MX Capability Request (REQ)/Response (RSP)); and Sequence Number (SN) (Auto-incremented integer to uniquely identify a particular message exchange (e.g., MX Capability Request/Response).

FIG. 11 shows a MAMS management protocol stack 1100*m*. Here, a secure websocket is established over a third transport layer (e.g., TCP, UDP, IP Security Protocol (IPSec), etc.) tunnel that is established over a virtual network layer (anchor) connection (e.g., IP or some other suitable network layer protocol) for sending MAMS management messages between the CCM 1006 and the NCM 1036. The virtual (anchor) connection is on top of a convergence layer that implements a convergence protocol (e.g., GMA or the like), which encapsulates the MAMS management messages in the virtual (anchor) connection packet(s) (e.g., IP packets). The convergence (GMA) layer resides on top of respective transport (e.g., UDP or IPSec) tunneling layers for respective access networks (ANs) 1 and 2, which is on top of respective network layers (e.g., IP or the like), which are on top of layer 2 (L2) and Layer 1 (L1) of the respective access networks/RATs 1 and 2.

In some implementations, when the virtual connection has not been set up, the CCM 1006 can only establish the secure websocket over one of the delivery IP connections first (e.g., RAT-1). After the virtual IP connection is up, the CCM 1006 will close it and establish a new one over the (anchor) virtual IP connection, and the corresponding (virtual) IP packets (carrying one or more MAMS messages) are encapsulated in a same or similar way as data packets (see e.g., FIG. 18).

FIG. 11 also shows a MAMS Control-Plane (CP) Procedure 1102 for Path Quality Estimation. Path quality estimations can be done either passively or actively. Traffic measurements in the network can be performed passively by comparing real-time data throughput of the client 1001 with the capacity available in the network. In special deployments where the NCM 1036 has interfaces 1022 with access nodes 1031, 911, the direct interfaces can be used to gather information regarding path quality. For example, the utilization of an LTE access node (eNB), to which the client 1001 is attached, could be used as data for the estimation of path quality without creating any extra traffic overhead. Active measurements by the client 1001 provide an alternative way to estimate path quality.

Procedure 1102 begins at operation 1102-1 where the NCM 1036 sends an MX Path Estimation Request to the CCM 1006. At operation 1102-2, the CCM 1006 sends an MX Path Estimation Results message to the NCM 1036. The NCM 1036 may send one or more of the following configuration parameters in the MX Path Estimation Request (operation 1102-1) to the CCM 1006: Connection ID (of the delivery connection 1022 whose path quality needs to be estimated); Init Probe Test Duration (ms); Init Probe Test Rate (Mbps); Init Probe Size (bytes); Init Probe-ACK Required (0→No/1→Yes); Active Probe Frequency (ms); Active Probe Size (bytes); Active Probe Test Duration (ms); and Active Probe-ACK Required (0→No/1→Yes).

The CCM 1026 configures the C-MADP 1007 for probe receipt based on these parameters and for collection of the statistics according to the following configuration: Unique Session ID (session identifier provided to the client in an MX Capability Response); Init Probe Results Configuration (e.g., including Lost Probes (percent), and/or Probe Receiving Rate (packets per second)); Active Probe Results Configuration (e.g., including Average Throughput in the last Probe Duration).

The UP probing is divided into two phases: the Initialization phase and the Active phase. For the Initialization Phase, a network path that is not included by the N-MADP 1037 for transmission of user data is deemed to be in the Initialization phase. The user data may be transmitted over other available network paths. For the Active Phase, a network path that is included by the N-MADP 1037 for transmission of user data is deemed to be in the Active phase.

During the Initialization phase, the NCM 1036 configures the N-MADP 1037 to send an Init Probe-REQ message. The CCM 1006 collects the Init Probe statistics from the C-MADP 1007 and sends the MX Path Estimation Results message (operation 1102-2) to the NCM 1036 per the Initialization Probe Results configuration.

During the Active phase, the NCM 1036 configures the N-MADP 1037 to send an Active Probe-REQ message. The C-MADP 1007 calculates the metrics as specified by the Active Probe Results configuration. The CCM 1006 collects the Active Probe statistics from the C-MADP 1007 and sends the MX Path Estimation Results message to the NCM 1036 (operation 1102-2) per the Active Probe Results configuration.

FIG. 11 also shows an MX Control message format 1103. As shown, the MX Control message 1103 includes an IP header, a UDP header, and an MX Control PDU Payload 111$_3$. The MX Control PDU Payload 111$_3$ includes a type field, a CID field, and an MX Control Message 1110. The MX Control PDU 111$_3$ may include one or more of the following fields: Type (1 byte) to indicate the type of the MX Control message (a value of "0" indicates a Keep-Alive type, and a value of "1" indicates a Probe-REQ/ACK type; Others: Reserved); CID (1 byte) to indicate a connection ID of the delivery connection for sending the MX Control message 1103; and an MX Control Message 1110 (variable size/length) including the payload of the MX Control message 1110. The MX Control message 1103/PDU 1110 is sent as a normal UP packet over the desired delivery connection whose quality and reachability need to be determined.

The control message 1103/PDU 1110 may be encoded as a Keep-Alive and/or Probe-REQ/ACK messages to support path quality estimation. The "Type" field is set to "0" for Keep-Alive messages. The C-MADP 1007 may periodically send a Keep-Alive message over one or multiple delivery connections 1022-1 to 1022-n (e.g., ANCs 905, 906, and/or 907), especially if UDP tunneling is used as the adaptation method for the delivery connection 1022 with a NAT function on the path. A Keep-Alive message is 2 bytes long and includes a Keep-Alive Sequence Number field (2 bytes) to indicate the sequence number (SN) of the Keep-Alive message. The "Type" field is set to "1" for Probe-REQ/ACK messages. The N-MADP 1037 may send a probe request (Probe-REQ) message for path quality estimation. In response, the C-MADP 1007 may return a probe acknowledgement (Probe-ACK) message.

A Probe-REQ message may include one or more of the following fields: Probing Sequence Number (2 bytes) to indicate an SN of the Probe REQ message; Probing Flag (1 byte) where Bit 0 is a Probe-ACK flag to indicate whether the Probe-ACK message is expected (1) or not (0), Bit 1 is a Probe Type flag to indicate whether the Probe-REQ/ACK message was sent during the Initialization phase (0) when the network path is not included for transmission of user data, or during the Active phase (1) when the network path is included for transmission of user data, Bit 2 is a bit flag to indicate the presence of the Reverse Connection ID (R-CID) field, and Bits 3-7 are Reserved; Reverse Connection ID (R-CID) (1 byte) to indicate the connection ID of the delivery connection for sending the Probe-ACK message on the reverse path; and Padding (variable). The "Padding" field is used to control the length of the Probe-REQ message. The "R-CID" field is only present if both Bit 0 and Bit 2 of the "Probing Flag" field are set to "1". Moreover, Bit 2 of the "Probing Flag" field should be set to "0" if Bit 0 is "0", indicating that the Probe-ACK message is not expected. If the "R-CID" field is not present, but Bit 0 of the "Probing Flag" field is set to "1", the Probe-ACK message should be sent over the same delivery connection as the Probe-REQ message.

The C-MADP 1007 should send the Probe-ACK message in response to a Probe-REQ message with the Probe-ACK flag set to "1". A Probe-ACK message is 3 bytes long and includes a Probing Acknowledgment Number field (2 bytes) to indicate/include a sequence number of the corresponding Probe-REQ message.

The CCM 1006 and NCM 1036 exchange signaling messages to configure the UP functions via the C-MADP 1007 and the N-MADP 1037 at the client and the network, respectively. The means for the CCM 1006 to obtain the NCM 1036 credentials (e.g., Fully Qualified Domain Name (FQDN) or network address (e.g., IP address, or the like)) for sending the initial discovery messages are out of scope for this document. As an example, the client can obtain the NCM 1036 credentials by using such methods as provisioning or DNS queries. Once the discovery process is successful, the (initial) NCM 1036 can update and assign additional NCM 1036 addresses (e.g., based on Mobile Country Code (MCC)/Mobile Network Code (MNC) tuple information received in the MX Discover message) for sending subsequent CP messages.

The CCM 1006 discovers and exchanges capabilities with the NCM 1036. The NCM 1036 provides the credentials of the N-MADP 1037 endpoint and negotiates the parameters for the user plane with the CCM. The CCM 1006 configures the C-MADP 1007 to set up the UP path (e.g., MPTCP/UDP Proxy connection) with the N-MADP, based on the credentials (e.g., (MPTCP/UDP) Proxy network address (e.g., IP address or the like) and port, associated core network path), and the parameters exchanged with the NCM 1036. Further, the NCM 1036 and CCM 1006 exchange link status information to adapt traffic steering and UP treatment to dynamic network conditions.

After sending a MAMS control message, the MAMS CP peer (NCM 1036 or CCM 1006) waits for a duration of MAMS_TIMEOUT ms before timing out in cases where a response was expected. The sender of the message will retransmit the message for MAMS_RETRY times before declaring failure if no response is received. A failure implies that the MAMS peer is dead or unreachable, and the sender reverts to native non-multi-access/single-path mode. The CCM 1006 may initiate the MAMS discovery procedure for re-establishing the MAMS session.

MAMS CP peers execute the keep-alive procedures to ensure that the other peers are reachable and to recover from dead-peer scenarios. Each MAMS CP endpoint maintains a Keep-Alive timer that is set for a duration of MAMS_KEEP_ALIVE_TIMEOUT. The Keep-Alive timer is reset whenever the peer receives a MAMS control message. When the Keep-Alive timer expires, an MX Keep-Alive Request is sent.

The values for MAMS_RETRY and MAMS_KEEP_ALIVE_TIMEOUT parameters used in keep-alive procedures are deployment dependent. As an example, the client 1001 and network can obtain the values using provisioning. On receipt of an MX Keep-Alive Request, the receiver responds with an MX Keep-Alive Response. If the sender does not receive a MAMS control message in response to MAMS-_RETRY retries of the MX Keep-Alive Request, the MAMS peer declares that the peer is dead or unreachable. The CCM 1006 may initiate the MAMS discovery procedure for re-establishing the MAMS session.

Additionally, the CCM 1006 immediately sends an MX Keep-Alive Request to the NCM whenever it detects a handover from one (R)AN node 911 to another (R)AN node 911. During this time, the client 1001 stops using MAMS UP functionality in the UL direction until it receives an MX Keep-Alive Response from the NCM 1036.

The MX Keep-Alive Request includes the following information: Reason (e.g., can be timeout or handover. Handover shall be used by the CCM 1006 only on detection of a handover); Unique Session ID (Unique session identifier for the CCM 1006 that set up the connection. If the session already exists, then the existing unique session identifier is returned. An NCM ID is a unique identity of the NCM 1036 in the operator network, and the session ID is a unique identity assigned to the CCM 1006 instance by this NCM 1036 instance); Connection ID (if the reason is handover, the inclusion of this field may be mandatory); and Delivery Node ID (identity of the node to which the client is attached. In the case of LTE, this is an E-UTRAN Cell Global Identifier (ECGI). In the case of WiFi, this is an AP ID or a Media Access Control (MAC) address. If the reason is "Handover", the inclusion of this field may be mandatory).

The present disclosure provides new mechanisms to support dynamic traffic splitting/steering at the convergence (sub)layer in MAMS. Existing solutions include various are e2e protocols, such as multi-path TCP (MPTCP), to utilize multiple path or RATs to achieve higher throughput. However, these e2e protocol solutions are managed at the server, which is far away from the data splitting point, and therefore, result in relatively high feedback delay. Moreover, the existing solutions cannot access the radio layer information.

[GMA14] specifies how to dynamically split user data traffic over multiple links at the MX convergence sublayer. The present disclosure provides dynamic traffic splitting for different optimization targets such as reducing e2e delay (e.g., "low delay") or minimizing cellular (e.g., 5G/NR, LTE, etc.) usage (e.g., "low cost"). The present disclosure includes GMA-based traffic splitting that operates in the convergence layer of the MAMS framework (see e.g., FIGS. 9-11). The GMA-based traffic splitting mechanisms are transparent to lower layers and do not require any information from those layers. Two multi-path traffic splitting options are provided including a low delay and low cost options. Various Edge computing frameworks, such as the MEC framework discussed herein, may be used to operate/implement the GMA-based traffic splitting. One example implementation includes using the Smart-Edge/MEC platform provided by Intel®.

FIG. 12 depicts a network model (protocol stack) 1200 with a convergence layer. In FIG. 12, an application layer (including one or more apps) is on top of a transport layer (which includes at least one transport protocol), which is on top of a network layer (which includes at least one network protocol), which is on top of the convergence layer (which includes at least one convergence protocol, which is GMA in this example), which is on top of a link layer (which includes 1 to N RAT protocols (where N is a number)). The transport layer protocol may implement one or more transport protocols such as, for example, TCP, UDP, QUIC, and/or any other suitable transport protocol such as those discussed herein. Additionally or alternatively, the network layer protocol may be IP and/or any other suitable network protocol such as any of those discussed herein.

Figure 13:
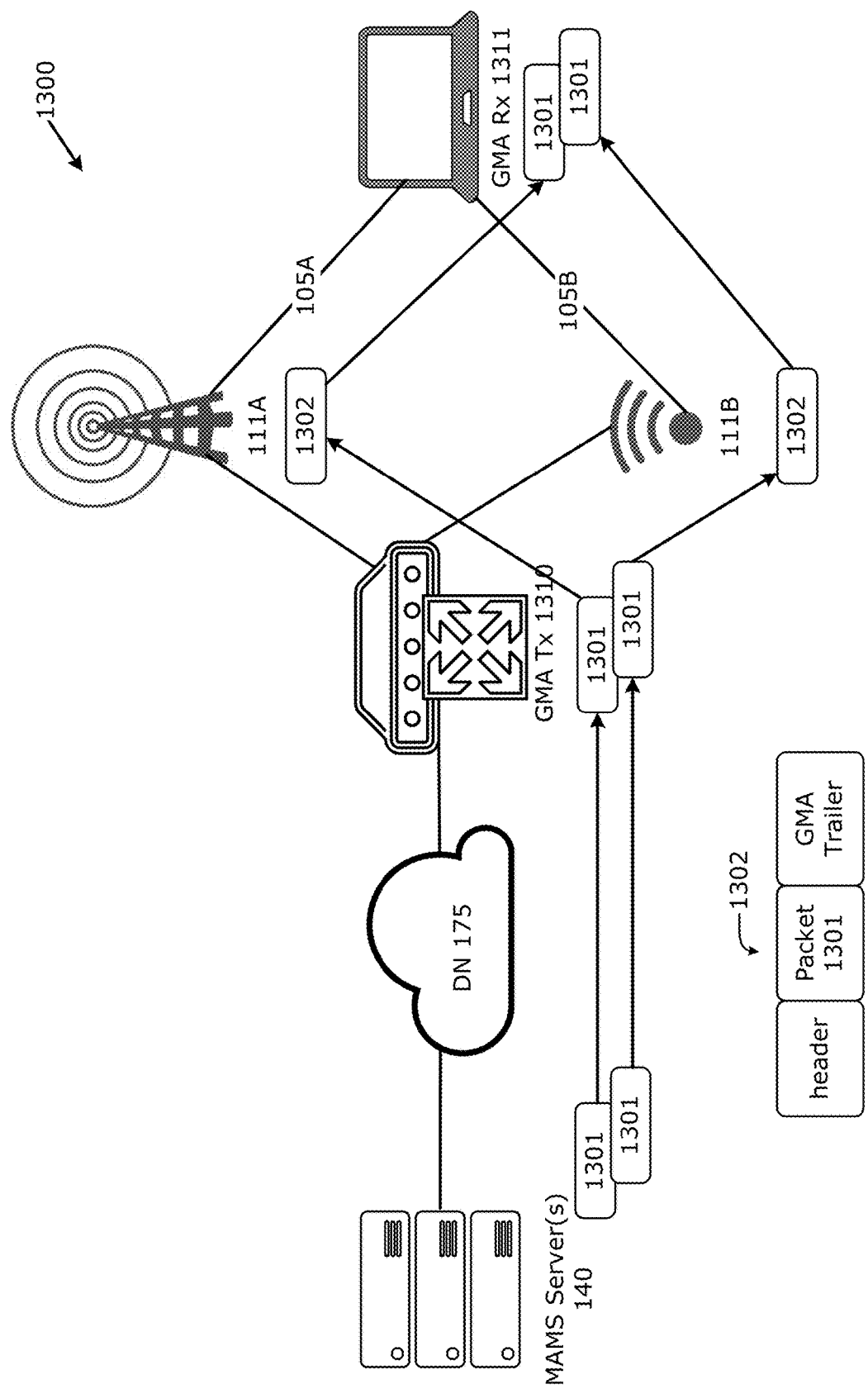
FIG. 13 depicts an example of GMA-based multi-access traffic splitting for downlink.

FIG. 13 shows a GMA multi-access traffic splitting example 1300 for a downlink direction. In the example 1300, data packets 1301 are sent by the MAMS server(s) 940 to a GMA transmitter (Tx) 1310 via the DN 975 (e.g., the Internet). The data packets 1301 may have any suitable network protocol format; for example, the data packets 1301 may be IP packets or the like. The GMA Tx 1310 sends one or more packets to NAN 911A for delivery to a GMA receiver (Rx) 1311 (e.g., client 901) and sends one or more packets to NAN 911B for delivery to the GMA Rx 1311 (e.g., client 901). The NANs 911A, 911B generate encapsulated packets 1302 from the packets 1301 by adding a header (e.g., an IP header) and a GMA trailer (discussed in more detail infra) to each packet 1301. The encapsulated packets 1302 are then sent to the client 901 over the respective access network connections 905. The methods for encapsulating the packets 1301 is discussed in [GMA14].

The main responsibilities of the convergence protocol (see e.g., FIG. 12) is based on whether the entity is acting as a GMA Tx entity 1310 or a GMA Rx entity 1311. The GMA Tx entity 1310 splits or duplicates traffic over multiple radio links 905 and retransmits packets over a different radio link 905 based on e2e measurements. The GMA Rx entity 1311 reorders packets received over different radio links 905 and forwards those packets to higher layer entities, in sequence.

2.1. Generic Multi-Access (GMA) Encapsulation Protocol

As alluded to previously, for MX devices, it is desirable to combine the multiple access network connections seamlessly to improve quality of experience. Such optimization may require additional control information, for example, Sequence Number (SN), in each data packet (e.g., IP packet). The Generic Multi-Access (GMA) Encapsulation Protocol discussed in [GMA14] is a new light-weight and flexible encapsulation protocol for this purpose.

Referring back to FIG. 9, the convergence (sub)layer in the MAMS DPPS is responsible for multi-access operations, including multi-link (path) aggregation, splitting/reordering, lossless switching/retransmission, fragmentation, concatenation, etc. It operates on top of the adaptation (sub)layer in the protocol stack 902, 942. From the Tx perspective, a User Payload (e.g., IP packet) is processed by the convergence layer first, and then by the adaptation layer before being transported over a delivery connection; from the Receiver perspective, an IP packet received over a delivery connection is processed by the adaptation layer first, and then by the convergence layer.

Today, Generic Routing Encapsulation (GRE) is used as the encapsulation protocol at the convergence layer to encode additional control information (e.g., Key, Sequence Number) (see e.g., 3GPP TS 36.361 v15.0.0 (2018 Jul. 9) ("[LWIPEP]"), Dommety, G., "Key and Sequence Number Extensions to GRE", IETF RFC 2890, (September 2000) ("[GRE1]"), and Leymann et al., "Huawei's GRE Tunnel Bonding Protocol", IETF RFC 8157 (May 2017) ("[GRE2]"). However, there are two main drawbacks with this approach including, for example, IP-over-IP tunneling (required for GRE) leads to higher overhead especially for small packets; and it is difficult to introduce new control fields. For example, the overhead of IP-over-IP/GRE tunneling with both Key and Sequence Number is 32 Bytes (20 Bytes IP header+12 Bytes GRE header), which is 80% of a 40 Bytes TCP ACK packet.

The GMA encapsulation protocol is implemented at the convergence layer. GMA supports three encapsulation methods/formats: trailer-based IP encapsulation, header-based IP encapsulation, and non-IP encapsulation. Particularly, the IP Encapsulation methods avoid IP-over-IP tunneling overhead (e.g., 20 Bytes), which is 50% of a 40 Bytes TCP ACK packet. Moreover, GMA introduces new control fields to support fragmentation and concatenation, which are not available in conventional GRE-based solutions such as in [LWIPEP], [GRE1], and [GRE2].

GMA operates between endpoints that have been configured to operate with GMA through additional control messages and procedures (see e.g., [RFC8743]). Moreover, UDP or IPSec tunneling may be used at the adaptation sublayer to protect GMA operation from intermediary nodes (e.g., access nodes, edge nodes, etc.).

As shown by FIG. 9, a client device 901 (e.g., a smartphone, laptop, IoT device, etc.) may connect to the Internet via multiple access network connections 905. One of these connections (e.g., connection 905A) may operate as an anchor connection, and the other connection (e.g., connection 905B) may operate as the delivery connection. The anchor connection provides the network address (e.g., IP address or the like) and connectivity for end-to-end (e2e) Internet access, and the delivery connection provides additional path between the client 901 and the MX gateway (e.g., MX server 940) for multi-access optimizations. In some implementations, the anchor connection when GMA is used may be a virtual IP connection similar to what is used in a VPN, and there may be up to two simultaneous delivery connections (e.g., 5G/NR, LTE, WiFi, etc.), each of which has a dedicated UDP tunnel established over for data transfer.

For example, per-packet aggregation allows a single IP flow to use the combined bandwidth of the two connections. In another example, packets lost due to temporarily link outage may be retransmitted. Moreover, packets may be duplicated over multiple connections to achieve high reliability and low latency, and duplicated packets should be eliminated by the receiving side. Such multi-access optimization requires additional control information (e.g., SN) in each IP data packet, which can be supported by the GMA encapsulation protocol described herein and/or in [GMA14].

GMA is usually used when multiple access network connections are used, but may also be used when only a single access network connection is used. In these scenarios, GMA may be used for loss detection and recovery purposes, or used to concatenate multiple small packets to reduce per packet overhead/resource consumption.

FIG. 14 shows an OTT GMA E2E Network Reference Architecture 1400. In FIG. 14, the MA client 901 includes the CCM 1006, which is a control-plane functional entity in the client 901 that exchanges MAMS control messages with the NCM 1036 and configures multiple network paths at the client for transport of user data. The CCM 1006 is communicatively coupled with a GMA client (Gc) 1401 in the MA client 901.

The Gc 1401 is a data plane functional entity in the client 901 that handles user data forwarding across multiple network paths 905 and MA convergence operations (e.g., splitting, steering, duplication, measurement, etc.). The Gc 1401 operates its own GMA protocol stack, which include the GMA data plane layer, which is on top of respective transport layers Tms-1 and Tms-2 (e.g., TCP, UDP, etc.), which are on top of respective network layers Net-1 and Net-2 (e.g., IP or the like). The respective network layers interact with respective access layer entities RAT-1 and RAT-2. In this example RAT-A is a WiFi station (STA) and RAT-B is an LTE UE.

The MA server 940 includes the NCM 1036, which is control-plane functional entity in the network that handles MAMS control messages from the client 901, 9 and configures distribution of data packets over multiple network paths, and user plane treatment of the traffic flows. The NCM 1036 is communicatively coupled with a GMA server (Gs) 1440 in the MA server 940. The Gs 1440 is a data plane functional entity in the network that handles user data forwarding across multiple network paths 907 and MA convergence operations (e.g., splitting, steering, duplication, measurement, etc.). The Gs 1440 includes a GMA protocol stack that is the same or similar to the GMA protocol stack in the Gc 1401. Furthermore, the MA server 940, and in particular the Gs 1440, may be communicatively coupled with a NAT/Firewall gateway 1450. The NAT/Firewall gateway 1450 may be disposed between the MA server 940 and a DN 970, 975 (e.g., the Internet, an enterprise network, a local area DN, and/or the like).

A websocket-based (e.g., TCP, UDP, etc.) secure connection is established between the CCM 1006 and NCM 1036 to exchange MAMS management messages 1430, which are used for configuring the data plane functions (e.g., Gc 1401 and Gs 1440). The MAMS management messages 1430 are discussed in more detail infra.

There are two types of connections in a GMA system 1400: anchor connections and delivery connections. An anchor connection is an IP connection that is used by applications for e2edata transfer. A delivery connection is a network connection (e.g., IP connection) that is used to deliver user data between the Gc 1401 and the Gs 1440. The anchor connection in the OTA GMA system 1400 is virtual network (e.g., IP) connection, which is similar to what is used in virtual private networks (VPNs). In some implementations, there may be up to two simultaneous delivery connections (e.g., 5G/NR, LTE, WiFi, etc.) each of which has a dedicated tunnel (e.g., UDP tunnel or the like) established for data transfer.

Figure 16:
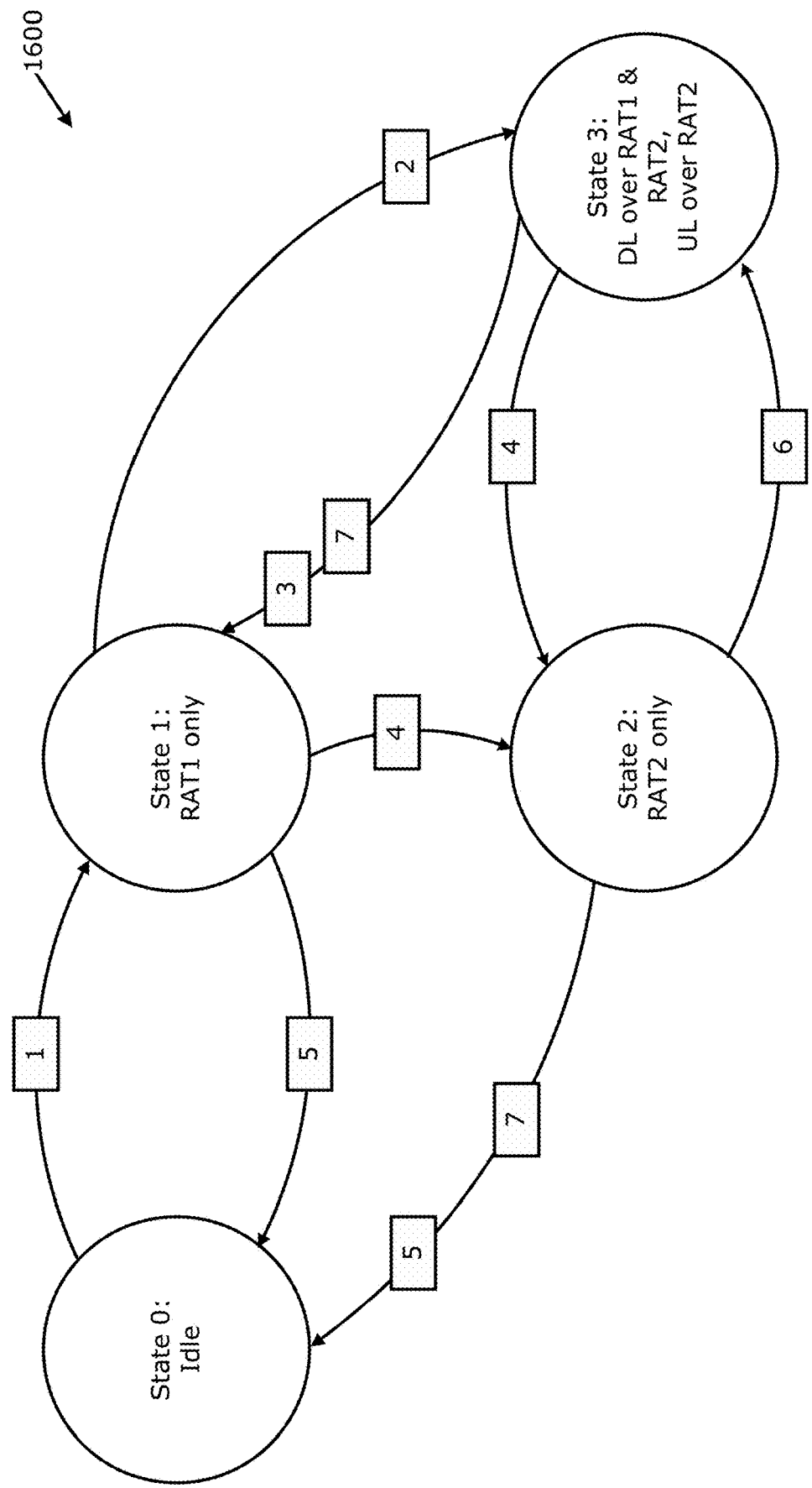
FIG. 16 illustrates a client-based GMA Data Traffic Control State Machine.

The Gc 1401 and/or the Gs 1440 select the delivery connection for MAMS messages based on a current state of the Gc 1401 and/or the Gs 1440, which may include one or more of the following: send all MAMS messages over a first (preferred) delivery connection (e.g., WiFi) in state 1 or 3 (see e.g., FIG. 16); and send all MAMS message over the second delivery connection (e.g., Cellular) in state 2 or 4 (see e.g., FIG. 16).

In one example implementation, the NAN 911A is a cellular base station such as a 5G/NR gNB, an LTE eNB, and/or the like, and the GW 1420A comprises one or more servers operating as an Evolved Packet Core (EPC) for LTE implementations or a 5G system (5GS)/5G core network (5GC) for 5G/NR implementations. In this example implementation, the one or more servers operate one or more network functions (NFs) such as a UPF in 5G/NR implementations, a Serving Gateway (S-GW) and/or Packet Data Network Gateway (P-GW) in LTE implementations, or the like. In this example implementation, connection 906A is an N3 reference point/interface for 5G/NR implementations or an S1 reference point/interface for LTE implementations, and connection 907A is an N6 reference point/interface for 5G/NR implementations or an SGi reference point/interface for LTE implementations.

In another example implementation (with may be combined with the previously described example implementation), the NAN 911B is a WLAN access point (AP) such as a WiFi AP, and the GW 1420B comprises one or more servers and/or network elements operating as a WLAN (WiFi) access gateway (WAG), a broadband network gateway (BNG), and/or the like. In this example implementation, each of connection 906B and connection 907B may be a suitable tunneling interface/link such as a GRE tunnel, general packet radio service (GPRS) Tunneling Protocol (GTP) tunnel, Mobile IP (MIP), a Proxy MIP (PMIP) tunnel, VPN tunnel, and/or the like. The connection 906B and connection 907B may utilize the same or different tunneling protocols and/or communication technologies.

Figure 15:
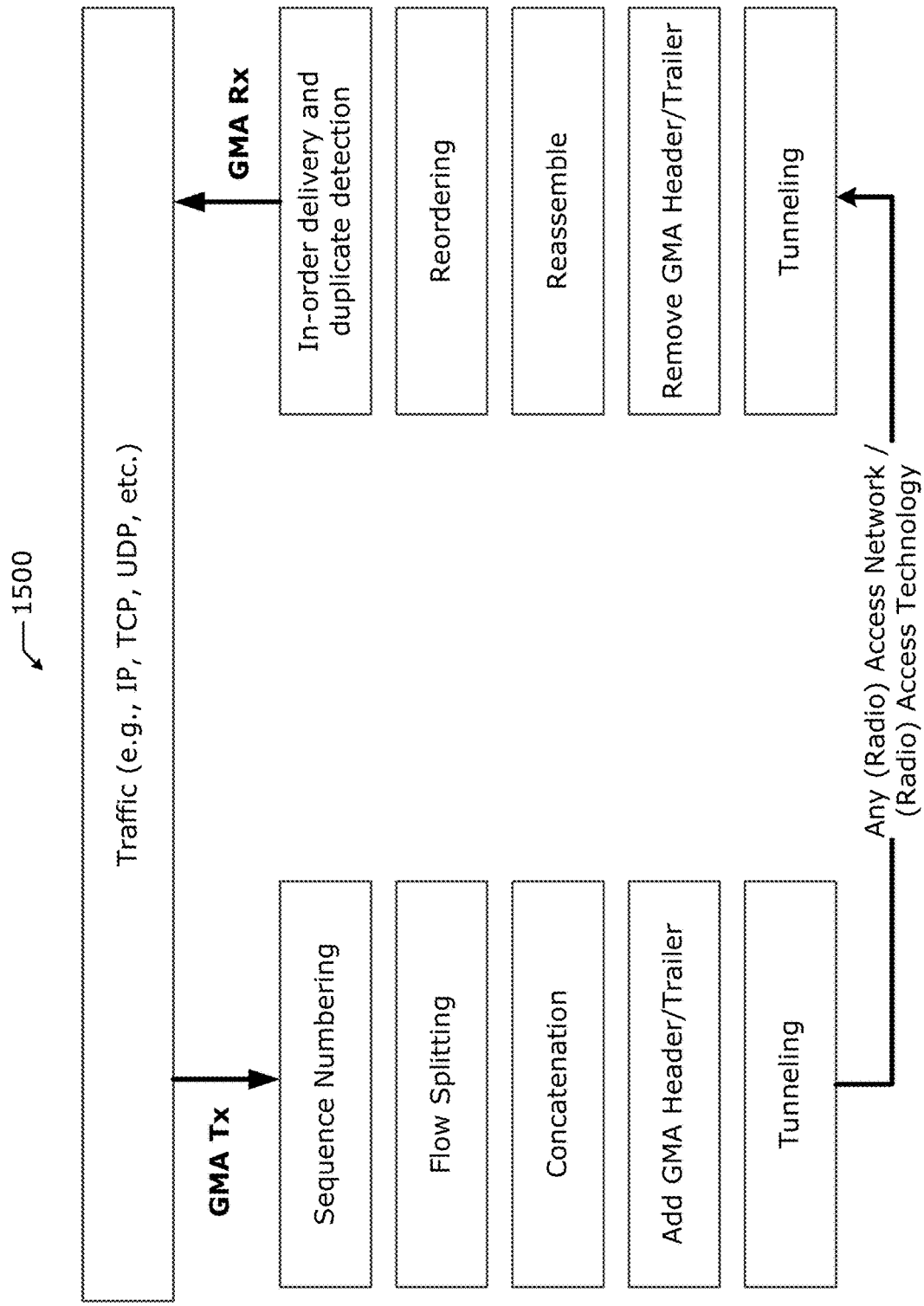
FIG. 15 depicts an example of GMA data plane functionalities.

FIG. 15 shows functionalities of a GMA data plane entity 1500. The GMA data plane entity 1500 corresponds to the Gs 1440 and/or the Gc 1401 discussed previously with respect to FIG. 14 (or corresponds to the GMA data-plane layer within the Gs 1440 and/or the Gc 1401). Here, the GMA data plane acts as a generic convergence layer for any (radio) access network and/or (radio) access technology. The GMA data plane entity 1500 performs various functions such as path quality measurements (QoS, packet loss, latency, etc.), multi-link traffic steering (e.g., traffic splitting/steering, reordering, retransmission, duplication, coding, fragmentation, concatenation, etc.), and QoS-aware traffic shaping and queuing (e.g., priority queuing (PQ), Strict Priority (SP), Weighted Round Robin (WRR), etc.).

The GMA data plane entity 1500 at a GMA Tx prepares traffic (e.g., IP, TCP, UDP, etc.) for transmission to a GMA Rx. The GMA Tx provides sequence number to packets, performs flow (traffic) splitting wherein packets are split or distributed to different multiple access networks (or RATs), simultaneously for delivery to the GMA Rx. The GMA Tx also performs concatenation, which involves putting multiple SDUs into one PDU to reduce packet processing and tunneling overhead, thereby improving signaling and processing efficiency. The GMA Tx also adds a GMA header or trailer to the packet(s) and performs tunneling by, for example, repackaging the packet according to a suitable GMA tunneling protocol. The packet(s) is/are then transmitted over a suitable access network (e.g., one of the different (R)ANs/(R)ATs discussed herein).

The GMA Rx receives the packet(s) and unpackages the packet(s) according to the tunneling protocol being used, and removes the GMA header/trailer. The GMA Rx also reassembles and reorders the packet(s) that are delivered over multiple access networks based on the sequence numbers provided by the GMA Tx. The GMA Rx then performs duplicate detection to identify (and discard) and duplicate packets, and then delivers, in-order, the reassembled and reordered packet(s) to higher layers Additionally or alternatively, the GMA data plane entity 1500 provides lossless switching, which involves the retransmission and/or recovery of packets that may be lost when switching from one network access path to another network access path. Additionally or alternatively, the GMA data plane entity 1500 performs or provides path quality measurements, which includes passive and active measurements of QoS parameters such as, for example, packet loss rate, round trip time, among many others (such as the various measurements discussed herein). Additionally or alternatively, the GMA data plane entity 1500 performs other functions such as automatic repeat request (ARQ)-like retransmission, duplication, network coding, traffic shaping/queuing, and/or the like.

FIG. 16 illustrates a client-based GMA data traffic control state machine 1600. The data traffic control state machine 1600 includes the following states:

State 0 (Idle): the (anchor) virtual connection is down.

State 1 (RAT1 only): all data traffic (DL and UL) are delivered over the first (preferred) RAT connection (RAT1).

State 2 (RAT2 only): all data traffic are delivered over the second connection (RAT2).

State 3 (DL over RAT1 & RAT2, UL over RAT2): DL traffic are delivered over both connections, and UL traffic are delivered over the second connection (RAT2).

The data traffic control state machine 1600 includes the following state-transition triggers:

(1) The (anchor) virtual connection is established successfully. This trigger causes a transition from state 0 to state 1.

(2) Congestion is detected over the RAT1 DL and RAT2 Link Success has been declared/detected wherein the last control message over RAT2 was successful. This trigger causes a transition from state 1 to state 3. In some implementations, congestion detection (based on packet loss) is applicable only if the RAT1 Congestion Detection flag is disabled.

(3) Congestion is no longer present over the RAT1 DL (applicable only if the RAT1 Congestion Detection flag is disabled). This trigger causes a transition from state 3 to state 1.

(4) RAT1 received signal quality (or received signal strength) is relatively poor (e.g. <−75 decibel-milliwatts (dBm)) and/or RAT1 has declared or detected a link failure (or Radio Link Failure (RLF)). The particular mechanism for detecting and/or declaring a link failure (or RLF) is defined by the standards/specifications of RAT1. This trigger causes a transition from state 1 to state 2 or a transition from state 3 to state 2.

(5) The GMA/MAMS operation is terminated or suspended. Termination of the GMA/MAMS operation may include a delivery connection (RAT2 or RAT1) being lost for a predefined period (e.g., 10 minutes or some other amount of time) and/or total throughput is relatively low (e.g., <10 kilobits per second (Kbps)). Suspended GMA/MAMS operation may include a screen being off and/or total throughput is low (e.g., <10 Kbps). This trigger causes a transition from state 1 to state 0 or a transition from state 2 to state 1.

(6) RAT1 received signal quality is relatively good (e.g., >−70 dBm) and RAT1 has detected/declared a Link Success. This trigger causes a transition from state 2 to state 3.

(7) RAT2 has detected/declared a link failure (or RLF). The particular mechanism for detecting and/or declaring a link failure (or RLF) is defined by the standards/specifications of RAT2. This trigger causes a transition from state 3 to state 1 or a transition from state 2 to state 0.

If a link is declared "Link Failure", it should not be used to send any data or control packets, except "Probe/ACK", and the "Link Failure" status can only be turned off after successfully transmitting a probe message over the link.

The following three flows are defined for data traffic:

High Reliability (Flow ID=1): High Reliability traffic will be delivered by duplication over both RAT1 and RAT2 in state 1, 2 and 3. Notice that the receiver will be responsible for detecting and removing duplicated packet based on their sequence number (using the algorithm defined in 6.6.1). Notice that high reliability flow should have low data rate (e.g., <1 Mbps).

Delay Sensitive (Flow ID=2): Delay Sensitive traffic will be delivered over RAT2 only in State 1, 2 and 3.

High Throughput (Flow ID=3): High Throughput (e.g., DL) traffic will be delivered by aggregation over both RAT1 and RAT2 in State 3, and the receiver (Gc) will be responsible for reordering packets using algorithm defined in 6.6.1 or 6.6.2. UL traffic will be delivered by RAT1 in state 1 and by RAT2 in state 2. In state 3, UL traffic will be delivered by RAT2 if the "UL-over-RAT2 flag" is set to "1", and by RAT1 otherwise. The default value of "UL-over-RAT2 flag" is 0 (disabled).

In the example of FIG. 16, RAT1 may be a WLAN RAT (e.g., WiFi) and RAT2 may be a cellular RAT (e.g., 5G/NR, LTE, GSM, GPRS, WiMAX, etc.). The specific RAT protocols may define the mechanisms and/or parameters for determining Link Failures and/or Link Successes.

Figure 17:
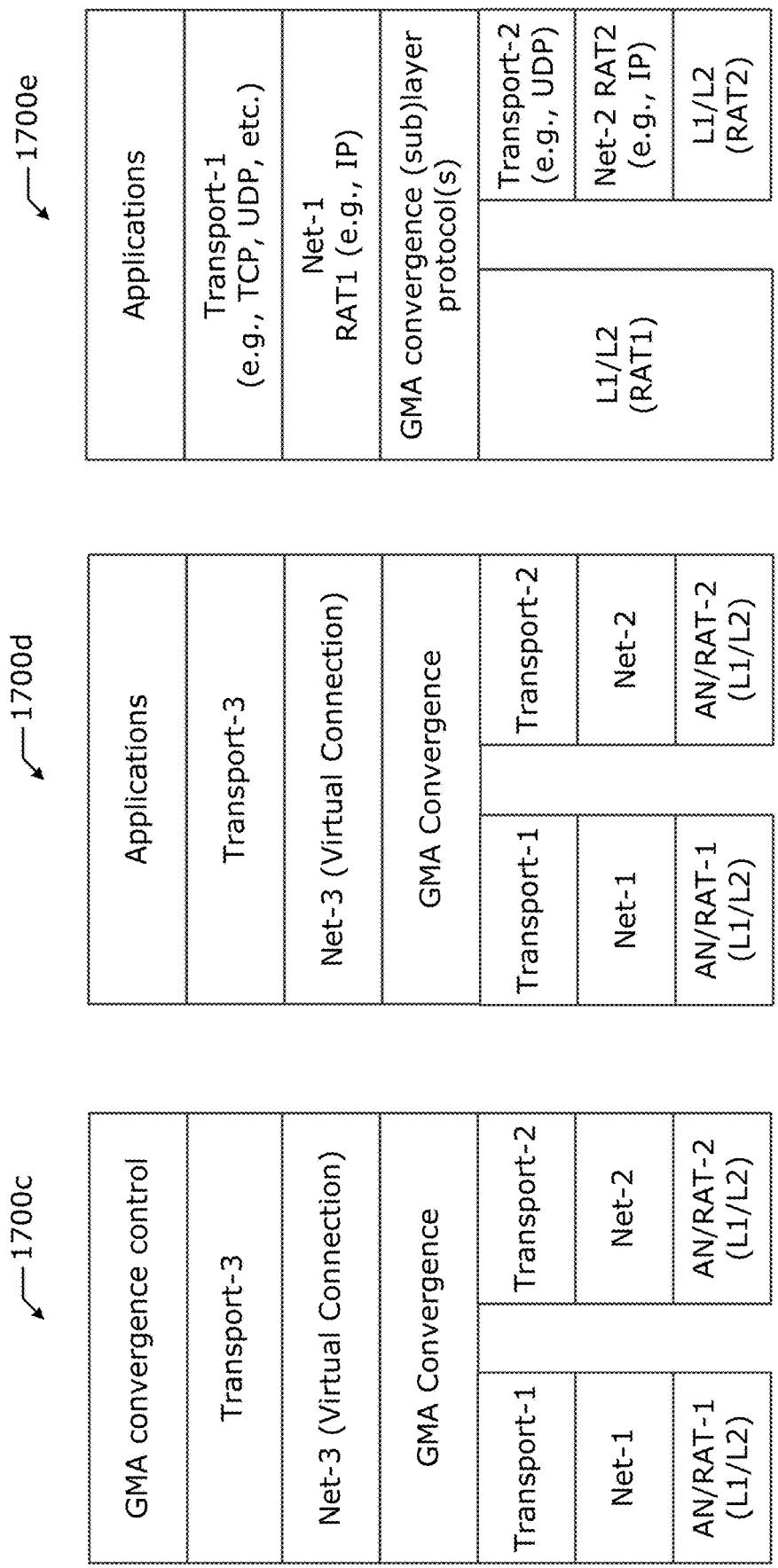
FIG. 17 depicts an example GMA-based data plane protocol stack for OTT MAMS deployments and a GMA-based MAMS data plane protocol stack.

FIG. 17 depicts an example GMA convergence control protocol stack 1700c. The GMA convergence control protocol stack 1700c includes a GMA convergence control layer which includes GMA/MAMS control messages. Additionally, a third transport layer (e.g., UDP or IP Security Protocol (IPSec)) tunnel is established over a virtual (anchor) IP connection (IP-3) for sending time-sensitive control messages (e.g., probes, traffic splitting updates, etc.).

The virtual (anchor) IP connection is on top of a GMA convergence layer (also referred to as a "GMA encapsulation layer"). This allows the (virtual) IP packets carrying a GMA control message(s) to be encapsulated with a GMA header, which only includes a 2B Flag field (discussed infra) where the Flag field is set to all "0" s. The GMA encapsulation layer resides on top of respective transport (e.g., UDP or IPSec) tunneling layers for respective access networks (ANs) 1 and 2, which is on top of respective IP layers, which are on top of layer 2 (L2) and Layer 1 (L1) of the respective ANs 1 and 2. The anchor connection is now virtual and no longer tied to any specific access network (e.g., AN1 and AN2 in the example of FIG. 17).

FIG. 17 also shows an example GMA convergence data protocol stack 1700d. The GMA convergence data protocol stack 1700d is similar to the GMA convergence control protocol stack 1700c except that the GMA convergence control layer in the stack 1700c is replaced with an applications layer.

Figure 18:
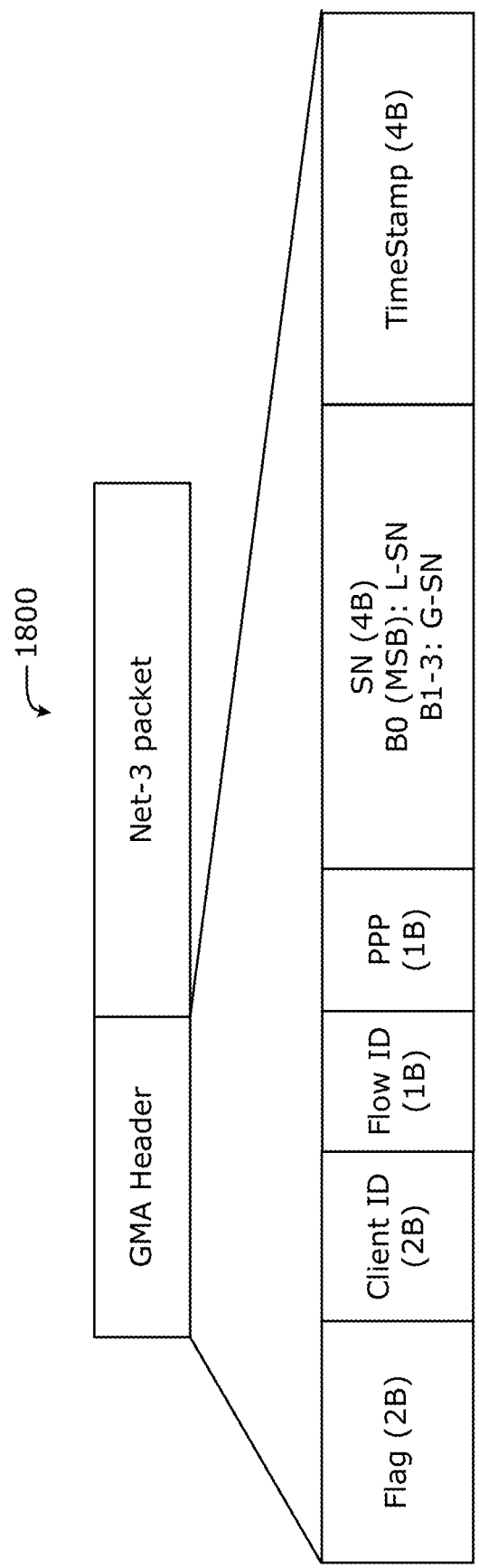
FIG. 18 depicts GMA convergence protocol data unit (PDU) format.

In both stacks stack 1700c, stack 1700d, a new protocol layer, the GMA convergence (also referred to as Trailer-based MAMS convergence [UPMAMS]) layer, is introduced to handle all multi-path (management) related operations (e.g., concatenation, splitting, reordering, duplication, elimination, measurements, etc.). In some implementations, the GMA convergence layer encapsulates the data and/or control messages using a GMA header-based encapsulation format is used as shown in FIG. 18. The GMA convergence encapsulation protocol is discussed in [GMA14]. When an access network 910 does not support any MAMS network functions, the virtual connection is established between an end-device (e.g., client device 901) and cloud server or Edge server. This virtual connection may then be used as the anchor connection for cloud applications or Edge applications. The virtual anchor connections may be an IP connection that is used by applications for e2e data transfer. The other connections (e.g., delivery connections) of AN1 and AN2 may be IP connections to deliver user data between the client and server. Additionally, the existing MAMS convergence sublayer functionalities [UPMAMS] can be reused as-is. Additionally or alternatively, the virtual (anchor) connection is established for sending time-sensitive MAMS control/management messages (e.g., probes, traffic splitting updates, etc.) The (virtual) packets carrying a GMA control/management messages are also encapsulated with the GMA header, which is also discussed in more detail infra FIG. 18 depicts GMA convergence protocol data unit (PDU) format 1800. The PDU 1800 includes a GMA header and an IP packet. The GMA header is discussed in more detail infra. In this example, the PDU 1800 includes a flag field (2 bits (B), a client ID field (2B), a flow ID field (1B), a Per-Packet Priority (PPP) field 1B), a sequence number (SN) field (4B), and a timestamp field (4B) as follows where Bit 0 is the most significant bit (MSB) and Bit 15 is the least significant bit (LSB): Bit #0 (MSB): Client ID; Bit #1; Flow ID; Bit #2: Per-Packet Priority (PPP); Bit #3: Sequence Number (B0: L-SN, B1-B3: G-SN); Bit #4: Timestamp; and Bit #13~15: GMA protocol (e.g., "0x07").

The B0 of the SN field includes is an L-SN (sub)field and B1-B3 of the SN field is a G-SN (sub)field. The G-SN is for reordering and the L-SN is for packet loss measurement. The (2B) flag field indicates what additional fields are included in the GMA header. The following bits in the flag field may include a first value if the packet 1800 carries downlink data (e.g., "0xF807"), a second value if the packet carries uplink data (e.g., "0x7807"), a third value if the packet 1800 carries an encrypted control message (e.g., "0x800F"), or a fourth value if the packet 1800 carries an un encrypted control message (e.g., "0x0000"). Additionally or alternatively, if the packet 1800 carries uplink data, the "Client ID" field is not be included in the GMA header. Additionally or alternatively, if the packet 1800 carries an encrypted control message, it may include the following fields: Bit #0 (MSB): Client ID; Bit #12: Encryption Enabled; and Bit #13~15: GMA protocol (e.g., "0x07").

As shown in FIGS. 11, 17, and 18, there are three different network addresses (e.g., IP addresses) and three transport connections (e.g., UDP, TCP, etc.) for each client in a GMA system. The network address (e.g., IP address) of each delivery connection on the client is configured by a respective access network. All other network addresses (e.g., IP address) and transport ports (e.g., UDP, TCP ports, or the like) are configured in the GMA system through either client configuration or MAMS messages.

2.1.1. GMA Encapsulation Methods and Formats

The GMA encapsulation protocol supports the following three methods: trailer-based IP encapsulation; header-based IP encapsulation; and (header-based) non-IP encapsulation. Trailer-based IP encapsulation should be used as long as implementation allows. Header-based encapsulation should be used if trailered-based encapsulation is not feasible due to any reason (e.g., implementation constraints). In this case, if the adaptation layer (e.g., UDP tunneling) supports non-IP packet format, header-based non-IP encapsulation should be used; otherwise, header-based IP encapsulation should be used.

If non-IP encapsulation is configured, GMA header should always be present in every packet. In comparison, if IP encapsulation is configured, GMA header or trailer may be added dynamically on per-packet basis, and it indicates the presence of GMA header (or trailer) to set the protocol type of the GMA PDU to "114".

The GMA endpoints may configure the encapsulation method through control signaling (see e.g., FIG. 10) or pre-configuration. For example, an "MX UP Setup Configuration Request" message as discussed in [RFC8743] includes the "MX Convergence Method Parameters," which provides the list of parameters to configure the convergence layer, and can be extended to indicate the GMA encapsulation method. A "GMA encapsulation format" parameter may be included to indicate one of the three GMA encapsulation methods.

Figure 19:
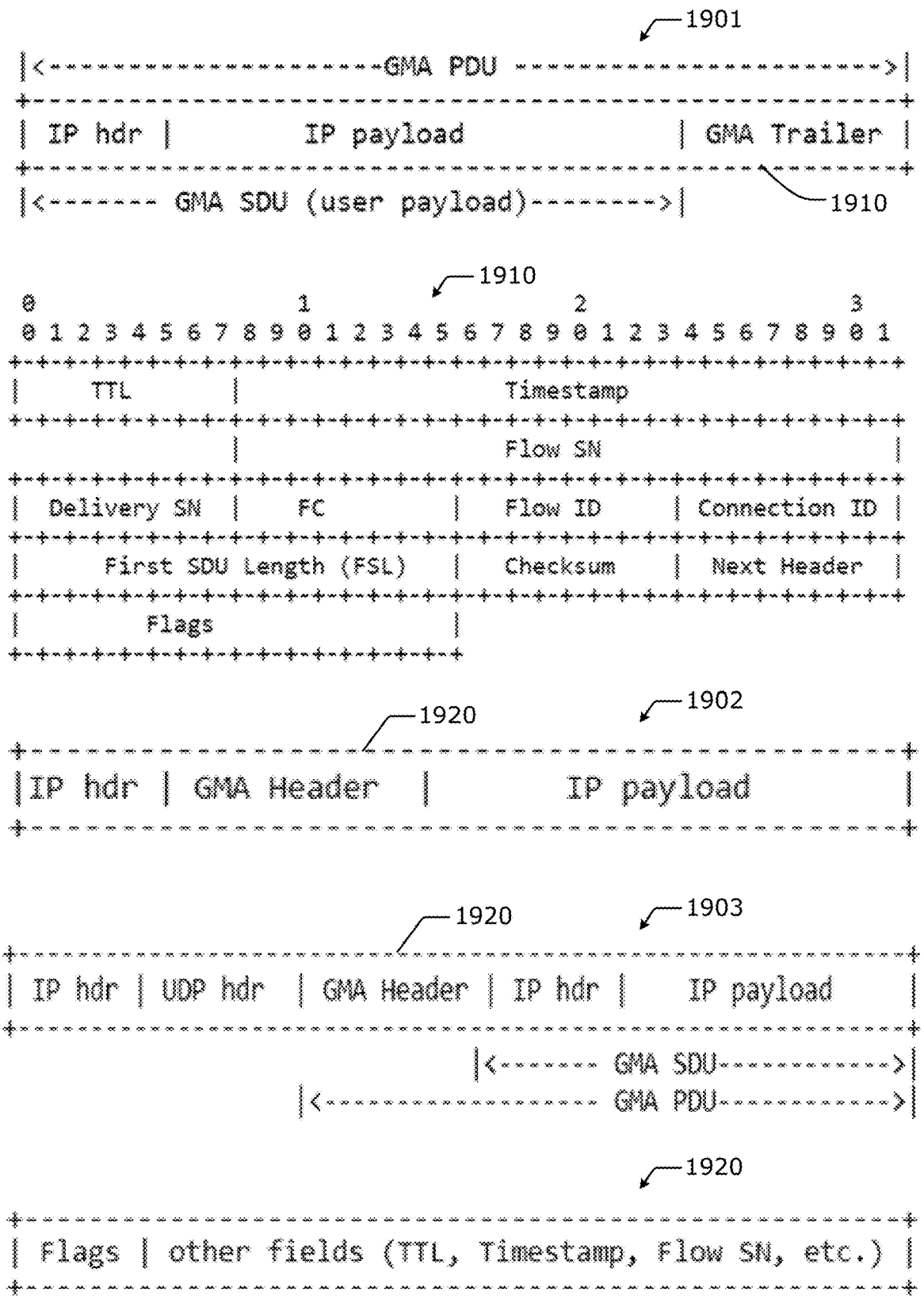
FIG. 19 illustrates various GMA packet formats.

FIG. 19 shows various GMA Protocol Data Unit (PDU) formats including a GMA PDU Format with Trailer-based IP Encapsulation 1901, a GMA PDU Format with Header-based IP Encapsulation 1902, and a GMA PDU Format with Non-IP Encapsulation 1903. Each GMA PDU (regardless of the particular format used) may carry one or more IP packets (also referred to as (GMA) service data units (SDUs)), or a fragment of an IP packet (or (GMA) SDU fragment), in the payload section of the PDU.

The GMA PDU 1901 includes an IP header, IP payload, and a GMA trailer 1910. The other GMA PDUs 1902 and 1903 include a GMA header 420 instead of the GMA trailer 1910. The GMA trailer 1910 and GMA header 1920 include various GMA control fields. Usually, the trailer-based IP encapsulation GMA PDU 1901 is used as long as implementation allows/permits. However, the header-based encapsulation PDUs 1902 and 1903 may be used if the GMA control fields cannot be added at the end of the packets.

2.1.1.1. Trailer-Based IP Encapsulation

For the trailer-based GMA PDU 1901, the Protocol Type field in the IP header is changed to "114" (any 0-hop protocol) to indicate the presence of the GMA trailer 1910. If the original IP packet is IPv4, the following three IP header fields may be changed: IP length field: add the length of the "GMA Trailer" to the length of the original IP packet); Time to Live (TTL): set the TTL field to "1"; and IP checksum field: recalculate IP checksum after changing the "Protocol Type" field, "TTL", and "IP Length".

If the original IP packet is Ipv6, the following two IP header fields may be changed: IP length field: add the length of the "GMA Trailer" to the length of the original IP packet; Hop Limit (HL) field: set the HL field to "0".

If UDP tunneling is used at the adaptation layer to carry the GMA PDU 1901, 1902 or 1903, these three IP header fields may remain unchanged, and the Rx will determine the GMA PDU length based on the UDP packet length.

FIG. 19 also shows an example format of the GMA trailer 1910, which shows various control fields present. The GMA trailer 1910 includes one or more mandatory fields and zero or more optional fields. The mandatory fields include the "flags" field and "next header" field, which are the last 3 bytes of the GMA trailer 1910. The Next Header field (1 Byte) indicates the IP protocol type of the (first) SDU in a PDU, and it stores the value before it was overwritten to '114.' For the Flags field (2 Bytes), Bit 0 is the most significant bit (MSB), and Bit 15 is the least significant bit (LSB). The Flags field includes the following fields: Checksum Present (bit 0): If the Checksum Present bit is set to 1, then the Checksum field is present; Concatenation Present (bit 1): If the Concatenation Present bit is set to 1, then the PDU carries multiple SDUs, and the First SDU Length field is present; Connection ID Present (bit 2): If the Connection ID Present bit is set to 1, then the Connection ID field is present; Flow ID Present (bit 3): If the Flow ID Present bit is set to 1, then the Flow ID field is present; Fragmentation Present (bit 4): If the Fragmentation Present bit is set to 1, then the PDU carry a fragment of the SDU and the Fragmentation Control field is present; Delivery Sequence Number (SN) Present (bit 5): If the Delivery Sequence Number (SN) Present bit is set to 1, then the Delivery SN field is present and contains the valid information; Flow SN Present (bit 6): If the Flow SN Present bit is set to 1, then the Sequence Number field is present; Timestamp Present (bit 7): If the Timestamp Present bit is set to 1, then the Timestamp field is present; TTL Present (bit 8): If the TTL Present bit is set to 1, then the TTL field is present; Reserved (bit 9-12): set to "0" and ignored on receipt; Version (bit 13~15): GMA version number, set to 0 for the GMA encapsulation protocol specified in [GMA14]. The Flags field is at the end of the PDU and the Next Header field is the second to last field. The GMA Rx may decode the Flags field first to determine the length of the GMA trailer, and then decodes the one or more optional fields included in the GMA PDU (discussed infra).

The GMA trailer 1910 may also include zero or more of the following optional fields: Checksum (1 Byte) to contain the (one's complement) checksum sum of all the 8 bits in the trailer 1910 (for purposes of computing the checksum, the value of the checksum field is Zero; this field is present only if the Checksum Present bit is set to one); First SDU Length (2 Bytes) indicates the length of the first IP packet in the PDU, only included if a PDU contains multiple IP packets (e.g., this field is present only if the Concatenation Present bit is set to one); Connection ID (1 Byte) includes an unsigned integer to identify the anchor and/or delivery connection of the GMA PDU (e.g., this field is present only if the Connection ID Present bit is set to one): the Anchor Connection ID data element/field (MSB 4 Bits of the Connection ID field) is an unsigned integer to identify the anchor connection, and the Delivery Connection ID data element/field (LSB 4 Bits of the Connection ID field) is an unsigned integer to identify the delivery connection; Flow ID (1 Byte) includes an unsigned integer to identify the IP flow that a PDU belongs to, for example, Data Radio Bearer (DRB) ID [LWIPEP] for a cellular (e.g. LTE, 5G/NR, etc.) connection (e.g., this field is present only if the Flow ID Present bit is set to one); Fragmentation Control (FC) (e.g. 1 Byte) to provide necessary information for re-assembly, only needed if a PDU carries fragments (e.g., this field is present only if the Fragmentation Present bit is set to one; see e.g., section 5 in [GMA14]); Delivery SN (1 Byte) includes an auto-incremented integer to indicate the GMA PDU transmission order on a delivery connection (e.g., the Delivery SN may be needed to measure packet loss of each delivery connection and therefore generated per delivery connection per flow; e.g., this field is present only if the Delivery SN Present bit is set to one); Flow SN (3 Bytes) includes an auto-incremented integer to indicate the GMA SDU (e.g., IP packet) order of a flow (e.g., the flow SN may be needed for retransmission, reordering, and fragmentation; the flow SN may be generated per flow; e.g., this field is present only if the Flow SN Present bit is set to one; Timestamp (4 Bytes) to contain the current value of the timestamp clock of the Tx in the unit of 1 millisecond. This field is present only if the Timestamp Present bit is set to one; and TTL (1 Byte) to contain the TTL value of the original IP header if the GMA SDU is IPv4, or the Hop-Limit value of the IP header if the GMA SDU is IPv6 (e.g., field is present only if the TTL Present bit is set to one). The GMA control fields follow the bit order in the flags field (e.g., Bit 0 (MSB) of the flags field is the checksum present bit, and the checksum field is the last in the trailer 1910 except for the two mandatory fields; Bit 1 is the concatenation present bit and the FSL field is the second to last, and so forth).

2.1.1.2. Header-Based Ip Encapsulation

FIG. 19 also shows the header-based IP encapsulation format 1902. Here, the GMA header 1920 is inserted right after the IP header of the GMA SDU.

FIG. 19 also shows an example GMA header (hdr) format 1920, which includes the Flags field and the GMA control fields. In comparison to GMA trailer 1910, the only difference is that the Flags field is now in the front so that the Rx can first decode the Flags field to determine the GMA header length. Moreover, the IP header fields of the GMA PDU should be changed in the same way as trailered-based IP encapsulation (as discussed previously). Additionally or alternatively, the TTL, FSL, and Next Header fields are removed from the GMA control fields since the IP header fields of the GMA SDU remain unchanged during encapsulation. The order of the other GMA control fields is/are the same as discussed previously.

In some implementations, if the adaptation layer (e.g., UDP tunneling or the like) supports a non-IP packet format, the GMA PDU 1902 may be used without modification. If the adaptation layer (see e.g., FIG. 9B) only supports the IP packet format, the header-based IP encapsulation GMA PDU 1903 may be used. In the header-based IP encapsulation PDU 1903, the IP header of the GMA SDU (e.g., IP payload) is moved to the front of the packet so that the GMA PDU 1903 becomes an IP packet, and the IP header fields of the GMA PDU 1903 may be changed in the same manner as the trailer-based IP encapsulation PDU 1901.

The header or trailer based IP encapsulation PDUs 1902, 1901 may be used dynamically on a per-packet basis, and setting the protocol type of the GMA PDU to "114" indicates the presence of the GMA header 1920 in an IP packet.

2.1.1.3. (Header-Based)Non-IP Encapsulation

FIG. 19 also shows the header-based non-IP encapsulation format 1903. Here, "UDP Tunnelling" is configured at the MX adaptation layer. Additionally, the "TTL", "FSL", and "Next Header" are no longer needed. Moreover, the IP header fields of the GMA SDU remain unchanged. If non-IP encapsulation is configured, the GMA header 1920 is also present.

2.1.2. Fragmentation

The convergence layer MAY support fragmentation if a delivery connection has a smaller maximum transmission unit (MTU) than the original IP packet (SDU). The fragmentation procedure at the convergence sublayer is similar to IP fragmentation (see e.g., "DARPA Internet Program Protocol Specification" IETF RFC 791 (September 1981)) in principle, but with the following two differences for less overhead: the fragment offset field is expressed in number of fragments; and the maximum number of fragments per SDU is $2^7$ (=128).

The Fragmentation Control (FC) field in the GMA trailer (or header) contains the following bits: Bit #7: a More Fragment (MF) flag to indicate if the fragment is the last one (0) or not (1); and Bit #0~#6: Fragment Offset (in units of fragments) to specify the offset of a particular fragment relative to the beginning of the SDU.

A PDU carries a whole SDU without fragmentation if the FC field is set to all "0"s or the FC field is not present in the trailer. Otherwise, the PDU contains a fragment of the SDU.

The Flow SN field in the trailer is used to distinguish the fragments of one SDU from those of another. The Fragment Offset (FO) field tells the receiver the position of a fragment in the original SDU. The More Fragment (MF) flag indicates the last fragment.

To fragment a long SDU, the Tx creates n PDUs and copies the content of the IP header fields from the long PDU into the IP header of all the PDUs. The length field in the IP header of PDU should be changed to the length of the PDU, and the protocol type should be changed to 114.

The data of the long SDU is divided into n portions based on the MTU size of the delivery connection. The first portion of the data is placed in the first PDU. The MF flag is set to "1", and the FO field is set to "0". The i-th portion of the data is placed in the i-th PDU. The MF flag is set to "0" if it is the last fragment and set to "1" otherwise. The FO field is set to i−1.

To assemble the fragments of a SDU, the receiver combines PDUs that all have the same Flow SN. The combination is done by placing the data portion of each fragment in the relative order indicated by the Fragment Offset in that fragment's GMA trailer (or header). The first fragment will have the Fragment Offset set to "0", and the last fragment will have the More-Fragments flag set to "0".

GMA fragmentation operates above the IP layer of individual access connection (e.g., RAT1, RAT2, etc.) and between the two end points of convergence layer. The convergence layer end points (client, multi-access gateway) should obtain the MTU of individual connection through either manual configuration or implementing Path MTU Discovery (PMTUD) as suggested in Bonica et al., "IP Fragmentation Considered Fragile", IETF RFC 8900 (September 2020).

2.1.3. Concatenation

The convergence sublayer may support concatenation if a delivery connection has a larger maximum transmission unit (MTU) than the original IP packet (SDU). Only the SDUs with the same client network address (e.g., IP address or the like), and the same Flow ID may be concatenated. If the (trailer or header based) IP encapsulation method is used, the First SDU Length (FSL) field should be included in the GMA trailer (or header) to indicate the length of the first SDU. Otherwise, the FSL field should not be included.

To concatenate two or more SDUs, the Tx creates one PDU and copies the content of the IP header field from the first SDU into the IP header of the PDU. The data of the first SDU is placed in the first portion of the data of the PDU. The whole second SDU is then placed in the second portion of the data of the PDU. The procedure continues till the PDU size reaches the MTU of the delivery connection. If the FSL field is present, the IP length field of the PDU should be updated to include all concatenated SDUs and the trailer (or header), and the IP checksum field should be recalculated if the packet is IPv4.

To disaggregate a PDU, if the (header or trailer based) IP encapsulation method is used, the receiver first obtains the length of the first SDU from the FSL field and decodes the first SDU. The receiver then obtains the length of the second SDU based on the length field in the second SDU IP header and decodes the second SDU. The procedure continues till no byte is left in the PDU. If the non-IP encapsulation method is used, the IP header of the first SDU will not change during the encapsulation process, and the receiver SHOULD obtain the length of the first SDU directly from its IP header.

If a PDU contains multiple SDUs, the Flow SN field is for the last SDU, and the Flow SN of other SDU carried by the same PDU can be obtained according to its order in the PDU. For example, if the SN field is 6 and a PDU contains 3 SDUs (IP packets), the SN is 4, 5, and 6 for the first, second, and last SDU respectively. GMA concatenation can be used for packing small packets of a single application, e.g. TCP ACKs, or from multiple applications. Notice that a single GMA flow may carry multiple application flows (TCP, UDP, etc.).

2.1.4. GMA Protocol Stack

FIG. 17 also shows an (anchored) integrated GMA convergence protocol stack 1700e. As alluded to previously, GMA data plane functions (e.g., Gc and Gs) may be integrated into one or more existing network functions (e.g., a Gateway (GW), MEC, etc.) to avoid using virtual network interface (e.g., IP #3). The integrated GMA data plane protocol stack 1700e uses the RAT1 connection as the anchor connection. As a result, only one UDP tunnel is needed for delivering traffic over the non-anchor connection, which is the RAT2 connection.

In one example, the RAT1 anchor connection is a cellular connection (e.g., 5G/NR, LTE, etc.) and the RAT2 non-anchor connection is a WiFi connection. If using the 5G/LTE connection as the anchor for applications, and the WiFi connection as the delivery connection, UDP tunneling (or IPSec) may be used for delivering 5G/LTE IP traffic over a WiFi network. The GMA convergence sublayer (see also e.g., FIGS. 9A, 9B, 9C) is responsible for multi-path management operations (e.g., lossless switching, aggregation/splitting, etc.). In another example, a virtual IP connection may be used as the anchor, and the server 940 will provide all necessary information through MAMS signaling to configure the virtual IP connection on the client side 901. In the example GMA-MAMS DPPS 1700e, the GMA data plane functions (Gc 1401 and Gs 1440) may be integrated into an existing network function (e.g., Gateway, Edge server/host such as a MEC server/host, etc.) to avoid using a virtual network interface.

2.1.5. GMA Configuration Parameters

Some example GMA configuration parameters are as follows: RAT1 probing interval: 30 seconds; RAT2 probing interval in state 1 and 2: 30 seconds; RAT2 probing interval in state 3: 10 second; RAT2 reconnecting interval: 60 seconds; Low throughput threshold: 10 kBps; Link disconnect timer: 10 minutes; RAT1 signal quality low threshold: −75 dBm; RAT1 signal quality high threshold: −70 dBm; RAT1 packet loss low threshold: 1%; RAT1 packet loss high threshold: 10%; Reordering queue size for High Throughput Flow (Flow ID=3): 1000 packets; Reordering timer for High Throughput Flow (Flow ID=3): 100 ms; Reordering queue size for High Reliability Flow (Flow ID=1): 20 packets; Reordering timer for High Reliability Flow (Flow ID=1): 10 ms; Measurement Interval (MI): 30 seconds; Reporting Interval (RI): 50 (MIs); Default Flow ID (DFI): 3; Control message retransmission limit: 3; Virtual NIC MTU size: 1400 (bytes); Idle Timer: 1 minute; Timestamp unit: 1000 (us); UL-over-LTE flag: 0 (disabled, default)/1 (enabled); Wi-Fi Congestion Detection flag: 0 (disabled, default)/1 (enabled); and Power Save flag: 0 (disabled, default)/1 (enabled).

Both Gc and Gs maintain the following (per-client) parameter(s): Start_Time: the duration between now and next "time zero" when Start_Time is reset (in the unit of 1 ms); tx_timeStamp: a timestamp of when a packet is transmitted; rx_timeStamp: a timestamp of when a packet is received; and Sync_Guard_Time: configurable parameter that controls how long Gc or Gs should wait before starting measurements (based on timestamp info in received packet(s)).

Gc and Gs reset their respective "Start_Time" immediately after the successful exchange of mx_session_resume_req/rsp, and the (tx) timestamp parameter in a control message indicates the duration between transmitting the message and resetting Start_Time.

In the above example(s), RAT1 is a WLAN connection/RAT (e.g., WiFi or the like) and RAT2 is a cellular connection/RAT (e.g., LTE, 5G/NR, GSM, WiMAX, or the like).

2.1.6. GMA Deployment Scenarios

Some example GMA based deployments may be as follows:

In a first GMA deployment, GMA client modules (e.g., GMA Gc and/or CCM 1006) may be implemented as a "multi-home VPN" application and run on a UE (e.g., smartphone, tablet, PC, etc.) without any impact to platform or operation system.

In a second GMA deployment, the GMA server modules (e.g., GMA Gs and/or NCM 1036) may be implemented as an "Edge/cloud server" application (e.g., MEC app or the like) and run in the Edge or cloud server without any impact to platform or operation system. If running GMA server on the Edge, the traffic routing policy may be configured on the Edge platform such that the following three flows are routed locally to the edge platform: TCP flow (for MAMS management messages): IP #1 (or IP #2)+TCP #1; UDP flow (for tunneling traffic over the $1^{st}$ delivery connection): IP #1+UDP #1; UDP flow (for tunneling traffic over the second delivery connection): IP #2+UDP #2.

Moreover, a DNS configuration may be added to the Edge platform such that "gmaserver.mec.com" is mapped to IP #1 and IP #2 over the two delivery connections, respectively.

3. Edge Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services. Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

The present disclosure provides specific examples relevant to various edge computing configurations provided within and various access/network implementations. Any suitable standards and network implementations are applicable to the edge computing concepts discussed herein. For example, many edge computing/networking technologies may be applicable to the present disclosure in various combinations and layouts of devices located at the edge of a network. Examples of such edge computing/networking technologies include Multi-access Edge Computing (MEC); Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

Figure 20:
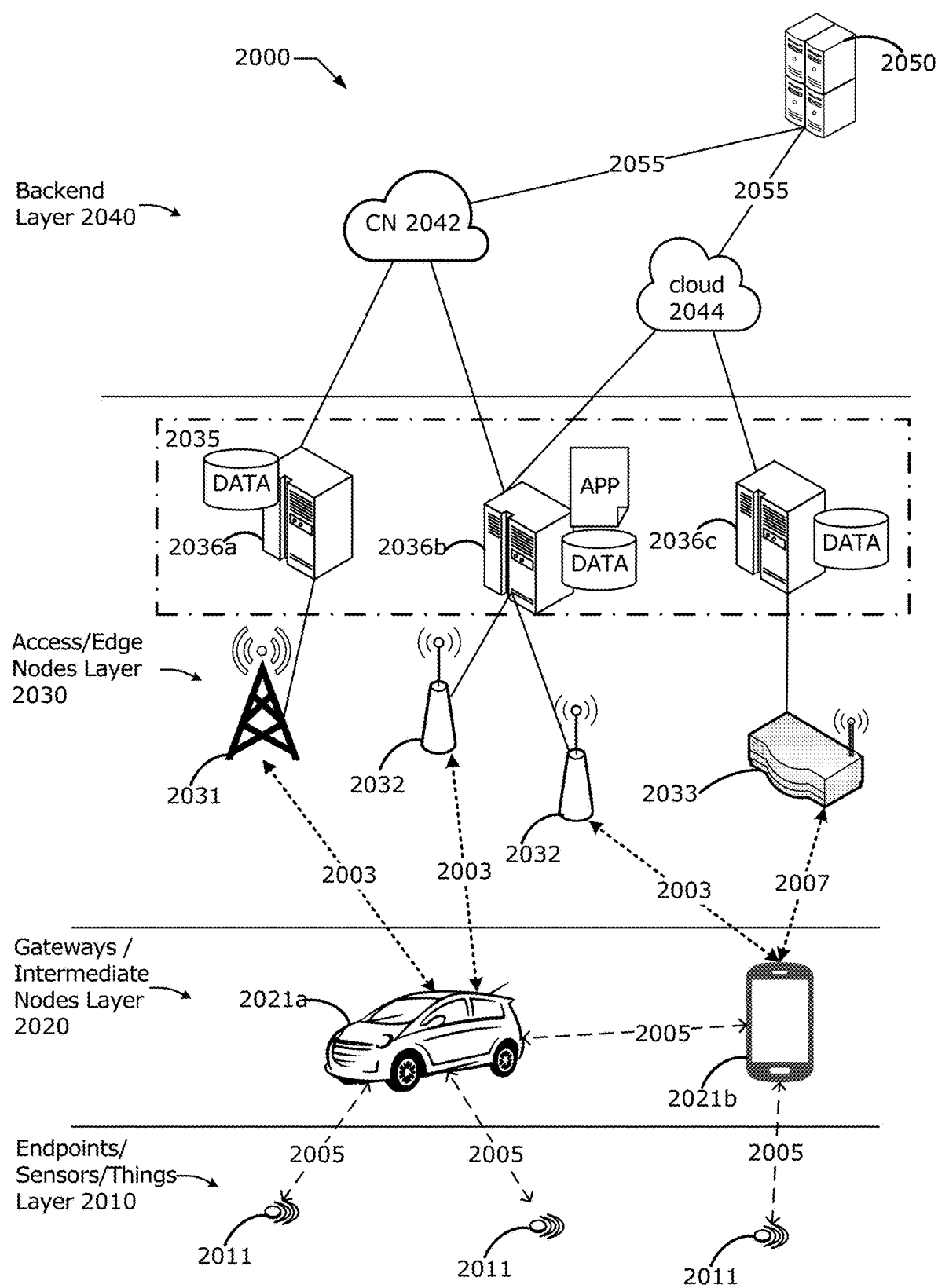
FIG. 20 illustrates an example edge computing environment.

FIG. 20 illustrates an example edge computing environment 2000. FIG. 20 specifically illustrates the different layers of communication occurring within the environment 2000, starting from endpoint sensors or things layer 2010 (e.g., operating in an Internet of Things (IoT) network topology) comprising one or more IoT devices 2011 (also referred to as edge endpoints 2010 or the like); increasing in sophistication to gateways or intermediate node layer 2020 comprising one or more user equipment (UEs) 2021a and 2021b (also referred to as intermediate nodes 2020 or the like), which facilitate the collection and processing of data from endpoints 2010; increasing in processing and connectivity sophistication to access node layer 2030 (or "edge node layer 2030") comprising a plurality of network access nodes (NANs) 2031, 2032, and 2033 (collectively referred to as "NANs 2031-2033" or the like) and a plurality of edge compute nodes 2036a-c (collectively referred to as "edge compute nodes 2036" or the like) within an edge computing system 2035; and increasing in connectivity and processing sophistication to a backend layer 2010 comprising core network (CN) 2042 and cloud 2044. The processing at the backend layer 2010 may be enhanced by network services as performed by one or more remote application (app) servers 2050 and/or other cloud services. Some or all of these elements may be equipped with or otherwise implement some or all features and/or functionality discussed herein.

The environment 2000 is shown to include end-user devices, such as intermediate nodes 2020 and endpoints 2010, which are configured to connect to (or communicatively couple with) one or more multiple communication networks (also referred to as "access networks," "radio access networks," or the like) based on different access technologies (or "radio access technologies") for accessing application services. These access networks may include one or more of NANs 2031, 2032, and/or 2033. The NANs 2031-2033 are arranged to provide network connectivity to the end-user devices via respective links 2003, 2007 between the individual NANs and the one or more UEs 2011, 2021.

As examples, the communication networks and/or access technologies may include cellular technology such as LTE, MuLTEfire, and/or NR/5G (e.g., as provided by Radio Access Network (RAN) node 2031 and/or RAN nodes 2032), WiFi or wireless local area network (WLAN) technologies (e.g., as provided by access point (AP) 2033 and/or RAN nodes 2032), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 2020 include UE 2021a and UE 2021b (collectively referred to as "UE 2021" or "UEs 2021"). In this example, the UE 2021a is illustrated as a vehicle UE, and UE 2021b is illustrated as a smartphone (e.g., handheld touchscreen mobile computing device connectable to one or more cellular networks). However, these UEs 2021 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 2010 include UEs 2011, which may be IoT devices (also referred to as "IoT devices 2011"), which are uniquely identifiable embedded computing devices (e.g., within the Internet infrastructure) that comprise a network access layer designed for low-power IoT applications utilizing short-lived UE connections. The IoT devices 2011 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 2011 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 2011 can utilize technologies such as M2M or MTC for exchanging data with an MTC server (e.g., a server 2050), an edge server 2036 and/or edge computing system 2035, or device via a PLMN, ProSe or D2D communication, sensor networks, or IoT networks. The M2M or MTC exchange of data may be a machine-initiated exchange of data.

The IoT devices 2011 may execute background applications (e.g., keep-alive messages, status updates, etc.) to facilitate the connections of the IoT network. Where the IoT devices 2011 are, or are embedded in, sensor devices, the IoT network may be a WSN. An IoT network describes an interconnecting IoT UEs, such as the IoT devices 2011 being connected to one another over respective direct links 2005. The IoT devices may include any number of different types of devices, grouped in various combinations (referred to as an "IoT group") that may include IoT devices that provide one or more services for a particular user, customer, organizations, etc. A service provider (e.g., an owner/operator of server 2050, CN 2042, and/or cloud 2044) may deploy the IoT devices in the IoT group to a particular area (e.g., a geolocation, building, etc.) in order to provide the one or more services. In some implementations, the IoT network may be a mesh network of IoT devices 2011, which may be termed a fog device, fog system, or fog, operating at the edge of the cloud 2044. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 2044 to Things (e.g., IoT devices 2011). The fog may be established in accordance with specifications released by the OFC, the OCF, among others. Additionally or alternatively, the fog may be a tangle as defined by the IOTA foundation.

The fog may be used to perform low-latency computation/aggregation on the data while routing it to an edge cloud computing service (e.g., edge nodes 2030) and/or a central cloud computing service (e.g., cloud 2044) for performing heavy computations or computationally burdensome tasks. On the other hand, edge cloud computing consolidates human-operated, voluntary resources, as a cloud. These voluntary resource may include, inter-alia, intermediate nodes 2020 and/or endpoints 2010, desktop PCs, tablets, smartphones, nano data centers, and the like. In various implementations, resources in the edge cloud may be in one to two-hop proximity to the IoT devices 2011, which may result in reducing overhead related to processing data and may reduce network delay.

Additionally or alternatively, the fog may be a consolidation of IoT devices 2011 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

Additionally or alternatively, the fog may operate at the edge of the cloud 2044. The fog operating at the edge of the cloud 2044 may overlap or be subsumed into an edge network 2030 of the cloud 2044. The edge network of the cloud 2044 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 2036 or edge devices). The Fog layer resides on top of the edge layer and is a consolidation of networking devices such as the intermediate nodes 2020 and/or endpoints 2010 of FIG. 20.

Data may be captured, stored/recorded, and communicated among the IoT devices 2011 or, for example, among the intermediate nodes 2020 and/or endpoints 2010 that have direct links 2005 with one another as shown by FIG. 20. Analysis of the traffic flow and control schemes may be implemented by aggregators that are in communication with the IoT devices 2011 and each other through a mesh network. The aggregators may be a type of IoT device 2011 and/or network appliance. In the example of FIG. 20, the aggregators may be edge nodes 2030, or one or more designated intermediate nodes 2020 and/or endpoints 2010. Data may be uploaded to the cloud 2044 via the aggregator, and commands can be received from the cloud 2044 through gateway devices that are in communication with the IoT devices 2011 and the aggregators through the mesh network. Unlike the traditional cloud computing model, in some implementations, the cloud 2044 may have little or no computational capabilities and only serves as a repository for archiving data recorded and processed by the fog. In these implementations, the cloud 2044 centralized data storage system and provides reliability and access to data by the computing resources in the fog and/or edge devices. Being at the core of the architecture, the Data Store of the cloud 2044 is accessible by both Edge and Fog layers of the aforementioned edge-fog network.

As mentioned previously, the access networks provide network connectivity to the end-user devices 2020, 2010 via respective NANs 2031-2033. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. Additionally or alternatively, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. Additionally or alternatively, the CRAN, CR, or vBBUP may implement a RAN function split, wherein one or more communication protocol layers are operated by the CRAN/CR/vBBUP and other communication protocol entities are operated by individual RAN nodes 2031, 2032. This virtualized framework allows the freed-up processor cores of the NANs 2031, 2032 to perform other virtualized applications, such as virtualized applications for various elements discussed herein.

The UEs 2021, 2011 may utilize respective connections (or channels) 2003, each of which comprises a physical communications interface or layer. The connections 2003 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. Additionally or alternatively, the UEs 2011, 2021 and the NANs 2031-2033 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 2011, 2021 and NANs 2031-2033 may operate using LAA, enhanced LAA (eLAA), and/or further eLAA (feLAA) mechanisms. The UEs 2021, 2011 may further directly exchange communication data via respective direct links 2005, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

Additionally or alternatively, individual UEs 2021, 2011 provide radio information to one or more NANs 2031-2033 and/or one or more edge compute nodes 2036 (e.g., edge servers/hosts, etc.). The radio information may be in the form of one or more measurement reports, and/or may include, for example, signal strength measurements, signal quality measurements, and/or the like. Each measurement report is tagged with a timestamp and the location of the measurement (e.g., the UEs 2021, 2011 current location). As examples, the measurements collected by the UEs 2021, 2011 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet error ratio (PER), packet loss rate, packet reception rate (PRR), data rate, peak data rate, end-to-end (e2e) delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio ($E_b/N_0$), energy per chip to interference power density ratio ($E_c/I_0$), energy per chip to noise power density ratio ($E_c/N_0$), peak-to-average power ratio (PAPR), reference signal received power (RSRP), reference signal received quality (RSRQ), received signal strength indicator (RSSI), received channel power indicator (RCPI), received signal to noise indicator (RSNI), Received Signal Code Power (RSCP), average noise plus interference (ANPI), GNSS timing of cell frames for UE positioning for E-UTRAN or 5G/NR (e.g., a timing between an AP or RAN node reference time and a GNSS-specific reference time for a given GNSS), GNSS code measurements (e.g., the GNSS code phase (integer and fractional parts) of the spreading code of the GNSS satellite signal), GNSS carrier phase measurements (e.g., the number of carrier-phase cycles (integer and fractional parts) of the GNSS satellite signal, measured since locking onto the signal; also called Accumulated Delta Range (ADR)), channel interference measurements, thermal noise power measurements, received interference power measurements, power histogram measurements, channel load measurements, STA statistics, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR), and RSRP, RSSI, RSRQ, RCPI, RSNI, and/or ANPI measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v16.2.0 (2021 Mar. 31) ("[TS36214]"), 3GPP TS 38.215 v16.4.0 (2021 Jan. 8) ("[TS38215]"), 3GPP TS 38.314 v16.4.0 (2021 Sep. 30) ("[TS38314]"), IEEE 802.11-2020, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications" (2021 Feb. 26) ("[IEEE80211]"), and/or the like. Additionally or alternatively, any of the aforementioned measurements (or combination of measurements) may be collected by one or more NANs 2031-2033 and provided to the edge compute node(s) 2036.

Additionally or alternatively, the measurements can include one or more of the following measurements: measurements related to Data Radio Bearer (DRB) (e.g., number of DRBs attempted to setup, number of DRBs successfully setup, number of released active DRBs, in-session activity time for DRB, number of DRBs attempted to be resumed, number of DRBs successfully resumed, etc.); measurements related to Radio Resource Control (RRC) (e.g., mean number of RRC connections, maximum number of RRC connections, mean number of stored inactive RRC connections, maximum number of stored inactive RRC connections, number of attempted, successful, and/or failed RRC connection establishments, etc.); measurements related to UE Context (UECNTX); measurements related to Radio Resource Utilization (RRU) (e.g., DL total PRB usage, UL total PRB usage, distribution of DL total PRB usage, distribution of UL total PRB usage, DL PRB used for data traffic, UL PRB used for data traffic, DL total available PRBs, UL total available PRBs, etc.); measurements related to Registration Management (RM); measurements related to Session Management (SM) (e.g., number of PDU sessions requested to setup; number of PDU sessions successfully setup; number of PDU sessions failed to setup, etc.); measurements related to GTP Management (GTP); measurements related to IP Management (IP); measurements related to Policy Association (PA); measurements related to Mobility Management (MM) (e.g., for inter-RAT, intra-RAT, and/or Intra/Inter-frequency handovers and/or conditional handovers: number of requested, successful, and/or failed handover preparations; number of requested, successful, and/or failed handover resource allocations; number of requested, successful, and/or failed handover executions; mean and/or maximum time of requested handover executions; number of successful and/or failed handover executions per beam pair, etc.); measurements related to Virtualized Resource(s) (VR); measurements related to Carrier (CARR); measurements related to QoS Flows (QF) (e.g., number of released active QoS flows, number of QoS flows attempted to release, in-session activity time for QoS flow, in-session activity time for a UE 2011, 2021, number of QoS flows attempted to setup, number of QoS flows successfully established, number of QoS flows failed to setup, number of initial QoS flows attempted to setup, number of initial QoS flows successfully established, number of initial QoS flows failed to setup, number of QoS flows attempted to modify, number of QoS flows successfully modified, number of QoS flows failed to modify, etc.); measurements related to Application Triggering (AT); measurements related to Short Message Service (SMS); measurements related to Power, Energy and Environment (PEE); measurements related to NF service (NFS); measurements related to Packet Flow Description (PFD); measurements related to Random Access Channel (RACH); measurements related to Measurement Report (MR); measurements related to Layer 1 Measurement (L1M); measurements related to Network Slice Selection (NSS); measurements related to Paging (PAG); measurements related to Non-IP Data Delivery (NIDD); measurements related to external parameter provisioning (EPP); measurements related to traffic influence (TI); measurements related to Connection Establishment (CE); measurements related to Service Parameter Provisioning (SPP); measurements related to Background Data Transfer Policy (BDTP); measurements related to Data Management (DM); and/or any other performance measurements such as those discussed in 3GPP TS 28.552 v17.3.1 (2021 Jun. 24) ("[TS28552]"), 3GPP TS 32.425 v17.1.0 (2021 Jun. 24) ("[TS32425]"), and/or the like.

The radio information may be reported in response to a trigger event and/or on a periodic basis. Additionally or alternatively, individual UEs 2021, 2011 report radio information either at a low periodicity or a high periodicity depending on a data transfer that is to take place, and/or other information about the data transfer. Additionally or alternatively, the edge compute node(s) 2036 may request the measurements from the NANs 2031-2033 at low or high periodicity, or the NANs 2031-2033 may provide the measurements to the edge compute node(s) 2036 at low or high periodicity. Additionally or alternatively, the edge compute node(s) 2036 may obtain other relevant data from other edge compute node(s) 2036, core network functions (NFs), application functions (AFs), and/or other UEs 2011, 2021 such as Key Performance Indicators (KPIs), with the measurement reports or separately from the measurement reports.

Additionally or alternatively, in cases where is discrepancy in the observation data from one or more UEs, one or more RAN nodes, and/or core network NFs (e.g., missing reports, erroneous data, etc.) simple imputations may be performed to supplement the obtained observation data such as, for example, substituting values from previous reports and/or historical data, apply an extrapolation filter, and/or the like. Additionally or alternatively, acceptable bounds for the observation data may be predetermined or configured. For example, CQI and MCS measurements may be configured to only be within ranges defined by suitable 3GPP standards. In cases where a reported data value does not make sense (e.g., the value exceeds an acceptable range/bounds, or the like), such values may be dropped for the current learning/training episode or epoch. For example, on packet delivery delay bounds may be defined or configured, and packets determined to have been received after the packet delivery delay bound may be dropped.

In any of the embodiments discussed herein, any suitable data collection and/or measurement mechanism(s) may be used to collect the observation data. For example, data marking (e.g., sequence numbering, etc.), packet tracing, signal measurement, data sampling, and/or timestamping techniques may be used to determine any of the aforementioned metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a hardware (HW) configuration/implementation or non-HW-specific, or may be based on various software parameters (e.g., OS type and version, etc.). Various configurations may be used to define any of the aforementioned data collection parameters. Such configurations may be defined by suitable specifications/standards, such as 3GPP, ETSI, O-RAN, Intel® Smart Edge Open (formerly OpenNESS), and/or any other like standards such as those discussed herein.

The UE 2021b is shown to be configured to access an access point (AP) 2033 via a connection 2007. In this example, the AP 2033 is shown to be connected to the Internet without connecting to the CN 2042 of the wireless system. The connection 2007 can comprise a local wireless connection, such as a connection consistent with any IEEE 802.11 protocol, wherein the AP 2033 would comprise a wireless fidelity (WiFi®) router. Additionally or alternatively, the UEs 2021 and IoT devices 2011 can be configured to communicate using suitable communication signals with each other or with any of the AP 2033 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the present disclosure is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 2031 and 2032 that enable the connections 2003 may be referred to as "RAN nodes" or the like. The RAN nodes 2031, 2032 may comprise ground stations (e.g., terrestrial access points) or satellite stations providing coverage within a geographic area (e.g., a cell). The RAN nodes 2031, 2032 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 2031 is embodied as a NodeB, evolved NodeB (eNB), or a next generation NodeB (gNB), and the RAN nodes 2032 are embodied as relay nodes, distributed units, or Road Side Unites (RSUs). Any other type of NANs can be used.

Any of the RAN nodes 2031, 2032 can terminate the air interface protocol and can be the first point of contact for the UEs 2021 and IoT devices XE111. Additionally or alternatively, any of the RAN nodes 2031, 2032 can fulfill various logical functions for the RAN including, but not limited to, RAN function(s) (e.g., radio network controller (RNC) functions and/or NG-RAN functions) for radio resource management, admission control, UL and DL dynamic resource allocation, radio bearer management, data packet scheduling, etc. Additionally or alternatively, the UEs 2011, 2021 can be configured to communicate using OFDM communication signals with each other or with any of the NANs 2031, 2032 over a multicarrier communication channel in accordance with various communication techniques, such as, but not limited to, an OFDMA communication technique (e.g., for DL communications) and/or an SC-FDMA communication technique (e.g., for UL and ProSe or sidelink communications), although the scope of the present disclosure is not limited in this respect.

For most cellular communication systems, the RAN function(s) operated by the RAN or individual NANs 2031-2032 organize DL transmissions (e.g., from any of the RAN nodes 2031, 2032 to the UEs 2011, 2021) and UL transmissions (e.g., from the UEs 2011, 2021 to RAN nodes 2031, 2032) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 2011, 2021 at each transmission time interval (TTI). A TTI is the duration of a transmission on a radio link 2003, 2005, and is related to the size of the data blocks passed to the radio link layer from higher network layers.

The NANs 2031/2032 may be configured to communicate with one another via respective interfaces or links (not shown), such as an X2 interface for LTE implementations (e.g., when CN 2042 is an Evolved Packet Core (EPC)), an Xn interface for 5G or NR implementations (e.g., when CN 2042 is an Fifth Generation Core (5GC)), or the like. The NANs 2031 and 2032 are also communicatively coupled to CN 2042. Additionally or alternatively, the CN 2042 may be an evolved packet core (EPC) network, a NextGen Packet Core (NPC) network, a 5G core (5GC), or some other type of CN.

The CN 2042 is a network of network elements and/or network functions (NFs) relating to a part of a communications network that is independent of the connection technology used by a terminal or user device. The CN 2042 comprises a plurality of network elements/NFs configured to offer various data and telecommunications services to customers/subscribers (e.g., users of UEs 2021 and IoT devices 2011) who are connected to the CN 2042 via a RAN. The components of the CN 2042 may be implemented in one physical node or separate physical nodes including components to read and execute instructions from a machine-readable or computer-readable medium (e.g., a non-transitory machine-readable storage medium). Additionally or alternatively, Network Functions Virtualization (NFV) may be utilized to virtualize any or all of the above-described network node functions via executable instructions stored in one or more computer-readable storage mediums (described in further detail infra). A logical instantiation of the CN 2042 may be referred to as a network slice, and a logical instantiation of a portion of the CN 2042 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 2042 components/functions.

The CN 2042 is shown to be communicatively coupled to an application server 2050 and a network 2050 via an IP communications interface 2055. the one or more server(s) 2050 comprise one or more physical and/or virtualized systems for providing functionality (or services) to one or more clients (e.g., UEs 2021 and IoT devices 2011) over a network. The server(s) 2050 may include various computer devices with rack computing architecture component(s), tower computing architecture component(s), blade computing architecture component(s), and/or the like. The server(s) 2050 may represent a cluster of servers, a server farm, a cloud computing service, or other grouping or pool of servers, which may be located in one or more datacenters. The server(s) 2050 may also be connected to, or otherwise associated with one or more data storage devices (not shown). Moreover, the server(s) 2050 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 2050 offer applications or services that use IP/network resources. As examples, the server(s) 2050 may provide traffic management services, cloud analytics, content streaming services, immersive gaming experiences, social networking and/or microblogging services, and/or other like services. In addition, the various services provided by the server(s) 2050 may include initiating and controlling software and/or firmware updates for applications or individual components implemented by the UEs 2021 and IoT devices 2011. The server(s) 2050 can also be configured to support one or more communication services (e.g., Voice-over-Internet Protocol (VoIP) sessions, PTT sessions, group communication sessions, social networking services, etc.) for the UEs 2021 and IoT devices 2011 via the CN 2042.

The Radio Access Technologies (RATs) employed by the NANs 2031-2033, the UEs 2021, 2011, and the other elements in FIG. 20 may include, for example, any of the communication protocols and/or RATs discussed herein. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.). These RATs may include one or more V2X RATs, which allow these elements to communicate directly with one another, with infrastructure equipment (e.g., NANs 2031-2033), and other devices. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize a C-V2X air interface and the WLAN V2X RAT may utilize an W-V2X air interface.

The W-V2X RATs include, for example, IEEE 1609.0-2019, "IEEE Guide for Wireless Access in Vehicular Environments (WAVE) Architecture" (2019 Apr. 10) ("[IEEE16090]"), SAE Intl "V2X Communications Message Set Dictionary" (formerly "Dedicated Short Range Communication (DSRC) Message Set Dictionary") (2020 Jul. 23) ("[J2735_202007]"), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes IEEE 802.16-2017, "IEEE Standard for Air Interface for Broadband Wireless Access Systems" (sometimes referred to as "Worldwide Interoperability for Microwave Access" or "WiMAX") (2018 Mar. 2) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020-01) (hereinafter "[EN302663]") and describes the access layer of the ITS-S reference architecture. The ITS-G5 access layer comprises [IEEE80211] (which now incorporates IEEE 802.11p) and IEEE 802.2 Logical Link Control (LLC) ("[IEEE8022]") and/or IEEE/ISO/IEC 8802-2-1998 protocols, as well as features for Decentralized Congestion Control (DCC) methods discussed in ETSI TS 102 687 V1.2.1 (2018-04) ("[TS102687]"). The access layer for 3GPP LTE-V2X based interface(s) is outlined in, inter alia, ETSI EN 303 613 V1.1.1 (2020-01), 3GPP TS 23.285 v16.2.0 (2019-12); and 3GPP 5G/NR-V2X is outlined in, inter alia, 3GPP TR 23.786 v16.1.0 (2019-06) and 3GPP TS 23.287 v16.2.0 (2020-03).

The cloud 2044 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 2044 include application capabilities type, infrastructure capabilities type, and platform capabilities type. A cloud capabilities type is a classification of the functionality provided by a cloud service to a cloud service customer (e.g., a user of cloud 2044), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 2044 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

Additionally or alternatively, the cloud 2044 may represent one or more cloud servers, application servers, web servers, and/or some other remote infrastructure. The remote/cloud servers may include any one of a number of services and capabilities such as, for example, any of those discussed herein.

Additionally or alternatively, the cloud 2044 may represent a network such as the Internet, a local area network (LAN), a wide area network (WAN), a wireless local area network (WLAN), or a wireless wide area network (WWAN) including proprietary and/or enterprise networks for a company or organization, or combinations thereof. The cloud 2044 may be a network that comprises computers, network connections among the computers, and software routines to enable communication between the computers over network connections. In this regard, the cloud 2044 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 2044 may be via a wired or a wireless connection using the various communication protocols discussed infra. More than one network may be involved in a communication session between the illustrated devices. Connection to the cloud 2044 may require that the computers execute software routines which enable, for example, the seven layers of the OSI model of computer networking or equivalent in a wireless (cellular) phone network. Cloud 2044 may be used to enable relatively long-range communication such as, for example, between the one or more server(s) 2050 and one or more UEs 2021 and IoT devices 2011. Additionally or alternatively, the cloud 2044 may represent the Internet, one or more cellular networks, local area networks, or wide area networks including proprietary and/or enterprise networks, TCP/Internet Protocol (IP)-based network, or combinations thereof. In these implementations, the cloud 2044 may be associated with network operator who owns or controls equipment and other elements necessary to provide network-related services, such as one or more base stations or access points, one or more servers for routing digital data or telephone calls (e.g., a core network or backbone network), etc. The backbone links 2055 may include any number of wired or wireless technologies, and may be part of a LAN, a WAN, or the Internet. In one example, the backbone links 2055 are fiber backbone links that couple lower levels of service providers to the Internet, such as the CN 2012 and cloud 2044.

The edge compute nodes 2036 may include or be part of an edge system 2035 (or edge network 2035). The edge compute nodes 2036 may also be referred to as "edge hosts 2036" or "edge servers 2036." The edge system 2035 includes a collection of edge servers 2036 and edge management systems (not shown by FIG. 20) necessary to run edge computing applications within an operator network or a subset of an operator network. The edge servers 2036 are physical computer systems that may include an edge platform and/or virtualization infrastructure, and provide compute, storage, and network resources to edge computing applications. Each of the edge servers 2036 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 2020 and/or endpoints 2010. The VI of the edge servers 2036 provide virtualized environments and virtualized resources for the edge hosts, and the edge computing applications may run as VMs and/or application containers on top of the VI.

In one example implementation, the edge system 2035 may operate according to the MEC framework, as discussed in ETSI GS MEC 003 v2.1.1 (2019-01), ETSI GS MEC 009 V2.1.1 (2019-01), ETSI GS MEC 010-1 v1.1.1 (2017-10), ETSI GS MEC 010-2 v2.1.1 (2019-11), ETSI GS MEC 011 V1.1.1 (2017-07); ETSI GS MEC 012 V2.1.1 (2019-12), ETSI GS MEC 013 v2.1.1 (2019-09); ETSI GS MEC 014 V1.1.1 (2018-02); ETSI GS MEC 015 v2.1.1 (2020-06), ETSI GS MEC 016 V2.2.1 (2020-04), ETSI GS MEC 021 V2.1.1 (2020-01), ETSI GS MEC 028 v2.1.1 (2020-06), ETSI GS MEC 029 v2.1.1 (2019-07), ETSI MEC GS 030 v2.1.1 (2020-04), ETSI GS NFV-MAN 001 v1.1.1 (2014-12), U.S. Provisional App. No. 63/003,834 filed Apr. 1, 2020 ("[AC6833Z]"), and Int'l App. No. PCT/US2020/066969 filed on Dec. 23, 2020 ("[AC6833PC1]") (collectively referred to herein as "[MEC]"), the contents of each of which are hereby incorporated by reference in their entireties.

In another example implementation, the edge system 2035 operates according to the O-RAN framework. Typically, front-end and back-end device vendors and carriers have worked closely to ensure compatibility. The flip-side of such a working model is that it becomes quite difficult to plug-and-play with other devices and this can hamper innovation. To combat this, and to promote openness and interoperability at every level, several key players interested in the wireless domain (e.g., carriers, device manufacturers, academic institutions, etc.) formed the Open RAN alliance ("O-RAN") in 2018. The O-RAN network architecture is a building block for designing virtualized RAN on programmable hardware with radio access control powered by AI. Various aspects of the O-RAN architecture are described in O-RAN Alliance Working Group (WG) 1, "O-RAN Architecture Description" v04.00 (March 2021), O-RAN Alliance WG1, "O-RAN Operations and Maintenance Interface Specification" v04.00 (November 2020), O-RAN Alliance WG1, "O-RAN Operations and Maintenance Architecture Specification" v04.00 (November 2020), O-RAN Alliance WG1, "Near-Real-time RAN Intelligent Controller, E2 Application Protocol (E2AP)" v01.01 (July 2020), O-RAN Alliance WG2, "O-RAN A1 interface: General Aspects and Principles 2.02" v02.02 (March 2021), O-RAN Alliance WG3, "O-RAN Near-Real-time RAN Intelligent Controller Architecture & E2 General Aspects and Principles" v01.01 (July 2020), O-RAN Near-Real-time RAN Intelligent Controller E2 Service Model 1.0 (February 2020), O-RAN WG3, "Near-Real-time RAN Intelligent Controller E2 Service Model (E2SM) KPM v01.00 (February 2020), O-RAN WG3, "O-RAN Near-Real-time RAN Intelligent Controller E2 Service Model (E2SM), RAN Function Network Interface (NI)" v1.0 (February 2020), E2SM RAN Control (E2SM-RC), O-RAN Alliance WG4, O-RAN Fronthaul Management Plane Specification, version 2.0 (July 2019), O-RAN Alliance WG4, "O-RAN Fronthaul Control, User and Synchronization Plane Specification 6.0" v06.00 (March 2021), O-RAN Alliance WG6, "Cloud Architecture and Deployment Scenarios for O-RAN Virtualized RAN" v02.01 (July 2020), and U.S. application Ser. No. 17/484,743 filed on 24 Sep. 2021 ("[AD2644-US]") (collectively referred to as "[O-RAN]"), the contents of each of which are hereby incorporated by reference in their entireties.

In another example implementation, the edge system 2035 operates according to the $3^{rd}$ Generation Partnership Project (3GPP) System Aspects Working Group 6 (SA6) Architecture for enabling Edge Applications (referred to as "3GPP edge computing") as discussed in 3GPP TS 23.558 v17.1.0 (2021-09-24) ("[TS23558]"), 3GPP TS 23.501 v17.2.0 (2021-09-24) ("[TS23501]"), and U.S. application Ser. No. 17/484,719 filed on 24 Sep. 2021 ("[AD4420-US]") (collectively referred to as "[SA6Edge]"), the contents of each of which is hereby incorporated by reference in their entireties.

In another example implementation, the edge system 2035 operates according to the Intel® Smart Edge Open framework (formerly known as OpenNESS) as discussed in Intel® Smart Edge Open Developer Guide, version 21.09 (30 Sep. 2021), available at: <https://smart-edge-open.github-b.io/> ("[ISEO]"), the contents of which are hereby incorporated by reference in its entirety.

It should be understood that the aforementioned edge computing frameworks and services deployment examples are only one illustrative example of edge computing systems/networks 2035, and that the present disclosure may be applicable to many other edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

As shown by FIG. 20, each of the NANs 2031, 2032, and 2033 are co-located with edge compute nodes (or "edge servers") 2036a, 2036b, and 2036c, respectively. These implementations may be small-cell clouds (SCCs) where an edge compute node 2036 is co-located with a small cell (e.g., pico-cell, femto-cell, etc.), or may be mobile micro clouds (MCCs) where an edge compute node 2036 is co-located with a macro-cell (e.g., an eNB, gNB, etc.). The edge compute node 2036 may be deployed in a multitude of arrangements other than as shown by FIG. 20. In a first example, multiple NANs 2031-2033 are co-located or otherwise communicatively coupled with one edge compute node 2036. In a second example, the edge servers 2036 may be co-located or operated by RNCs, which may be the case for legacy network deployments, such as 3G networks. In a third example, the edge servers 2036 may be deployed at cell aggregation sites or at multi-RAT aggregation points that can be located either within an enterprise or used in public coverage areas. In a fourth example, the edge servers 2036 may be deployed at the edge of CN 2042. These implementations may be used in follow-me clouds (FMC), where cloud services running at distributed data centers follow the UEs 2021 as they roam throughout the network.

In any of the implementations discussed herein, the edge servers 2036 provide a distributed computing environment for application and service hosting, and also provide storage and processing resources so that data and/or content can be processed in close proximity to subscribers (e.g., users of UEs 2021, 2011) for faster response times The edge servers 2036 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 2036 from the UEs 2011/2021, CN 2042, cloud 2044, and/or server(s) 2050, or vice versa. For example, a device application or client application operating in a UE 2021/2011 may offload application tasks or workloads to one or more edge servers 2036. In another example, an edge server 2036 may offload application tasks or workloads to one or more UE 2021/2011 (e.g., for distributed ML computation or the like).

4. Hardware Components, Configurations, and Arrangements

Figure 21:
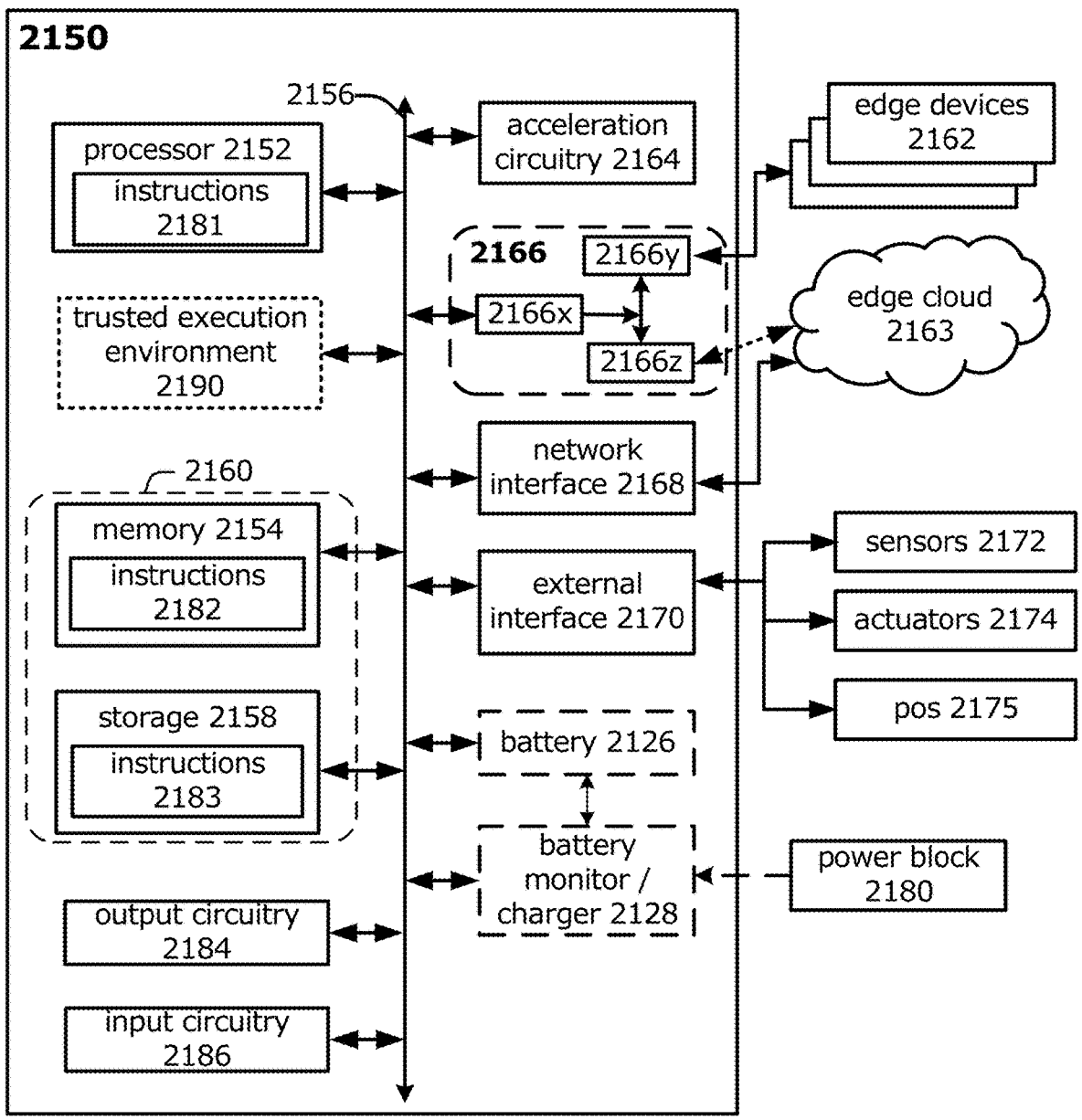
FIG. 21 depicts example components of a compute node, which may be used in edge computing system(s).

FIG. 21 illustrates an example of components that may be present in a computing node 2150 for implementing the techniques (e.g., operations, processes, methods, and methodologies) described herein. The compute node 2150 provides a closer view of the respective components of node 2100 when implemented as or as part of a computing device (e.g., as a mobile device, a base station, server, gateway, etc.). The compute node 2150 may include any combinations of the hardware or logical components referenced herein, and it may include or couple with any device usable with an edge communication network or a combination of such networks. The components may be implemented as integrated circuitry (ICs), a System on Chip (SoC), portions thereof, discrete electronic devices, or other modules, instruction sets, programmable logic or algorithms, hardware, hardware accelerators, software, firmware, or a combination thereof adapted in the compute node 2150, or as components otherwise incorporated within a chassis of a larger system.

In some embodiments, compute node 2150 may correspond to the client 901, NAN 910A-B, server 940, network functions (NFs) in CN 950A, FA-GW 950B, network elements and/or devices in DN 970 and/or DN 975 of FIG. 9; client 1001, access network 1031, MAMS system 1035, core network 1041; GWs 1420A, 1420B, 1450 of FIG. 14; UEs 2011, 2021a, NANs 2031-2033, edge compute node(s) 2036, CN 2042 (or compute node(s) therein), and/or cloud 2044 (or compute node(s) therein) of FIG. 20; software distribution platform 2205 and/or processor platform(s) 2200 of FIG. 22; and/or any other component, device, and/or system discussed herein. The compute node 2150 may be embodied as a type of device, appliance, computer, or other "thing" capable of communicating with other edge, networking, or endpoint components. For example, compute node 2150 may be embodied as a smartphone, a mobile compute device, a smart appliance, an in-vehicle compute system (e.g., a navigation system), an edge compute node, a NAN, switch, router, bridge, hub, and/or other device or system capable of performing the described functions.

The compute node 2150 includes processing circuitry in the form of one or more processors 2152. The processor circuitry 2152 includes circuitry such as, but not limited to one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 2152 may include one or more hardware accelerators (e.g., same or similar to acceleration circuitry 2164), which may be microprocessors, programmable processing devices (e.g., FPGA, ASIC, etc.), or the like. The one or more accelerators may include, for example, computer vision and/or deep learning accelerators. In some implementations, the processor circuitry 2152 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 2152 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, a special purpose processing unit and/or specialized processing unit, or any other known processing elements, or any suitable combination thereof. In some implementations, the processor circuitry 2152 may be embodied as a specialized x-processing unit (xPU) also known as a data processing unit (DPU), infrastructure processing unit (IPU), or network processing unit (NPU). An xPU may be embodied as a standalone circuit or circuit package, integrated within an SoC, or integrated with networking circuitry (e.g., in a SmartNIC, or enhanced SmartNIC), acceleration circuitry, storage devices, storage disks, and/or AI hardware (e.g., GPUs or programmed FPGAs). The xPU may be designed to receive programming to process one or more data streams and perform specific tasks and actions for the data streams (e.g., hosting microservices, performing service management or orchestration, organizing or managing server or data center hardware, managing service meshes, or collecting and distributing telemetry), outside of a CPU or general purpose processing hardware. However, an xPU, a SoC, a CPU, and other variations of the processor circuitry 2152 may work in coordination with each other to execute many types of operations and instructions within and on behalf of the compute node 2150.

The processors (or cores) 2152 may be coupled with or may include memory/storage and may be configured to execute instructions stored in the memory/storage to enable various applications or operating systems to run on the platform 2150. The processors (or cores) 2152 is configured to operate application software to provide a specific service to a user of the platform 2150. Additionally or alternatively, the processor(s) 2152 may be a special-purpose processor(s)/controller(s) configured (or configurable) to operate according to the elements, features, and implementations discussed herein.

As examples, the processor(s) 2152 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 2152 may be a part of a system on a chip (SoC), System-in-Package (SiP), a multi-chip package (MCP), and/or the like, in which the processor(s) 2152 and other components are formed into a single integrated circuit, or a single package, such as the Edison™ or Galileo™ SoC boards from Intel® Corporation. Other examples of the processor(s) 2152 are mentioned elsewhere in the present disclosure.

The processor(s) 2152 may communicate with system memory 2154 over an interconnect (IX) 2156. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2158 may also couple to the processor 2152 via the IX 2156. In an example, the storage 2158 may be implemented via a solid-state disk drive (SSDD) and/or high-speed electrically erasable memory (commonly referred to as "flash memory"). Other devices that may be used for the storage 2158 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 2154 and/or storage circuitry 2158 may also incorporate three-dimensional (3D) cross-point (XPOINT) memories from Intel® and Micron®.

In low power implementations, the storage 2158 may be on-die memory or registers associated with the processor 2152. However, in some examples, the storage 2158 may be implemented using a micro hard disk drive (HDD). Further, any number of new technologies may be used for the storage 2158 in addition to, or instead of, the technologies described, such resistance change memories, phase change memories, holographic memories, or chemical memories, among others.

The components of edge computing device 2150 may communicate over an interconnect (IX) 2156. The IX 2156 may represent any suitable type of connection or interface such as, for example, metal or metal alloys (e.g., copper, aluminum, etc.), fiber, and/or the like. The IX 2156 may include any number of IX, fabric, and/or interface technologies, including instruction set architecture (ISA), extended ISA (eISA), Inter-Integrated Circuit (I²C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX technology, RapidIO™ IX, Coherent Accelerator Processor Interface (CAPI), OpenCAPI, cache coherent interconnect for accelerators (CCIX), Gen-Z Consortium IXs, Hyper-Transport IXs, NVLink provided by NVIDIA®, a Time-Trigger Protocol (TTP) system, a FlexRay system, PROFIBUS, ARM® Advanced eXtensible Interface (AXI), ARM® Advanced Microcontroller Bus Architecture (AMBA) IX, HyperTransport, Infinity Fabric (IF), and/or any number of other IX technologies. The IX 2156 may be a proprietary bus, for example, used in a SoC based system.

The IX 2156 couples the processor 2152 to communication circuitry 2166 for communications with other devices, such as a remote server (not shown) and/or the connected edge devices 2162. The communication circuitry 2166 is a hardware element, or collection of hardware elements, used to communicate over one or more networks (e.g., cloud 2163) and/or with other devices (e.g., edge devices 2162).

The transceiver 2166 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 2162. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 2166 (or multiple transceivers) may communicate using multiple standards or radios for communications at a different range. For example, the compute node 2150 may communicate with close devices, e.g., within about 10 meters, using a local transceiver based on BLE, or another low power radio, to save power. More distant connected edge devices 2162, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 2166 (e.g., a radio transceiver) may be included to communicate with devices or services in the edge cloud 2163 via local or wide area network protocols. The wireless network transceiver 2166 may be an LPWA transceiver that follows the IEEE 802.15.4, or IEEE 802.15.4g standards, among others. The compute node 2163 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 2166, as described herein. For example, the transceiver 2166 may include a cellular transceiver that uses spread spectrum (SPA/SAS) communications for implementing high-speed communications. Further, any number of other protocols may be used, such as Wi-Fi® networks for medium speed communications and provision of network communications. The transceiver 2166 may include radios that are compatible with any number of 3GPP specifications, such as LTE and 5G/NR communication systems, discussed in further detail at the end of the present disclosure. A network interface controller (NIC) 2168 may be included to provide a wired communication to nodes of the edge cloud 2163 or to other devices, such as the connected edge devices 2162 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 2168 may be included to enable connecting to a second network, for example, a first NIC 2168 providing communications to the cloud over Ethernet, and a second NIC 2168 providing communications to other devices over another type of network.

Given the variety of types of applicable communications from the device to another component or network, applicable communications circuitry used by the device may include or be embodied by any one or more of components 2164, 2166, 2168, or 2170. Accordingly, in various examples, applicable means for communicating (e.g., receiving, transmitting, etc.) may be embodied by such communications circuitry.

The compute node 2150 may include or be coupled to acceleration circuitry 2164, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 2164 may comprise logic blocks or logic fabric and other interconnected resources that may be programmed (configured) to perform various functions, such as the procedures, methods, functions, etc. discussed herein. In such implementations, the acceleration circuitry 2164 may also include memory cells (e.g., EPROM, EEPROM, flash memory, static memory (e.g., SRAM, anti-fuses, etc.) used to store logic blocks, logic fabric, data, etc. in LUTs and the like.

The IX 2156 also couples the processor 2152 to a sensor hub or external interface 2170 that is used to connect additional devices or subsystems. The additional/external devices may include sensors 2172, actuators 2174, and positioning circuitry 2175.

The sensor circuitry 2172 includes devices, modules, or subsystems whose purpose is to detect events or changes in its environment and send the information (sensor data) about the detected events to some other a device, module, subsystem, etc. Examples of such sensors 2172 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 2150); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 2174, allow platform 2150 to change its state, position, and/or orientation, or move or control a mechanism or system. The actuators 2174 comprise electrical and/or mechanical devices for moving or controlling a mechanism or system, and converts energy (e.g., electric current or moving air and/or liquid) into some kind of motion. The actuators 2174 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 2174 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 2150 may be configured to operate one or more actuators 2174 based on one or more captured events and/or instructions or control signals received from a service provider and/or various client systems.

The positioning circuitry 2175 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 2175 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 2175 may include a Micro-Technology for Positioning, Navigation, and Timing (Micro-PNT) IC that uses a master timing clock to perform position tracking/estimation without GNSS assistance. The positioning circuitry 2175 may also be part of, or interact with, the communication circuitry 2166 to communicate with the nodes and components of the positioning network. The positioning circuitry 2175 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 2175 is, or includes an INS, which is a system or device that uses sensor circuitry 2172 (e.g., motion sensors such as accelerometers, rotation sensors such as gyroscopes, and altimimeters, magnetic sensors, and/or the like to continuously calculate (e.g., using dead by dead reckoning, triangulation, or the like) a position, orientation, and/or velocity (including direction and speed of movement) of the platform 2150 without the need for external references.

In some optional examples, various input/output (I/O) devices may be present within or connected to, the compute node 2150, which are referred to as input circuitry 2186 and output circuitry 2184 in FIG. 21. The input circuitry 2186 and output circuitry 2184 include one or more user interfaces designed to enable user interaction with the platform 2150 and/or peripheral component interfaces designed to enable peripheral component interaction with the platform 2150. Input circuitry 2186 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 2184 may be included to show information or otherwise convey information, such as sensor readings, actuator position(s), or other like information. Data and/or graphics may be displayed on one or more user interface components of the output circuitry 2184. Output circuitry 2184 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 2150. The output circuitry 2184 may also include speakers or other audio emitting devices, printer(s), and/or the like. Additionally or alternatively, the sensor circuitry 2172 may be used as the input circuitry 2184 (e.g., an image capture device, motion capture device, or the like) and one or more actuators 2174 may be used as the output device circuitry 2184 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 2176 may power the compute node 2150, although, in examples in which the compute node 2150 is mounted in a fixed location, it may have a power supply coupled to an electrical grid, or the battery may be used as a backup or for temporary capabilities. The battery 2176 may be a lithium ion battery, or a metal-air battery, such as a zinc-air battery, an aluminum-air battery, a lithium-air battery, and the like.

A battery monitor/charger 2178 may be included in the compute node 2150 to track the state of charge (SoCh) of the battery 2176, if included. The battery monitor/charger 2178 may be used to monitor other parameters of the battery 2176 to provide failure predictions, such as the state of health (SoH) and the state of function (SoF) of the battery 2176. The battery monitor/charger 2178 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 2178 may communicate the information on the battery 2176 to the processor 2152 over the IX 2156. The battery monitor/charger 2178 may also include an analog-to-digital (ADC) converter that enables the processor 2152 to directly monitor the voltage of the battery 2176 or the current flow from the battery 2176. The battery parameters may be used to determine actions that the compute node 2150 may perform, such as transmission frequency, mesh network operation, sensing frequency, and the like.

A power block 2180, or other power supply coupled to a grid, may be coupled with the battery monitor/charger 2178 to charge the battery 2176. In some examples, the power block 2180 may be replaced with a wireless power receiver to obtain the power wirelessly, for example, through a loop antenna in the compute node 2150. A wireless battery charging circuit, such as an LTC4020 chip from Linear Technologies of Milpitas, California, among others, may be included in the battery monitor/charger 2178. The specific charging circuits may be selected based on the size of the battery 2176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2158 may include instructions 2183 in the form of software, firmware, or hardware commands to implement the techniques described herein. Although such instructions 2182, 2183 are shown as code blocks included in the memory 2154 and the storage 2158, any of the code blocks 2182, 2183 may be replaced with hardwired circuits, for example, built into an application specific integrated circuit (ASIC) or programmed into an FPGA, or the like.

In an example, the instructions 2181, 2182, 2183 provided via the memory 2154, the storage 2158, or the processor 2152 may be embodied as a non-transitory machine-readable medium (NTMRM) 2160 including code to direct the processor 2152 to perform electronic operations in the compute node 2150. The processor 2152 may access the NTMRM 2160 over the IX 2156. For instance, the NTMRM 2160 may be embodied by devices described for the storage 2158 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The NTMRM 2160 may include instructions to direct the processor 2152 to perform a specific sequence or flow of actions, for example, as described with respect to the flowchart(s) and block diagram (s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Computer program code for carrying out operations of the present disclosure (e.g., computational logic and/or instructions 2181, 2182, 2183) may be written in any combination of one or more programming languages, including an object oriented programming language such as Python, Ruby, Scala, Smalltalk, Java™, C++, C #, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code 2181, 2182, 2183 for carrying out operations of the present disclosure may also be written in any combination of the programming languages discussed herein. The program code may execute entirely on the system 2150, partly on the system 2150, as a stand-alone software package, partly on the system 2150 and partly on a remote computer or entirely on the remote computer or server. In the latter scenario, the remote computer may be connected to the system 2150 through any type of network, including a LAN or WAN, or the connection may be made to an external computer (e.g., through the Internet using an Internet Service Provider).

In an example, the instructions 2181, 2182, 2183 on the processor circuitry 2152 (separately, or in combination with the instructions 2181, 2182, 2183) may configure execution or operation of a trusted execution environment (TEE) 2190. The TEE 2190 operates as a protected area accessible to the processor circuitry 2102 to enable secure access to data and secure execution of instructions. In some embodiments, the TEE 2190 may be a physical hardware device that is separate from other components of the system 2150 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 2190 may be implemented as secure enclaves, which are isolated regions of code and/or data within the processor and/or memory/ storage circuitry of the system 2150. Only code executed within a secure enclave may access data within the same secure enclave, and the secure enclave may only be accessible using the secure application (which may be implemented by an application processor or a tamper-resistant microcontroller). Various implementations of the TEE 2190, and an accompanying secure area in the processor circuitry 2152 or the memory circuitry 2154 and/or storage circuitry 2158 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 2100 through the TEE 2190 and the processor circuitry 2152. Additionally or alternatively, the memory circuitry 2154 and/or storage circuitry 2158 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 2104 and/or storage circuitry 2108 may be divided into one or more trusted memory regions for storing applications or software modules of the TEE 2190.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

FIG. 21 depicts a high-level view of components of a varying device, subsystem, or arrangement of a compute node. However, some of the components shown may be omitted, additional components may be present, and a different arrangement of the components shown may occur in other implementations. Further, these arrangements are usable in a variety of use cases and environments, including those discussed herein (e.g., a mobile UE in industrial compute for smart city or smart factory, among many other examples).

The compute node 2150 may be implemented as user/client devices, servers, appliances, network infrastructure, machines, robots, drones, edge devices, Internet of Things (IoT) devices, and/or any other type of computing device such as those discussed herein. For example, the compute node 2150 may be a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, the compute node 2150 is presented in the network for a specific purpose (e.g., a traffic light), but may have processing and/or other capacities that may be utilized for other purposes. Additionally or alternatively, the compute node 2150 may be independent from other networked devices and may be provided with a housing having a form factor suitable for its primary purpose; yet be available for other compute tasks that do not interfere with its primary task. Additionally or alternatively, the appliance computing device may include hardware and software components to manage local issues such as device temperature, vibration, resource utilization, updates, power issues, physical and network security, etc. Additionally or alternatively, the compute node 2150 may be implemented as one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 22:
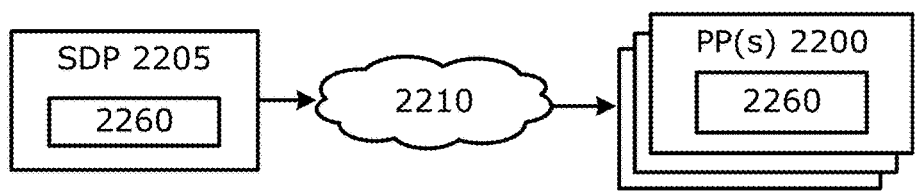
FIG. 22 illustrates an example software distribution platform.

FIG. 22 illustrates an example software (SW) distribution platform (SDP) 2205 to distribute software 2260, such as the example computer readable instructions 2181, 2182, 2183 of FIG. 21, to one or more devices, such as example processor platform(s) (pp) 2200, connected edge devices 2162 (see e.g., FIG. 21), and/or any of the other computing systems/devices discussed herein. The SDP 2205 (or components thereof) may be implemented by any computer server, data facility, cloud service, CDN, edge computing framework, etc., capable of storing and transmitting software (e.g., code, scripts, executable binaries, containers, packages, compressed files, and/or derivatives thereof) to other computing devices (e.g., third parties, the example connected edge devices 2162 of FIG. 21). The SDP 2205 (or components thereof) may be located in a cloud (e.g., data center, etc.), a local area network, an edge network, a wide area network, on the Internet, and/or any other location communicatively coupled with the pp 2200.

The pp 2200 and/or connected edge devices 2162 connected edge devices 2162 may include customers, clients, managing devices (e.g., servers), third parties (e.g., customers of an entity owning and/or operating the SDP 2205), IoT devices, and the like. The pp 2200/connected edge devices 2162 may operate in commercial and/or home automation environments. In some examples, a third party is a developer, a seller, and/or a licensor of software such as the example computer readable media 2181, 2182, 2183 of FIG. 21. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.). In some examples, the pp 2200/connected edge devices 2162 can be physically located in different geographic locations, legal jurisdictions, etc.

In FIG. 22, the SDP 2205 includes one or more servers (referred to as "servers 2205") and one or more storage devices (referred to as "storage 2205"). The storage 2205 store the computer readable instructions 2260, which may correspond to the instructions 2181, 2182, 2183 of FIG. 21. The servers 2205 are in communication with a network 2210, which may correspond to any one or more of the Internet and/or any of the example networks as described herein. The servers 2205 are responsive to requests to transmit the software to a requesting party as part of a commercial transaction. Payment for the delivery, sale and/or license of the software may be handled by the servers 2205 and/or via a third-party payment entity. The servers 2205 enable purchasers and/or licensors to download the computer readable instructions 2260 from the SDP 2205.

The servers 2205 are communicatively connected to one or more security domains and/or security devices through which requests and transmissions of the example computer readable instructions 2260 must pass. Additionally or alternatively, the servers 2205 periodically offer, transmit, and/or force updates to the software 2260 to ensure improvements, patches, updates, etc. are distributed and applied to the software at the end user devices. The computer readable instructions 2260 are stored on storage 2205 in a particular format. A format of computer readable instructions includes, but is not limited to a particular code language (e.g., Java, JavaScript, Python, C, C #, SQL, HTML, etc.), and/or a particular code state (e.g., uncompiled code (e.g., ASCII), interpreted code, linked code, executable code (e.g., a binary), etc.), and/or any other format such as those discussed herein. In some examples, the computer readable instructions 2260 stored in the SDP 2205 are in a first format when transmitted to the pp 2200. Additionally or alternatively, the first format is an executable binary in which particular types of the pp 2200 can execute. Additionally or alternatively, the first format is uncompiled code that requires one or more preparation tasks to transform the first format to a second format to enable execution on the pp 2200. For example, the receiving pp 2200 may need to compile the computer readable instructions 2260 in the first format to generate executable code in a second format that is capable of being executed on the pp 2200. Additionally or alternatively, the first format is interpreted code that, upon reaching the pp 2200, is interpreted by an interpreter to facilitate execution of instructions. Additionally or alternatively, different components of the computer readable instructions 2182 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

5. Example Implementations

Additional examples of the presently described systems, devices, and methods include the following, non-limiting example implementations. Each of the following non-limiting examples may stand on its own or may be combined in any permutation or combination with any one or more of the other examples provided below or throughout the present disclosure.

Example A01 includes a method of multi-queue management, comprising: maintaining a ring buffer in a memory region having a fixed size, the ring buffer comprising a plurality of slots, and each slot is assigned a slot index of a plurality of slot indexes; maintaining a set of virtual queues, each virtual queue of the set of virtual queues is allocated to one instance of a set of instances and one link of a set of links; storing a packet to be processed in a subject slot of the plurality of slots, the packet is assigned to a subject instance of the set of instances and a subject link of the set of links, and the subject slot is assigned a subject slot index of the plurality of slot indexes; storing the subject slot index in a subject virtual queue of the set of virtual queues, the subject virtual queue is allocated to the subject instance and the subject link; and obtaining the stored packet from the subject slot using the subject slot index when the packet is scheduled for processing.

Example A02 includes the method of example A01, wherein the processing of the stored packet comprises conveying the stored packet over the subject link.

Example A03 includes the method of example A02, further comprising: sending the obtained packet over the subject link.

Example A04 includes the method of examples A01-A03, wherein storing the packet to be processed in the subject slot comprises: performing a push function to push the packet to the subject slot.

Example A05 includes the method of example A04, wherein performing the push function comprises: determining, as the subject slot, an unoccupied slot of the plurality of slots based on a write index.

Example A06 includes the method of example A05, wherein performing the push function further comprises: incrementing a queue size counter after pushing the packet to the subject slot, wherein a value of the queue size counter is a number of occupied slots in the plurality of slots.

Example A07 includes the method of example A06, wherein each slot is further assigned an item count parameter, and performing the push function further comprises: updating an item count parameter of the subject slot based on a total number of virtual queues in the plurality of queues that store the subject slot index.

Example A08 includes the method of example A07, wherein performing the push function further comprises: updating the write index after pushing the packet to the subject slot such that the write index references an unoccupied slot of the plurality of slots.

Example A09 includes the method of example A08, wherein updating the write index comprises: incrementing the write index.

Example A10 includes the method of example A08, wherein updating the write index comprises: setting the write index to be a modulus of an increment of the write index and a total number of slots in the plurality of slots.

Example A11 includes the method of example A09, wherein updating the write index further comprises: updating the write index when the item count parameter of the subject slot is greater than zero.

Example A12 includes the method of examples A05-A11, wherein performing the push function further comprises: inserting the subject slot index into the subject virtual queue after storing the packet in the subject slot.

Example A13 includes the method of examples A01-A12, wherein obtaining the stored packet from the subject slot comprises: performing a pop function to remove the packet from the subject slot.

Example A14 includes the method of example A13, wherein performing the pop function comprises: identifying or obtaining the subject slot index from the subject virtual queue; and obtaining the packet from the subject slot using the subject slot index.

Example A15 includes the method of examples A13-A14, wherein performing the pop function further comprises: removing or deleting the subject slot index from the subject virtual queue after identifying or obtaining the subject slot index.

Example A16 includes the method of example A15, wherein each slot is further assigned an item count parameter, and performing the pop function further comprises: updating the item count parameter of the subject virtual queue after removing or deleting the subject slot index from the subject virtual queue.

Example A17 includes the method of example A16, wherein updating the item count parameter of the subject virtual queue comprises: decrementing the item count parameter of the subject virtual queue.

Example A18 includes the method of examples A16-A17, wherein performing the pop function further comprises: decrementing a queue size counter after popping the packet from the subject slot, wherein a value of the queue size counter is a number of occupied slots in the plurality of slots.

Example A19 includes the method of examples A01-A18, further comprising: when all slots of the plurality of slots are occupied, dropping one or more slot indexes from one or more virtual queues according to a drop policy.

Example A20 includes the method of examples A01-A19, wherein individual virtual queues of the set of virtual queues are stored in the ring buffer such that each element in the individual virtual queues corresponds to a slot of the plurality of slots.

Example A21 includes the method of examples A01-A19, wherein the set of virtual queues are maintained separate from the ring buffer.

Example A22 includes the method of examples A01-A21, wherein each instance of the set of instances is a thread, a process, an object, a database entity, a user, an application instance, a session, a service, a communication link, or a device.

Example A23 includes the method of examples A01-A22, wherein each link of the set of links is a radio access technology (RAT), a wired communication link, a wireless communication link, a communication path including two or more communication links, an interconnect between two or more hardware elements; an application session, a network session, or a service.

Example A24a includes a method of multi-queue management, comprising: storing packets to be processed in respective slots of plurality of slots, wherein the plurality of slots form a ring buffer that is implemented in a memory region having a fixed size, and plurality of slots are assigned respective slot indexes of a plurality of slot indexes, and the respective slot indexes reference to a memory location of a corresponding slot of the plurality of slots; storing one or more slot indexes in respective virtual queues of plurality of virtual queues, wherein the respective virtual queues are allocated to a corresponding instance and a corresponding link, and the one or more slot indexes stored in the in respective virtual queues correspond to stored packets associated with the corresponding instance to be conveyed over the corresponding link; and when the stored packets are scheduled to be conveyed over the corresponding link, obtaining the stored packets associated with the corresponding instance using the one or more slot indexes.

Example A24b includes a method of multi-queue management, comprising: storing packets to be processed in respective slots of plurality of slots, wherein the plurality of slots form a ring buffer that is implemented in a memory region having a fixed size, the plurality of slots are assigned respective slot indexes of a plurality of slot indexes, and the respective slot indexes reference a memory location of a corresponding slot of the plurality of slots; storing one or more slot indexes in one or more virtual queues of plurality of virtual queues, wherein each virtual queue of the of plurality of virtual queues is allocated to an instance of a set of instances and a link of a set of links; and processing individual virtual queues of the one or more virtual queues by obtaining the stored packets from their respective slots using the one or more slot indexes stored in the one or more virtual queues.

Example A24c includes a method of multi-queue management, comprising: storing packets to be processed in respective slots of plurality of slots, wherein the plurality of slots form a ring buffer that is implemented in a memory region having a fixed size, the plurality of slots are assigned respective slot indexes of a plurality of slot indexes, and the respective slot indexes reference a memory location of a corresponding slot of the plurality of slots; pushing the respective slot indexes into a plurality of virtual queues, wherein each virtual queue of the of plurality of virtual queues is allocated to an instance of a set of instances and a link of a set of links; popping a set of the respective slot indexes from one or more virtual queues of the plurality of virtual queues; and obtaining a set of the stored packets from their respective slots using the popped slot indexes.

Example A25 includes the method of examples A24a, A24b, and A24c, further comprising: performing the method of any one or more of examples A01-A23.

Example B01 includes the method of examples A01-A25, further comprising: receiving, by a first compute node, a first packet over a first connection between the first compute node and a second compute node; receiving, by the first compute node, a second packet over a second connection between the first compute node and the second compute node, wherein the second connection is different than the first connection; and initiating, by the first compute node, a packet reordering process to reorder a set of packets including the first and second packets.

Example B02 includes the method of example B01, initiating the packet reordering process in response to receipt of the second packet and when the second packet is received after receipt of the first packet.

Example B03 includes the method of example B02, further comprising: stopping the packet reordering process in response to receipt of an end marker packet over the first connection.

Example B04 includes the method of example B03, further comprising: sending, by the first compute node, a traffic steering request to the second compute node; and initiating, by the first compute node, the packet reordering process in response to sending the traffic steering request.

Example B05 includes the method of example B04, wherein the traffic steering request is to cause the second compute node to send an end marker packet over the first connection and send the second packet over the second connection.

Example B06 includes the method of example wherein the traffic steering request includes an identifier of the second connection to instruct the second compute node to send the second packet over the second connection.

B07 includes the method of examples B04-B06, wherein the traffic steering request is a Multi-Access Management Services (MAMS) traffic steering request message, a MAMS traffic steering response message, a MAMS probe request message, or a MAMS traffic splitting update (TSU) message.

B08 includes the method of examples B02-B07, wherein the first packet is a data packet or a control packet, the second packet is a data packet or a control packet, and the end marker packet is a data packet or a control packet.

B09 includes the method of example B08, wherein the end marker packet includes an indicator to indicate that the packet reordering process is an intra-radio access technology (RAT) packet reordering process or an inter-RAT packet reordering process.

B10 includes the method of example B09, wherein the indicator is a one bit field in the end marker packet, and the method further comprises: determining that the packet reordering process is an intra-RAT packet reordering process when the indicator has a first value; and determining that the packet reordering process is an inter-RAT packet reordering process when the indicator has a second value different than the first value.

Example B11 includes the method of examples B01-B10, wherein the first packet includes a first sequence number (SN) and the second packet includes a second SN, and the method further comprises: stopping the packet reordering process when the second SN is greater than the first SN regardless of an order in which the first and second packets are received.

Example B12 includes the method of example B11, wherein the first and second packets are among a set of received packets, and stopping the packet reordering process further comprises: stopping the packet reordering process when the second SN is greater than an SN in each received packet in the set of received packets.

Example B13 includes the method of examples B01-B12, further comprising: stopping the packet reordering process when a reordering timeout (RTO) timer expires.

Example B14 includes the method of example B13, further comprising: determining an RTO value for the RTO timer based on a first one-way delay (OWD) measurement of the first connection and a second OWD measurement of the second connection; and setting or updating the RTO timer with the determined RTO value.

Example B15 includes the method of example B14, wherein determining the value for the RTO timer further comprises: determining the RTO value for the RTO timer further based on a predetermined or configured RTO parameter.

Example B16 includes the method of examples A01-B15, wherein the first connection and the second connection are respective links among the set of links, and the first packet or the second packet is the packet stored in the subject slot.

Example B17 includes the method of examples A01-B16, further comprising: performing, by the first compute node, the method of multi-queue management according to any one or more of examples A01-A25.

Example X01 includes a method that achieves multiple transmission queue operations for multiple virtual transmission queues using one physical queue.

Example X02 includes the method of example X01 and/or some other examples herein, wherein the one physical queue is allocated to a static memory space.

Example X03 includes the method of examples X01-X02 and/or some other examples herein, wherein the one physical queue is implemented as a multi-thread safe ring queue data structure for storing packets and indexes.

Example X04 includes the method of examples X01-X03 and/or some other examples herein, further comprising: storing a duplicated packet in multiple virtual queues.

Example X05 includes the method of example X04 and/or some other examples herein, wherein the duplicated packet is a broadcast message to be broadcast to multiple receiver nodes.

Example X06 includes a method comprising: storing duplicated packets into multiple virtual queues, wherein at least one of the duplicated packets are for broadcast messages.

Example X07 includes a multi-thread safe ring queue data structure for storing packets and indexes.

Example C01 includes the method of examples A01-X07, wherein the set of links are communication links in a multi-access (MX) communication environment operating according to a MAMS framework, the first compute node is a first MX node and the second compute node is a second MX node.

Example C02 includes the method of example C01, wherein the method is performed by a convergence layer operated by the first MX node.

Example C03 includes the method of example C02, wherein the convergence layer is a multi-access (MX) convergence layer part of a MAMS protocol stack.

Example C04 includes the method of example C03, wherein the MX convergence layer implements an MX convergence method, wherein the MX convergence method includes one of Generic Multi-Access (GMA), MultiPath Transmission Control Protocol (MPTCP) Proxy, Generic Routing Encapsulation (GRE) Aggregation Proxy, or MultiPath QUIC (MPQUIC).

Example C05 includes the method of examples C03-C04, wherein the MX convergence layer implements a GMA entity when the MX convergence method is the GMA convergence method.

Example C06 includes the method of example C05, wherein the first MX node is a client device, the GMA entity of the first MX node is a GMA client (Gc) entity, and the client device further comprises a Client Connection Manager (CCM) communicatively coupled with the Gc entity.

Example C07 includes the method of example C06, wherein the second MX node is a server.

Example C08 includes the method of example C05, wherein the first MX compute node is a server, the GMA entity is a GMA server (Gs) entity, and the server further comprises a Network Connection Manager (NCM) communicatively coupled with the Gc entity.

Example C09 includes the method of example C06, wherein the second MX node is a client device.

Example C10 includes the method of examples C06-009, wherein the client device is a desktop computer, a workstation, a smartphone, a tablet computer, a wearable device, an Internet of Things (IoT) device, or a smart appliance.

Example C11 includes the method of examples C06-C10, wherein the server is a gateway device, a radio access network node, a network appliance, a network function within a core network, an application server, an edge server of an edge computing network, or a server of a cloud computing service.

Example C12 includes the method of example C11, wherein when the server is an edge server of an edge computing network.

Example C13 includes the method of examples C01-C12, wherein the packet stored in the subject slot is an Internet Protocol (IP) Protocol Data Unit (PDU).

Example C14 includes the method of examples C01-C13, wherein the packet stored in the subject slot is an MX Control Protocol Data Unit (PDU) or an MX user plane PDU including an IP packet.

Example C15 includes the method of examples C01-C14, wherein the packet stored in the subject slot is a Generic Multi-Access (GMA) PDU including a GMA header or a GMA trailer.

Example z01 includes one or more computer readable media comprising instructions, wherein execution of the instructions by processor circuitry is to cause the processor circuitry to perform the method of examples A01-A25, B01-B17, C01-C15, and X01-X07.

Example z02 includes a computer program comprising the instructions of example z01.

Example z03 includes an Application Programming Interface defining functions, methods, variables, data structures, and/or protocols for the computer program of example z01.

Example z04 includes an apparatus comprising circuitry loaded with the instructions of example z01.

Example z05 includes an apparatus comprising circuitry operable to run the instructions of example z01.

Example z06 includes an integrated circuit comprising one or more of the processor circuitry of example z01 and the one or more computer readable media of example z01.

Example z07 includes a computing system comprising the one or more computer readable media and the processor circuitry of example z01.

Example z08 includes an apparatus comprising means for executing the instructions of example z01.

Example z09 includes a signal generated as a result of executing the instructions of example z01.

Example z10 includes a data unit generated as a result of executing the instructions of example z01.

Example z11 includes the data unit of example z10, wherein the data unit is a datagram, network packet, data frame, data segment, a PDU, a service data unit (SDU), a message, or a database object.

Example z12 includes a signal encoded with the data unit of example z10 or z11.

Example z13 includes an electromagnetic signal carrying the instructions of example z01.

Example z14 includes an apparatus comprising means for performing the method of examples A01-A25, B01-B17, C01-C15, and X01-X07.

6. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some embodiments refers to (partial or in full) acts, tasks, operations, etc., related to bringing or the readying the bringing of something into existence either actively or passively (e.g., exposing a device identity or entity identity). Additionally or alternatively, the term "establish" or "establishment" at least in some embodiments refers to (partial or in full) acts, tasks, operations, etc., related to initiating, starting, or warming communication or initiating, starting, or warming a relationship between two entities or elements (e.g., establish a session, establish a session, etc.). Additionally or alternatively, the term "establish" or "establishment" at least in some embodiments refers to initiating something to a state of working readiness. The term "established" at least in some embodiments refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some embodiments refers to (partial or in full) acts, tasks, operations, etc., of intercepting, movement, copying, retrieval, or acquisition (e.g., from a memory, an interface, or a buffer), on the original data or packet stream or on a copy (e.g., a new instance) of the packet stream. Other aspects of obtaining or receiving may involving instantiating, enabling, or controlling the ability to obtain or receive the stream of packets (or the following parameters and templates or template values).

The term "receipt" at least in some embodiments refers to any action (or set of actions) involved with receiving or obtaining an object, data, data unit, etc., and/or the fact of the object, data, data unit, etc. being received. The term "receipt" at least in some embodiments refers to an object, data, data unit, etc., being pushed to a device, system, element, etc. (e.g., often referred to as a push model), pulled by a device, system, element, etc. (e.g., often referred to as a pull model), and/or the like.

The term "element" at least in some embodiments refers to a unit that is indivisible at a given level of abstraction and has a clearly defined boundary, wherein an element may be any type of entity including, for example, one or more devices, systems, controllers, network elements, modules, etc., or combinations thereof.

The term "measurement" at least in some embodiments refers to the observation and/or quantification of attributes of an object, event, or phenomenon.

The term "signal" at least in some embodiments refers to an observable change in a quality and/or quantity. Additionally or alternatively, the term "signal" at least in some embodiments refers to a function that conveys information about of an object, event, or phenomenon. Additionally or alternatively, the term "signal" at least in some embodiments refers to any time varying voltage, current, or electromagnetic wave that may or may not carry information. The term "digital signal" at least in some embodiments refers to a signal that is constructed from a discrete set of waveforms of a physical quantity so as to represent a sequence of discrete values.

The terms "ego" (as in, e.g., "ego device") and "subject" (as in, e.g., "data subject") at least in some embodiments refers to an entity, element, device, system, etc., that is under consideration or being considered. The terms "neighbor" and "proximate" (as in, e.g., "proximate device") at least in some embodiments refers to an entity, element, device, system, etc., other than an ego device or subject device.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" at least in some embodiments refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" at least in some embodiments refers to, is part of, or includes circuitry that enables the exchange of information between two or more components or devices. The term "interface circuitry" at least in some embodiments refers to one or more hardware interfaces, for example, buses, I/O interfaces, peripheral component interfaces, network interface cards, and/or the like.

The term "device" at least in some embodiments refers to a physical entity embedded inside, or attached to, another physical entity in its vicinity, with capabilities to convey digital information from or to that physical entity.

The term "entity" at least in some embodiments refers to a distinct component of an architecture or device, or information transferred as a payload.

The term "controller" at least in some embodiments refers to an element or entity that has the capability to affect a physical entity, such as by changing its state or causing the physical entity to move.

The term "terminal" at least in some embodiments refers to point at which a conductor from a component, device, or network comes to an end. Additionally or alternatively, the term "terminal" at least in some embodiments refers to an electrical connector acting as an interface to a conductor and creating a point where external circuits can be connected. In some embodiments, terminals may include electrical leads, electrical connectors, electrical connectors, solder cups or buckets, and/or the like.

The term "compute node" or "compute device" at least in some embodiments refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some embodiments refers to any type interconnected electronic devices, computer devices, or components thereof. Additionally, the terms "computer system" and/or "system" at least in some embodiments refer to various components of a computer that are communicatively coupled with one another. Furthermore, the term "computer system" and/or "system" at least in some embodiments refer to multiple computer devices and/or multiple computing systems that are communicatively coupled with one another and configured to share computing and/or networking resources.

The term "architecture" at least in some embodiments refers to a computer architecture or a network architecture. A "computer architecture" is a physical and logical design or arrangement of software and/or hardware elements in a computing system or platform including technology standards for interacts therebetween. A "network architecture" is a physical and logical design or arrangement of software and/or hardware elements in a network including communication protocols, interfaces, and media transmission.

The term "appliance," "computer appliance," or the like, at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. Examples of UEs, client devices, etc., include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmet-mounted display devices, augmented reality (AR) devices, virtual reality (VR) devices, mixed reality (MR) devices, and/or other like systems or devices.

The term "station" or "STA" at least in some embodiments refers to a logical entity that is a singly addressable instance of a medium access control (MAC) and physical layer (PHY) interface to the wireless medium (WM). The term "wireless medium" or WM" at least in some embodiments refers to the medium used to implement the transfer of protocol data units (PDUs) between peer physical layer (PHY) entities of a wireless local area network (LAN).

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "access point" or "AP" at least in some embodiments refers to an entity that contains one station (STA) and provides access to the distribution services, via the wireless medium (WM) for associated STAs. An AP comprises a STA and a distribution system access function (DSAF).

The term "base station" at least in some embodiments refers to a network element in a radio access network (RAN), such as a fourth-generation (4G) or fifth-generation (5G) mobile communications network which is responsible for the transmission and reception of radio signals in one or more cells to or from a UE. A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved Node B (eNB) or a next generation Node B (gNB). In some examples, the base station may operate or include compute hardware to operate as a compute node. However, in many of the scenarios discussed herein, a RAN node may be substituted with an access point (e.g., wireless network access point) or other network access hardware.

The term "E-UTEAN NodeB", "eNodeB", or "eNB" at least in some embodiments refers to a RAN node providing E-UTRA user plane (PDCP/RLC/MAC/PHY) and control plane (RRC) protocol terminations towards a UE, and connected via an S1 interface to the Evolved Packet Core (EPC). Two or more eNBs are interconnected with each other (and/or with one or more en-gNBs) by means of an X2 interface.

The term "next generation eNB" or "ng-eNB" at least in some embodiments refers to a RAN node providing E-UTRA user plane and control plane protocol terminations towards a UE, and connected via the NG interface to the 5GC. Two or more ng-eNBs are interconnected with each other (and/or with one or more gNBs) by means of an Xn interface.

The term "Next Generation NodeB", "gNodeB", or "gNB" at least in some embodiments refers to a RAN node providing NR user plane and control plane protocol terminations towards a UE, and connected via the NG interface to the 5GC. Two or more gNBs are interconnected with each other (and/or with one or more ng-eNBs) by means of an Xn interface.

The term "E-UTRA-NR gNB" or "en-gNB" at least in some embodiments refers to a RAN node providing NR user plane and control plane protocol terminations towards a UE, and acting as a Secondary Node in E-UTRA-NR Dual Connectivity (EN-DC) scenarios (see e.g., 3GPP TS 37.340 v16.6.0 (2021-07-09)). Two or more en-gNBs are interconnected with each other (and/or with one or more eNBs) by means of an X2 interface.

The term "Next Generation RAN node" or "NG-RAN node" at least in some embodiments refers to either a gNB or an ng-eNB.

The term "Central Unit" or "CU" at least in some embodiments refers to a logical node hosting radio resource control (RRC), Service Data Adaptation Protocol (SDAP), and/or Packet Data Convergence Protocol (PDCP) protocols/layers of an NG-RAN node, or RRC and PDCP protocols of the en-gNB that controls the operation of one or more DUs; a CU terminates an F1 interface connected with a DU and may be connected with multiple DUs.

The term "Distributed Unit" or "DU" at least in some embodiments refers to a logical node hosting radio link control (RLC), medium access control (MAC), and physical (PHY) layers of the NG-RAN node or en-gNB, and its operation is partly controlled by a CU; one DU supports one or multiple cells, and one cell is supported by only one DU; and a DU terminates the F1 interface connected with a CU.

The term "Residential Gateway" or "RG" at least in some embodiments refers to a device providing, for example, voice, data, broadcast video, video on demand, to other devices in customer premises. The term "Wireline 5G Access Network" or "W-5GAN" at least in some embodiments refers to a wireline AN that connects to a 5GC via N2 and N3 reference points. The W-5GAN can be either a W-5GBAN or W-5GCAN. The term "Wireline 5G Cable Access Network" or "W-5GCAN" at least in some embodiments refers to an Access Network defined in/by CableLabs. The term "Wireline BBF Access Network" or "W-5GBAN" at least in some embodiments refers to an Access Network defined in/by the Broadband Forum (BBF). The term "Wireline Access Gateway Function" or "W-AGF" at least in some embodiments refers to a Network function in W-5GAN that provides connectivity to a 3GPP 5G Core network (5GC) to 5G-RG and/or FN-RG. The term "5G-RG" at least in some embodiments refers to an RG capable of connecting to a 5GC playing the role of a user equipment with regard to the 5GC; it supports secure element and exchanges N1 signaling with 5GC. The 5G-RG can be either a 5G-BRG or 5G-CRG.

The term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

The term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for Edge applications and services, or even local implementations of cloud-like services.

The term "cloud computing" or "cloud" at least in some embodiments refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "computing resource" or simply "resource" at least in some embodiments refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" at least in some embodiments refers to compute, storage, and/or network resources provided by physical hardware element(s). A "virtualized resource" at least in some embodiments refers to compute, storage, and/or network resources provided by virtualization infrastructure to an application, device, system, etc. The term "network resource" or "communication resource" at least in some embodiments refers to resources that are accessible by computer devices/systems via a communications network. The term "system resources" at least in some embodiments refers to any kind of shared entities to provide services, and may include computing and/or network resources. System resources may be considered as a set of coherent functions, network data objects or services, accessible through a server where such system resources reside on a single host or multiple hosts and are clearly identifiable.

The term "core" at least in some embodiments refers to a functional element that anchors a client network address (e.g., IP address) used for communication with applications via the network. The term "anchor connection" at least in some embodiments refers to the network path from a network element (e.g., an N-MADP) to a UP gateway (e.g., IP anchor) that has assigned a network address (e.g., IP address) to a client. The term "delivery connection" as used herein refers a network path from a network element (e.g., an N-MADP) to a client.

The term "workload" at least in some embodiments refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The term "cloud service provider" (or CSP) indicates an organization which operates typically large-scale "cloud" resources comprised of centralized, regional, and Edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to Edge computing.

The term "data center" at least in some embodiments refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "access edge layer" indicates the sub-layer of infrastructure edge closest to the end user or device. For example, such layer may be fulfilled by an edge data center deployed at a cellular network site. The access edge layer functions as the front line of the infrastructure Edge and may connect to an aggregation Edge layer higher in the hierarchy.

The term "aggregation edge layer" indicates the layer of infrastructure edge one hop away from the access edge layer. This layer can exist as either a medium-scale data center in a single location or may be formed from multiple interconnected micro data centers to form a hierarchical topology with the access Edge to allow for greater collaboration, workload failover, and scalability than access Edge alone.

The term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. Additionally or alternatively, NFV processing and data storage will occur at the Edge data centers that are connected directly to the local cellular site, within the infrastructure Edge.

The term "virtualized NF" (or VNF) indicates a software-based NF operating on multi-function, multi-purpose compute resources (e.g., x86, ARM processing architecture) which are used by NFV in place of dedicated physical equipment. Additionally or alternatively, several VNFs will operate on an Edge data center at the infrastructure Edge.

The term "edge compute node" or "edge compute device" at least in some embodiments refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some embodiments refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some embodiments refers to a set or grouping of entities as part of an Edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "Data Network" or "DN" at least in some embodiments refers to a network hosting data-centric services such as, for example, operator services, the internet, third-party services, or enterprise networks. Additionally or alternatively, a DN at least in some embodiments refers to service networks that belong to an operator or third party, which are offered as a service to a client or user equipment (UE). DNs are sometimes referred to as "Packet Data Networks" or "PDNs". The term "Local Area Data Network" or "LADN" at least in some embodiments refers to a DN that is accessible by the UE only in specific locations, that provides connectivity to a specific DNN, and whose availability is provided to the UE.

The term "Internet of Things" or "IoT" at least in some embodiments refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smart home, smart building and/or smart city technologies), and the like. IoT devices are usually low-power devices without heavy compute or storage capabilities. The term "Edge IoT devices" at least in some embodiments refers to any kind of IoT devices deployed at a network's edge.

The term "radio technology" at least in some embodiments refers to technology for wireless transmission and/or reception of electromagnetic radiation for information transfer.

The term "radio access technology" or "RAT" at least in some embodiments refers to the technology used for the underlying physical connection to a radio based communication network.

The term "communication protocol" (either wired or wireless) at least in some embodiments refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of communications protocols include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, Zig-Bee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Digital Enhanced Cordless Telecommunications (DECT), DECT Ultra Low Energy (DECT ULE), DECT-2020, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "RAT type" at least in some embodiments refers to a transmission technology and/or communication protocol used in an access network, for example, new radio (NR), Long Term Evolution (LTE), narrowband IoT (NB-IOT), untrusted non-3GPP, trusted non-3GPP, trusted IEEE 802.11, non-3GPP access, MuLTEfire, WiMAX, wireline, wireline-cable, wireline broadband forum (wireline-BBF), etc.

The term "channel" at least in some embodiments refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some embodiments refers to a connection between two devices through a RAT for the purpose of transmitting and receiving information.

The term "reliability" at least in some embodiments refers to the ability of a computer-related component (e.g., software, hardware, or network element/entity) to consistently perform a desired function and/or operate according to a specification. Reliability in the context of network communications (e.g., "network reliability") at least in some embodiments refers to the ability of a network to carry out communication. The term "network reliability" at least in some embodiments refers to a probability or measure of delivering a specified amount of data from a source to a destination (or sink).

The term "flow" at least in some embodiments refers to a sequence of data and/or data units (e.g., datagrams, packets, or the like) from a source entity/element to a destination entity/element. Additionally or alternatively, the terms "flow" or "traffic flow" at least in some embodiments refer to an artificial and/or logical equivalent to a call, connection, or link. Additionally or alternatively, the terms "flow" or "traffic flow" at least in some embodiments refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms "flow" or "traffic flow" at least in some embodiments refer to a set of data and/or data units (e.g., datagrams, packets, or the like) passing an observation point in a network during a certain time interval. Additionally or alternatively, the term "flow" at least in some embodiments refers to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, etc. For purposes of the present disclosure, the terms "traffic flow", "data flow", "dataflow", "packet flow", "network flow", and/or "flow" may be used interchangeably even though these terms at least in some embodiments refers to different concepts.

The term "stream" at least in some embodiments refers to a sequence of data elements made available over time. At least in some embodiments, functions that operate on a stream, which may produce another stream, are referred to as "filters," and can be connected in pipelines, analogously to function composition. Filters may operate on one item of a stream at a time, or may base an item of output on multiple items of input, such as a moving average.

The term "distributed computing" at least in some embodiments refers to computation resources that are geographically distributed within the vicinity of one or more localized networks' terminations.

The term "distributed computations" at least in some embodiments refers to a model in which components located on networked computers communicate and coordinate their actions by passing messages interacting with each other in order to achieve a common goal.

The term "service" at least in some embodiments refers to the provision of a discrete function within a system and/or environment. Additionally or alternatively, the term "service" at least in some embodiments refers to a functionality or a set of functionalities that can be reused.

The term "microservice" at least in some embodiments refers to one or more processes that communicate over a network to fulfil a goal using technology-agnostic protocols (e.g., HTTP or the like). Additionally or alternatively, the term "microservice" at least in some embodiments refers to services that are relatively small in size, messaging-enabled, bounded by contexts, autonomously developed, independently deployable, decentralized, and/or built and released with automated processes. Additionally or alternatively, the term "microservice" at least in some embodiments refers to a self-contained piece of functionality with clear interfaces, and may implement a layered architecture through its own internal components. Additionally or alternatively, the term "microservice architecture" at least in some embodiments refers to a variant of the service-oriented architecture (SOA) structural style wherein applications are arranged as a collection of loosely-coupled services (e.g., fine-grained services) and may use lightweight protocols.

The term "session" at least in some embodiments refers to a temporary and interactive information interchange between two or more communicating devices, two or more application instances, between a computer and user, and/or between any two or more entities or elements. Additionally or alternatively, the term "session" at least in some embodiments refers to a connectivity service or other service that provides or enables the exchange of data between two entities or elements. The term "network session" at least in some embodiments refers to a session between two or more communicating devices over a network. The term "web session" at least in some embodiments refers to session between two or more communicating devices over the Internet or some other network. The term "session identifier," "session ID," or "session token" at least in some embodiments refers to a piece of data that is used in network communications to identify a session and/or a series of message exchanges.

The term "quality" at least in some embodiments refers to a property, character, attribute, or feature of something as being affirmative or negative, and/or a degree of excellence of something. Additionally or alternatively, the term "quality" at least in some embodiments, in the context of data processing, refers to a state of qualitative and/or quantitative aspects of data, processes, and/or some other aspects of data processing systems.

The term "Quality of Service" or "QoS' at least in some embodiments refers to a description or measurement of the overall performance of a service (e.g., telephony and/or cellular service, network service, wireless communication/connectivity service, cloud computing service, etc.). In some cases, the QoS may be described or measured from the perspective of the users of that service, and as such, QoS may be the collective effect of service performance that determine the degree of satisfaction of a user of that service. In other cases, QoS at least in some embodiments refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein. Additionally or alternatively, the term "Quality of Service" or "QoS' at least in some embodiments refers to mechanisms that provide traffic-forwarding treatment based on flow-specific traffic classification. In some implementations, the term "Quality of Service" or "QoS" can be used interchangeably with the term "Class of Service" or "CoS".

The term "Class of Service" or "CoS' at least in some embodiments refers to mechanisms that provide traffic-forwarding treatment based on non-flow-specific traffic classification. In some implementations, the term "Class of Service" or "CoS" can be used interchangeably with the term "Quality of Service" or "QoS".

The term "QoS flow" at least in some embodiments refers to the finest granularity for QoS forwarding treatment in a network. The term "5G QoS flow" at least in some embodiments refers to the finest granularity for QoS forwarding treatment in a 5G System (5GS). Traffic mapped to the same QoS flow (or 5G QoS flow) receive the same forwarding treatment.

The term "reliability flow" at least in some embodiments refers to the finest granularity for reliability forwarding treatment in a network, where traffic mapped to the same reliability flow receive the same reliability treatment. Additionally or alternatively, the term "reliability flow" at least in some embodiments refers to the a reliability treatment assigned to packets of a data flow The term "reliability forwarding treatment" or "reliability treatment" refers to the manner in which packets belonging to a data flow are handled to provide a certain level of reliability to that data flow including, for example, a probability of success of packet delivery, QoS or Quality of Experience (QoE) over a period of time (or unit of time), admission control capabilities, a particular coding scheme, and/or coding rate for arrival data bursts.

The term "forwarding treatment" at least in some embodiments refers to the precedence, preferences, and/or prioritization a packet belonging to a particular data flow receives in relation to other traffic of other data flows. Additionally or alternatively, the term "forwarding treatment" at least in some embodiments refers to one or more parameters, characteristics, and/or configurations to be applied to packets belonging to a data flow when processing the packets for forwarding. Examples of such characteristics may include resource type (e.g., non-guaranteed bit rate (GBR), GBR, delay-critical GBR, etc.); priority level; class or classification; packet delay budget; packet error rate; averaging window; maximum data burst volume; minimum data burst volume; scheduling policy/weights; queue management policy; rate shaping policy; link layer protocol and/or RLC configuration; admission thresholds; etc. In some implementations, the term "forwarding treatment" may be referred to as "Per-Hop Behavior" or "PHB".

The term "admission control" at least in some embodiments refers to a function or process that decides if new packets, messages, work, tasks, etc., entering a system should be admitted to enter the system or not. Additionally or alternatively, the term "admission control" at least in some embodiments refers to a validation process where a check is performed before a connection is established to see if current resources are sufficient for the proposed connection.

The term "QoS Identifier" at least in some embodiments refers to a scalar that is used as a reference to a specific QoS forwarding behavior (e.g., packet loss rate, packet delay budget, etc.) to be provided to a QoS flow. This may be implemented in an access network by referencing node specific parameters that control the QoS forwarding treatment (e.g., scheduling weights, admission thresholds, queue management thresholds, link layer protocol configuration, etc.).

The term "time to live" (or "TTL") or "hop limit" at least in some embodiments refers to a mechanism which limits the lifespan or lifetime of data in a computer or network. TTL may be implemented as a counter or timestamp attached to or embedded in the data. Once the prescribed event count or timespan has elapsed, data is discarded or revalidated.

The term "data buffer" or "buffer" at least in some embodiments refers to a region of a physical or virtual memory used to temporarily store data, for example, when data is being moved from one storage location or memory space to another storage location or memory space, data being moved between processes within a computer, allowing for timing corrections made to a data stream, reordering received data packets, delaying the transmission of data packets, and the like. At least in some embodiments, a "data buffer" or "buffer" may implement a queue.

The term "circular buffer", "circular queue", "cyclic buffer", or "ring buffer" at least in some embodiments refers to a data structure that uses a single fixed-size buffer or other area of memory as if it were connected end-to-end or as if it has a circular or elliptical shape.

The term "queue" at least in some embodiments refers to a collection of entities (e.g., data, objects, events, etc.) are stored and held to be processed later. that are maintained in a sequence and can be modified by the addition of entities at one end of the sequence and the removal of entities from the other end of the sequence; the end of the sequence at which elements are added may be referred to as the "back", "tail", or "rear" of the queue, and the end at which elements are removed may be referred to as the "head" or "front" of the queue. Additionally, a queue may perform the function of a buffer, and the terms "queue" and "buffer" may be used interchangeably throughout the present disclosure. The term "enqueue" at least in some embodiments refers to one or more operations of adding an element to the rear of a queue. The term "dequeue" at least in some embodiments refers to one or more operations of removing an element from the front of a queue.

The term "queue management" at least in some embodiments refers to a system, mechanism, policy, process, algorithm, or technique used to control one or more queues. The term "Active Queue Management" or "AQM" at least in some embodiments refers to a system, mechanism, policy, process, algorithm, or technique of dropping packets in a queue or buffer before the queue or buffer becomes full. The term "AQM entity" as used herein may refer to a network scheduler, a convergence layer entity, a network appliance, network function, and/or some other like entity that performs/executes AQM tasks.

The term "queue management technique" at least in some embodiments refers to a particular queue management system, mechanism, policy, process, and/or algorithm, which may include a "drop policy". The term "active queue management technique" or "AQM technique" at least in some embodiments refers to a particular AQM system, mechanism, policy, process, and/or algorithm.

The term "drop policy" at least in some embodiments refers to a set of guidelines or rules used by a queue management technique or ARM technique to determine when to discard, remove, delete, or otherwise drop data or packets from a queue or buffer or data or packets arriving for storage in a queue or buffer.

The term "stack" at least in some embodiments refers to an abstract data type that serves as a collection of elements and may include a push operation or function, a pop operation or function, and sometimes a peek operation or function.

The term "push", in the context of data structures such as stacks, buffers, and queues, at least in some embodiments refers an operation or function that adds one or more elements to a collection or set of elements.

The term "pop", in the context of data structures such as stacks, buffers, and queues, at least in some embodiments refers an operation or function that removes or otherwise obtains one or more elements from a collection or set of elements.

The term "peek", in the context of data structures such as stacks, buffers, and queues, at least in some embodiments refers an operation or function that provides access to one or more elements from a collection or set of elements.

The term "network scheduler" at least in some embodiments refers to a node, element, or entity that manages network packets in transmit and/or receive queues of one or more protocol stacks of network access circuitry (e.g., a network interface controller (NIC), baseband processor, and the like). The term "network scheduler" at least in some embodiments can be used interchangeably with the terms "packet scheduler", "queueing discipline" or "qdisc", or "queueing algorithm"

The term "network coding" at least in some embodiments refers to processes and/or techniques in which transmitted data is encoded and decoded to improve network performance.

The term "code rate" at least in some embodiments refers to the proportion of a data stream or flow that is useful or non-redundant (e.g., for a code rate of k/n, for every k bits of useful information, the (en)coder generates a total of n bits of data, of which n−k are redundant).

The term "systematic code" at least in some embodiments refers to any error correction code in which the input data is embedded in the encoded output. The term "non-systematic code" at least in some embodiments refers to any error correction code in which the input data is not embedded in the encoded output.

The term "interleaving" at least in some embodiments refers to a process to rearrange code symbols so as to spread bursts of errors over multiple codewords that can be corrected by ECCs.

The term "code word" or "codeword" at least in some embodiments refers to an element of a code or protocol, which is assembled in accordance with specific rules of the code or protocol.

The term "piggyback" or "piggybacking", in the context of computer communications and/or networking, refers to attaching, appending, or hooking a first data unit to a second data unit that is to be transmitted next or sometime before the first data unit; in this way, the first data unit gets a "free ride" in the data packet or frame carrying the second data unit.

The term "PDU Connectivity Service" at least in some embodiments refers to a service that provides exchange of protocol data units (PDUs) between a UE and a data network (DN). The term "PDU Session" at least in some embodiments refers to an association between a UE and a DN that provides a PDU connectivity service. A PDU Session type can be IPv4, IPv6, IPv4v6, Ethernet, Unstructured, or any other network/connection type, such as those discussed herein. The term "MA PDU Session" at least in some embodiments refers to a PDU Session that provides a PDU connectivity service, which can use one access network at a time or multiple access networks simultaneously.

The term "traffic shaping" at least in some embodiments refers to a bandwidth management technique that manages data transmission to comply with a desired traffic profile or class of service. Traffic shaping ensures sufficient network bandwidth for time-sensitive, critical applications using policy rules, data classification, queuing, QoS, and other techniques. The term "throttling" at least in some embodiments refers to the regulation of flows into or out of a network, or into or out of a specific device or element.

The term "access traffic steering" or "traffic steering" at least in some embodiments refers to a procedure that selects an access network for a new data flow and transfers the traffic of one or more data flows over the selected access network. Access traffic steering is applicable between one 3GPP access and one non-3GPP access.

The term "access traffic switching" or "traffic switching" at least in some embodiments refers to a procedure that moves some or all traffic of an ongoing data flow from at least one access network to at least one other access network in a way that maintains the continuity of the data flow.

The term "access traffic splitting" or "traffic splitting" at least in some embodiments refers to a procedure that splits the traffic of at least one data flow across multiple access networks. When traffic splitting is applied to a data flow, some traffic of the data flow is transferred via at least one access channel, link, or path, and some other traffic of the same data flow is transferred via another access channel, link, or path.

The term "network address" at least in some embodiments refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD_ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, International Mobile Equipment Identity (IMEI), IMEI Type Allocation Code (IMEA/TAC), International Mobile Subscriber Identity (IMSI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), etc.), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof.

The term "application identifier", "application ID", or "app ID" at least in some embodiments refers to an identifier that can be mapped to a specific application or application instance; in the context of 3GPP 5G/NR systems, an "application identifier" at least in some embodiments refers to an identifier that can be mapped to a specific application traffic detection rule.

The term "endpoint address" at least in some embodiments refers to an address used to determine the host/authority part of a target URI, where the target URI is used to access an NF service (e.g., to invoke service operations) of an NF service producer or for notifications to an NF service consumer.

The term "closed access group" or "CAG" at least in some embodiments refers to a group of list of users permitted to connect and/or access a specific network, a specific access network, and/or attach to a specific cell or network access node. Closed access groups (CAGs) are sometimes referred to as Access Control Lists (ACLs), Closed Subscriber Groups (CSGs), Closed User Groups (CUGs), and the like. The term "CAG-ID" at least in some embodiments refers to an identifier of a CAG.

The term "port" in the context of computer networks, at least in some embodiments refers to a communication endpoint, a virtual data connection between two or more entities, and/or a virtual point where network connections start and end. Additionally or alternatively, a "port" at least in some embodiments is associated with a specific process or service.

The term "subnetwork" or "subnet" at least in some embodiments refers to a logical subdivision of a network, such as an IP network. The practice of dividing a network into two or more networks is called "subnetting."

The term "netmask" or "subnet mask" at least in some embodiments refers to a bitmask applied by bitwise AND operations to a network address (e.g., an IP address in an IP network) to yield a routing prefix, and/or is a 32-bit "mask" used to divide an IP address into subnets and specify the network's available hosts.

The term "localized network" at least in some embodiments refers to a local network that covers a limited number of connected vehicles in a certain area or region.

The term "local data integration platform" at least in some embodiments refers to a platform, device, system, network, or element(s) that integrate local data by utilizing a combination of localized network(s) and distributed computation.

The term "clear channel assessment (CCA) function" at least in some embodiments refers to a logical function in the physical layer (PHY) that determines the current state of use of a wireless medium.

The term "bandwidth" at least in some embodiments refers to the maximum rate of data transfer across a given path. Additionally or alternatively, the term "bandwidth" at least in some embodiments refers to data carrying capacity of a network or transmission medium.

The term "bit rate" at least in some embodiments refers to the number of bits that are conveyed or processed per unit of time.

The term "channel capacity" at least in some embodiments refers to an upper bound on the rate at which data can be reliably transmitted over a communication channel and/or given noise on a channel.

The term "data rate" at least in some embodiments refers to a transmission speed of a network. Additionally or alternatively, the term "data rate" at least in some embodiments refers to the amount of data transmitted during a specified time period and/or the speed at which data is transferred from one entity or element to another entity or element. Additionally or alternatively, the term "data rate" at least in some embodiments can be used interchangeably with the "bit rate", "data signaling rate", "symbol rate", "throughput", and/or "data transfer rate".

The term "delay" at least in some embodiments refers to a time interval between two events. Additionally or alternatively, the term "delay" at least in some embodiments refers to a time interval between the propagation of a signal and its reception.

The term "delay bound" at least in some embodiments refers to a predetermined or configured amount of acceptable delay. The term "per-packet delay bound" at least in some embodiments refers to a predetermined or configured amount of acceptable packet delay where packets that are not processed and/or transmitted within the delay bound are considered to be delivery failures and are discarded or dropped.

The term "goodput" at least in some embodiments refers to a number of useful information bits delivered by the network to a certain destination per unit of time.

The term "latency" at least in some embodiments refers to the amount of time it takes to transfer a first/initial data unit in a data burst from one point to another.

The term "network delay" at least in some embodiments refers to the delay of an a data unit within a network (e.g., an IP packet within an IP network).

The term "packet delay" at least in some embodiments refers to the time it takes to transfer any packet from one point to another. Additionally or alternatively, the term "packet delay" or "per packet delay" at least in some embodiments refers to the difference between a packet reception time and packet transmission time. Additionally or alternatively, the "packet delay" or "per packet delay" can be measured by subtracting the packet sending time from the packet receiving time where the transmitter and receiver are at least somewhat synchronized.

The term "packet drop rate" at least in some embodiments refers to a share of packets that were not sent to the target due to high traffic load or traffic management and should be seen as a part of the packet loss rate.

The term "packet loss rate" at least in some embodiments refers to a share of packets that could not be received by the target, including packets dropped, packets lost in transmission and packets received in wrong format.

The term "performance indicator" at least in some embodiments refers to performance data aggregated over a group of network functions (NFs), which is derived from performance measurements collected at the NFs that belong to the group, according to the aggregation method identified in a Performance Indicator definition.

The term "physical rate" or "PHY rate" at least in some embodiments refers to a speed at which one or more bits are actually sent over a transmission medium. Additionally or alternatively, the term "physical rate" or "PHY rate" at least in some embodiments refers to a speed at which data can move across a wired or wireless link between a transmitter and a receiver.

The term "processing delay" at least in some embodiments refers to an amount of time taken to process a packet in a network node.

The term "propagation delay" at least in some embodiments refers to amount of time it takes a signal's header to travel from a sender to a receiver.

The term "queuing delay" at least in some embodiments refers to an amount of time a job waits in a queue until that job can be executed. Additionally or alternatively, the term "queuing delay" at least in some embodiments refers to an amount of time a packet waits in a queue until it can be processed and/or transmitted.

The term "transmission delay" at least in some embodiments refers to an amount of time needed (or necessary) to push a packet (or all bits of a packet) into a transmission medium.

The term "throughput" or "network throughput" at least in some embodiments refers to a rate of production or the rate at which something is processed. Additionally or alternatively, the term "throughput" or "network throughput" at least in some embodiments refers to a rate of successful data delivery over a communication channel.

The term "application" at least in some embodiments refers to a computer program designed to carry out a specific task other than one relating to the operation of the computer itself. Additionally or alternatively, term "application" at least in some embodiments refers to a complete and deployable package, environment to achieve a certain function in an operational environment.

The term "algorithm" at least in some embodiments refers to an unambiguous specification of how to solve a problem or a class of problems by performing calculations, input/output operations, data processing, automated reasoning tasks, and/or the like.

The term "instance" at least in some embodiments refers to a concrete occurrence of an object, which may occur, for example, during execution of program code. Additionally or alternatively, the term "instance" at least in some embodiments refers to any running process or to an object as an instance of a class. Additionally or alternatively, the term "instance" at least in some embodiments refers to an object or the creation of an object, where the "object" at least in some embodiments refers to a location in memory having a value and possibly referenced by an identifier or reference, or a region of memory having one or more values and possibly referenced by one or more identifiers or references. Additionally or alternatively, the term "instance" at least in some embodiments refers to an individual virtual machine (VM) or container in a virtualized environment (e.g., cloud computing or edge computing system/service) that provides user-level and/or operating-system-level virtualization. Additionally or alternatively, the term "application instance" at least in some embodiments refers to a collection of services and/or service groups. The terms "instantiate," "instantiation," and the like at least in some embodiments refers to the creation of an instance. Additionally or alternatively, the term "instantiate" or "instantiation" at least in some embodiments refers to representing (or a representation of) an instance.

The term "maintenance" or "maintain" at least in some embodiments refers to (partial or in full) acts, tasks, operations, etc., of sustaining or otherwise keeping an object, entity, element, etc., in an existing state (e.g., as of repair, efficiency, or validity). Additionally or alternatively, term "maintenance" or "maintain" at least in some embodiments refers to (partial or in full) acts, tasks, operations, etc., of preserving an object, entity, element, etc., from failure or decline The term "data processing" or "processing" at least in some embodiments refers to any operation or set of operations which is performed on data or on sets of data, whether or not by automated means, such as collection, recording, writing, organization, structuring, storing, adaptation, alteration, retrieval, consultation, use, disclosure by transmission, dissemination or otherwise making available, alignment or combination, restriction, erasure and/or destruction.

The term "software agent" at least in some embodiments refers to a computer program that acts for a user or other program in a relationship of agency.

The term "use case" at least in some embodiments refers to a description of a system from a user's perspective. Use cases sometimes treat a system as a black box, and the interactions with the system, including system responses, are perceived as from outside the system. Use cases typically avoid technical jargon, preferring instead the language of the end user or domain expert.

The term "analytics" at least in some embodiments refers to the discovery, interpretation, and communication of meaningful patterns in data.

The term "application programming interface" or "API" at least in some embodiments refers to a set of subroutine definitions, communication protocols, and tools for building software. Additionally or alternatively, the term "application programming interface" or "API" at least in some embodiments refers to a set of clearly defined methods of communication among various components. An API may be for a web-based system, operating system, database system, computer hardware, or software library.

The term "database" at least in some embodiments refers to an organized collection of data that is stored and accessed electronically using a computing device. A database (DB) may include one or more DB objects that are managed by a DB management system (DBMS). Each DB object includes a number of records, and each record may include a set of fields. A record may take different forms based on the DB model being used and/or the specific DB object to which it belongs; for example, a record may be a row in a table of a relational DB; a JavaScript Object Notation (JSON) object; a data element in an XML document; a key-value pair; an entry in a hash table; and/or the like.

The term "index" at least in some embodiments refers to an object that maps a value to a stored object or data item. Additionally or alternatively, the term "index" at least in some embodiments refers to any data structure that assists in the access or retrieval of data in a data structure. Additionally or alternatively, the term "index" at least in some embodiments refers to a data structure that references or refers to data elements or records in a database.

The term "datagram" at least in some embodiments at least in some embodiments refers to a basic transfer unit associated with a packet-switched network; a datagram may be structured to have header and payload sections. The term "datagram" at least in some embodiments may be referred to as a "data unit", a "protocol data unit" or "PDU", a "service data unit" or "SDU", a frame, a packet, and/or the like.

The term "information element" at least in some embodiments refers to a structural element containing one or more fields.

The term "field" at least in some embodiments refers to individual contents of an information element, or a data element that contains content.

The term "data element" or "DE" at least in some embodiments refers to a data type that contains one single data.

The term "data frame" or "DF" at least in some embodiments refers to a data type that contains more than one data element in a predefined order.

The term "reference" at least in some embodiments refers to data useable to locate other data and may be implemented a variety of ways (e.g., a pointer, an index, a handle, a key, an identifier, a hyperlink, a memory address, etc.).

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. A compute node, comprising:
  memory circuitry to:
    instantiate a ring buffer in a region of the memory circuitry having a fixed size, the ring buffer including a plurality of slots where each slot is assigned a slot index of a plurality of slot indexes, and
    instantiate a set of virtual queues, wherein each virtual queue of the set of virtual queues is allocated to one instance of a set of instances and one link of a set of links; and
  processor circuitry connected to the memory circuitry, the processor circuitry to execute instructions for multi-queue management, which, when executed are to cause the processor circuitry to:
    store a packet to be processed in a subject slot of the plurality of slots, the packet is assigned to a subject instance of the set of instances and a subject link of the set of links, and the subject slot is assigned a subject slot index of the plurality of slot indexes,
    store the subject slot index in a subject virtual queue of the set of virtual queues, the subject virtual queue is allocated to the subject instance and the subject link, and
    obtain the stored packet from the subject slot using the subject slot index when the packet is scheduled for processing.

2. The compute node of claim 1, wherein, to process the stored packet, execution of the instructions is to cause the processor circuitry to:
  send the stored packet over the subject link.

3. The compute node of claim 1, wherein, to store the packet to be processed in the subject slot, execution of the instructions is to cause the processor circuitry to:
  perform a push function to push the packet into the subject slot.

4. The compute node of claim 3, wherein, to perform the push function, execution of the instructions is to cause the processor circuitry to:
  determine, as the subject slot, an unoccupied slot of the plurality of slots based on a write index;
  insert the subject slot index into the subject virtual queue after the packet is pushed into the subject slot;
  increment a queue size counter after the packet is pushed into the subject slot, wherein a value of the queue size counter is a number of occupied slots in the plurality of slots;
  update an item count parameter of the subject slot based on a total number of virtual queues in the plurality of queues that store the subject slot index; and
  update the write index such that the write index references an unoccupied slot of the plurality of slots different than the subject slot.

5. The compute node of claim 4, wherein, to update the write index, execution of the instructions is to cause the processor circuitry to:
  increment the write index; and
  determine a modulus of the incremented write index and a total number of slots in the plurality of slots.

6. The compute node of claim 1, wherein, to obtain the stored packet from the subject slot, execution of the instructions is to cause the processor circuitry to:
  perform a pop function to remove the packet from the subject slot.

7. The compute node of claim 6, wherein, to perform the pop function, execution of the instructions is to cause the processor circuitry to:
  obtain the subject slot index from the subject virtual queue;

obtain the packet from the subject slot using the subject slot index; and remove or delete the subject slot index from the subject virtual queue after identifying or obtaining the subject slot index.

8. The compute node of claim 7, wherein, to perform the pop function, execution of the instructions is to cause the processor circuitry to:

decrement an item count parameter of the subject virtual queue after removal or deletion of the subject slot index from the subject virtual queue; and decrement a queue size counter after the packet is popped from the subject slot, wherein a value of the queue size counter is a number of occupied slots in the plurality of slots.

9. The compute node of claim 1, wherein execution of the instructions is to cause the processor circuitry to:

when all slots of the plurality of slots are occupied, drop one or more slot indexes from one or more virtual queues according to a drop policy.

10. The compute node of claim 1, wherein:

each instance of the set of instances is one of a thread, a process, an object, a database entity, a user, an application instance, a session, a service, a communication link, or a hardware device; and each link of the set of links is one of a radio access technology (RAT), a communication link in a multi-access (MX) communication environment operating according to a Multi-Access Management Services (MAMS) framework, an interconnect between two or more hardware elements, an application session, a network session, or a service.

11. The compute node of claim 1, wherein the compute node is a first compute node, and execution of the instructions is to cause the processor circuitry to:

receive a first packet over a first connection between the first compute node and a second compute node;

receive a second packet over a second connection between the first compute node and the second compute node, wherein the second connection is different than the first connection; and initiate a packet reordering process to reorder a set of packets including the first and second packets.

12. The compute node of claim 11, wherein execution of the instructions is to cause the processor circuitry to:

stop the packet reordering process in response to one of receipt of an end marker packet over the first connection, expiration of a reordering timeout (RTO) timer, or when a second sequence number (SN) in the second packet is greater than SNs in other packets in the set of packets regardless of an order in which the first and second packets are received.

13. The compute node of claim 12, wherein execution of the instructions is to cause the processor circuitry to:

initiate the packet reordering process in response to receipt of the second packet over the second connection; or initiate the packet reordering process in response to sending a traffic steering request to the second compute node, wherein the traffic steering request is to cause the second compute node to send the end marker packet over the first connection and send the second packet over the second connection.

14. The compute node of claim 12, wherein the end marker packet includes an indicator to indicate that the packet reordering process is an intra-radio access technology (RAT) packet reordering process or an inter-RAT packet reordering process.

15. A method, comprising:

maintaining a ring buffer in a region of a memory circuitry having a fixed size, the ring buffer including a plurality of slots where each slot is assigned a slot index of a plurality of slot indexes, and maintaining a set of virtual queues, wherein each virtual queue of the set of virtual queues is allocated to one instance of a set of instances and one link of a set of links;

storing a packet to be processed in a subject slot of the plurality of slots, the packet is assigned to a subject instance of the set of instances and a subject link of the set of links, and the subject slot is assigned a subject slot index of the plurality of slot indexes;

storing the subject slot index in a subject virtual queue of the set of virtual queues, the subject virtual queue is allocated to the subject instance and the subject link; and obtaining the stored packet from the subject slot using the subject slot index when the packet is scheduled for processing.

16. The method of claim 15, wherein processing the stored packet comprises:

sending the stored packet over the subject link.

17. The method of claim 15, wherein storing the packet to be processed in the subject slot comprises:

performing a push function to push the packet into the subject slot.

18. The method of claim 17, wherein performing the push function comprises:

determining, as the subject slot, an unoccupied slot of the plurality of slots based on a write index;

inserting the subject slot index into the subject virtual queue after the packet is pushed into the subject slot;

incrementing a queue size counter after the packet is pushed into the subject slot, wherein a value of the queue size counter is a number of occupied slots in the plurality of slots;

updating an item count parameter of the subject slot based on a total number of virtual queues in the plurality of queues that store the subject slot index; and updating the write index such that the write index references an unoccupied slot of the plurality of slots different than the subject slot.

19. The method of claim 18, wherein updating the write index comprises:

incrementing the write index; and determining a modulus of the incremented write index and a total number of slots in the plurality of slots.

20. The method of claim 15, wherein obtaining the stored packet from the subject slot comprises:

performing a pop function to remove the packet from the subject slot.

21. The method of claim 20, wherein performing the pop function comprises:

obtaining the subject slot index from the subject virtual queue;

obtaining the packet from the subject slot using the subject slot index; and deleting the subject slot index from the subject virtual queue after identifying or obtaining the subject slot index;

decrementing an item count parameter of the subject virtual queue after removal or deletion of the subject slot index from the subject virtual queue; and decrementing a queue size counter after the packet is popped from the subject slot, wherein a value of the queue size counter is a number of occupied slots in the plurality of slots.

22. The method of claim 15, further comprising:

when all slots of the plurality of slots are occupied, dropping one or more slot indexes from one or more virtual queues according to a drop policy.

23. The method of claim 15, wherein:

each instance of the set of instances is one of a thread, a process, an object, a database entity, a user, an application instance, a session, a service, a communication link, or a hardware device; and each link of the set of links is one of a radio access technology (RAT), a communication link in a multi-access (MX) communication environment operating according to a Multi-Access Management Services (MAMS) framework, an interconnect between two or more hardware elements, an application session, a network session, or a service.

24. One or more non-transitory computer readable media (NTCRM) comprising instructions for performing multi-queue management, wherein execution of the instructions by one or more processors of a compute node is to cause the compute node to:

store a set of packets to be processed in respective slots of plurality of slots, wherein the plurality of slots form a ring buffer that is implemented in a memory region having a fixed size, the plurality of slots are assigned respective slot indexes of a plurality of slot indexes, and the respective slot indexes reference a memory location of a corresponding slot of the plurality of slots;

push the respective slot indexes into a plurality of virtual queues, wherein each virtual queue of the plurality of virtual queues is allocated to an instance of a set of instances and a link of a set of links;

pop a set of the respective slot indexes from one or more virtual queues of the plurality of virtual queues; and obtain a subset of the stored packets from their respective slots using the popped slot indexes.

25. The one or more NTCRM of claim 24, wherein, to store the packets to be processed in the respective slots, execution of the instructions is to cause the compute node to:

determine, for each packet of the set of packets, an unoccupied slot of the plurality of slots based on a value of a write index.

26. The one or more NTCRM of claim 25, wherein, to push the respective slot indexes into the plurality of virtual queues, execution of the instructions is to cause the compute node to, for an individual packet of the set of packets:

insert, into at least one virtual queue of the plurality of virtual queues, a slot index corresponding to an individual slot of the of plurality of slots in which the individual packet is stored;

increment a queue size counter after the individual packet is stored in the individual slot, wherein a value of the queue size counter is a number of occupied slots in the plurality of slots;

update an item count parameter of the individual slot based on a number of virtual queues in the plurality of queues that store the slot index; and update the write index such that the write index references an unoccupied slot of the plurality of slots different than the individual slot.

27. The one or more NTCRM of claim 25, wherein, to pop the set of the respective slot indexes from the one or more virtual queues, execution of the instructions is to cause the compute node to:

obtain each slot index of the set of the respective slot indexes from the one or more virtual queues;

delete each obtained slot index from a virtual queue of the one or more virtual queues from which they are obtained;

decrement an item count parameter of the virtual queue after the deletion of each obtained slot index; and decrement a queue size counter after the packet is obtained from its respective slot.

28. The one or more NTCRM of claim 24, wherein:

each instance of the set of instances is one of a thread, a process, an object, a database entity, a user, an application instance, a session, a service, a communication link, or a hardware device; and each link of the set of links is one of a radio access technology (RAT), a communication link in a multi-access (MX) communication environment operating according to a Multi-Access Management Services (MAMS) framework, an interconnect between two or more hardware elements, an application session, a network session, or a service.

29. The one or more NTCRM of claim 24, wherein execution of the instructions is to cause the compute node to:

receive, over a first link of the set of links, a subset of packets of the set of packets;

receive, over a second link of the set of links, at least one packet of a set of packets not in the subset;

initiate a packet reordering process to reorder the set of packets using the respective slot indexes.

30. The one or more NTCRM of claim 29, wherein execution of the instructions is to cause the compute node to:

stop the packet reordering process in response to one of receipt of:
an end marker packet over the first link,
expiration of a reordering timeout (RTO) timer, or
when a second sequence number (SN) in the second packet is greater than SNs in other packets in the set of packets regardless of an order in which the first and second packets are received; and initiate the packet reordering process in response to one of:
receipt of the second packet over the second link, or
transmission of a traffic steering request to another compute node, wherein the traffic steering request is to cause the other compute node to send the end marker packet over the first link and send the second packet over the second link.

* * * * *